(12) United States Patent
Sato et al.

(10) Patent No.: US 7,839,439 B2
(45) Date of Patent: Nov. 23, 2010

(54) SOLID-STATE IMAGING DEVICE AND IMAGING DEVICE

(75) Inventors: Maki Sato, Kanagawa (JP); Ryoji Suzuki, Kanagawa (JP); Noritaka Fujita, Fukuoka (JP); Satsuki Kamogawa, Fukuoka (JP)

(73) Assignee: Sony Corporation, Tokyo (JP)

( * ) Notice: Subject to any disclaimer, the term of this patent is extended or adjusted under 35 U.S.C. 154(b) by 498 days.

(21) Appl. No.: 11/971,584

(22) Filed: Jan. 9, 2008

(65) Prior Publication Data

US 2008/0180555 A1 Jul. 31, 2008

(30) Foreign Application Priority Data

Jan. 12, 2007 (JP) ............................. 2007-004755
Jan. 12, 2007 (JP) ............................. 2007-004756

(51) Int. Cl.
*H04N 5/217* (2006.01)

(52) U.S. Cl. .................... 348/241; 348/222.1; 348/248; 348/294; 348/299; 348/314

(58) Field of Classification Search ............. 348/222.1, 348/241, 248, 294, 299, 314
See application file for complete search history.

(56) References Cited

U.S. PATENT DOCUMENTS

2002/0159053 A1* 10/2002 Nair et al. ................ 356/237.2

FOREIGN PATENT DOCUMENTS

| JP | 2006-054276 | 2/2006 |
| WO | 03/079675 | 9/2003 |

\* cited by examiner

*Primary Examiner*—Jason Chan
*Assistant Examiner*—Usman Khan
(74) *Attorney, Agent, or Firm*—SNR Denton US LLP

(57) ABSTRACT

A solid-state imaging device includes: a pixel array unit wherein a unit pixel group with a portion of elements of a unit pixel being shared with a plurality of unit pixels is arrayed in a matrix form, the unit pixel having a detecting unit, a pixel signal generating unit, a transfer unit to transfer the charge, and an initializing unit to initialize the potential of the pixel signal generating unit; and a driving control unit; wherein the driving control unit controls blooming reduction potential which is the transfer control potential supplied to the transfer unit of the unit pixel to be thinned, so that the overflow charge at the detecting unit with the unit pixel to be thinned which has no shared relation with the unit pixel to be read transitions to a state readily transferable to the pixel signal generating unit side of the unit pixel to be thinned.

27 Claims, 22 Drawing Sheets

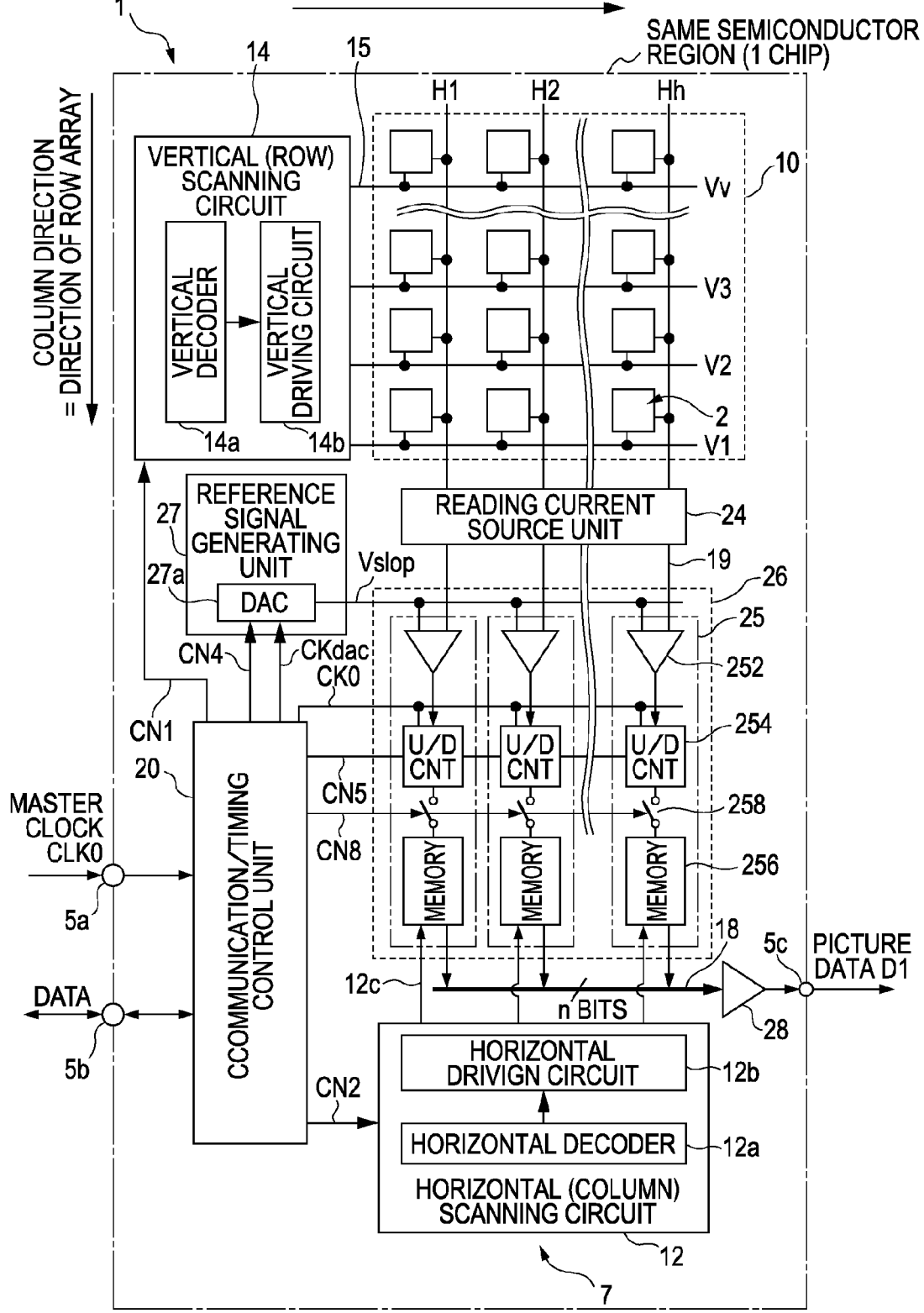

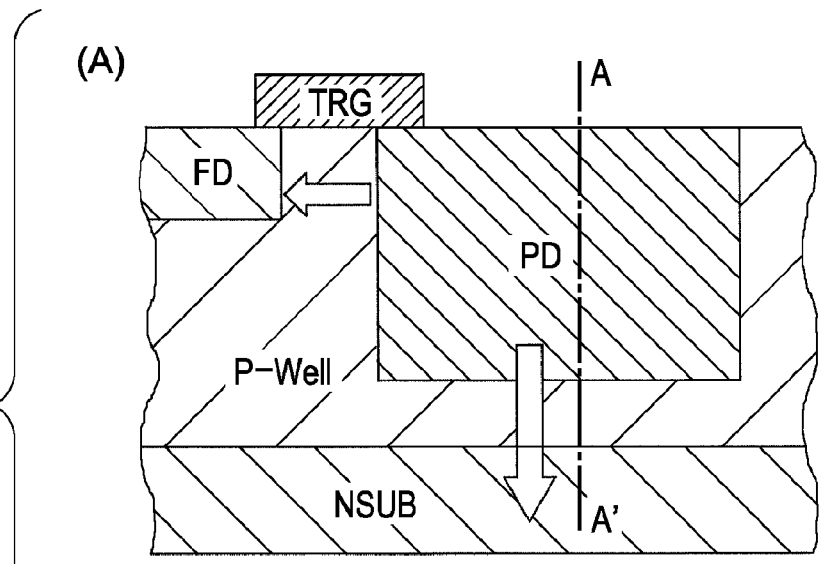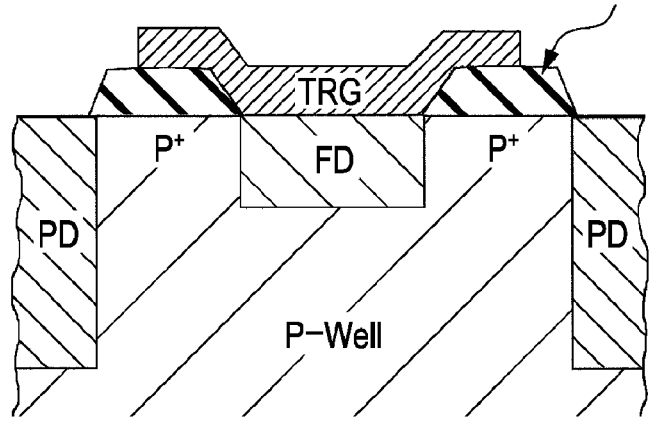
FIG. 3A

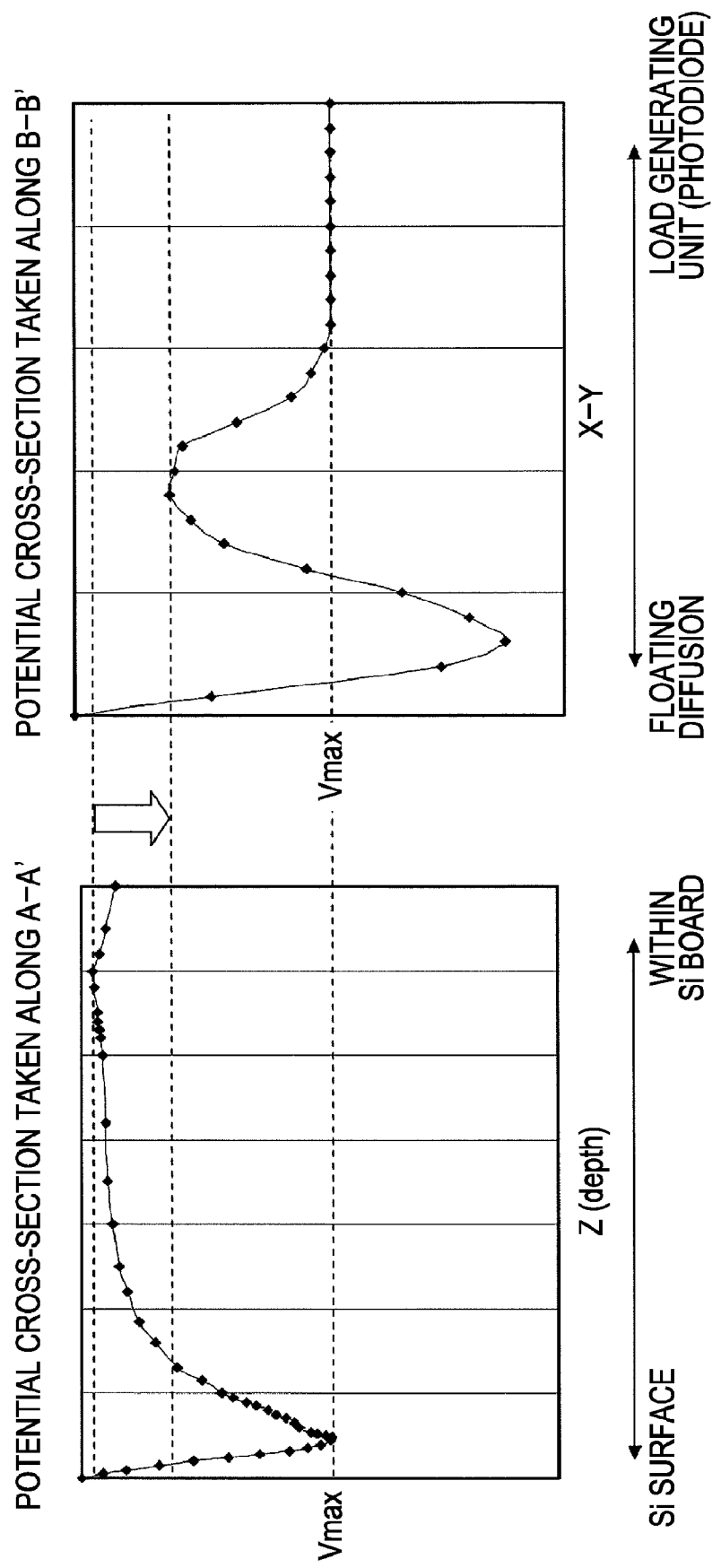

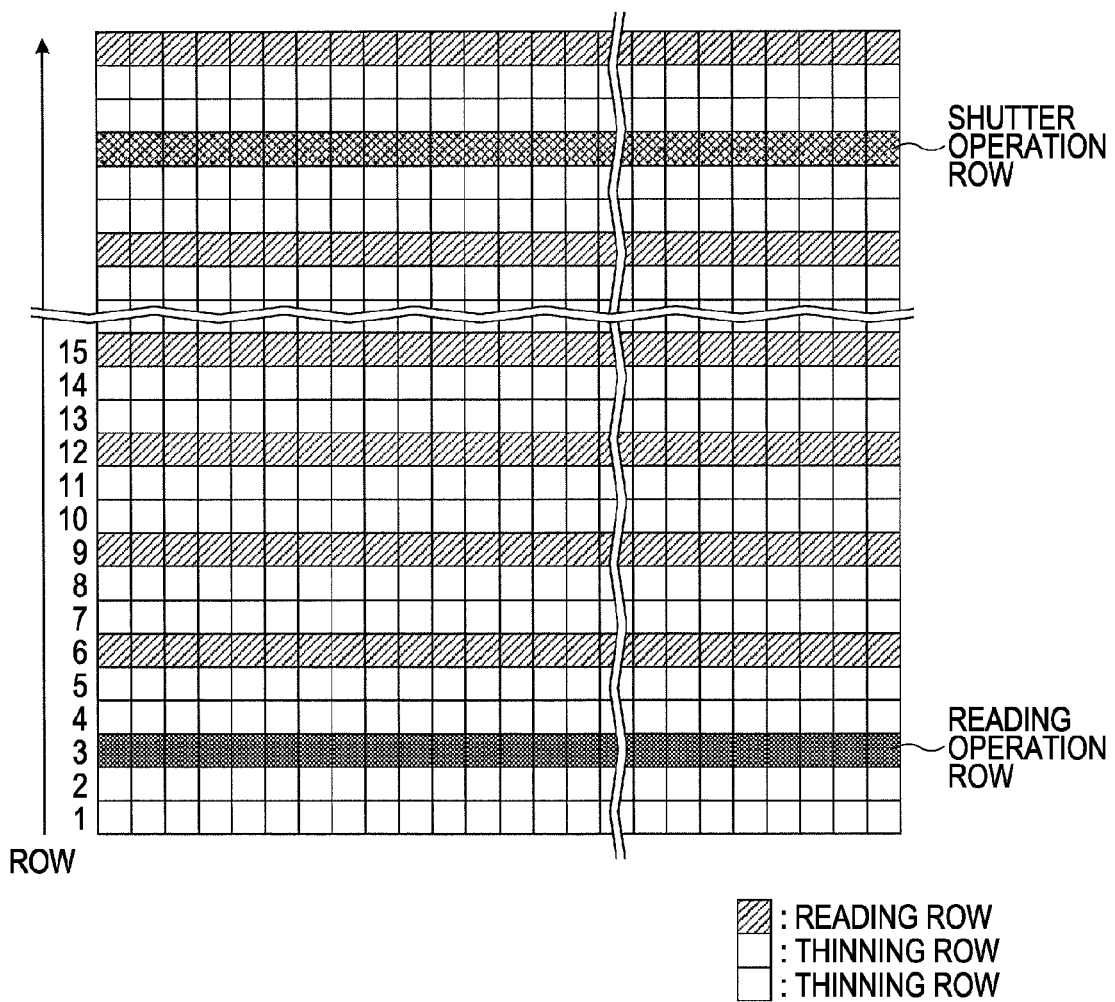

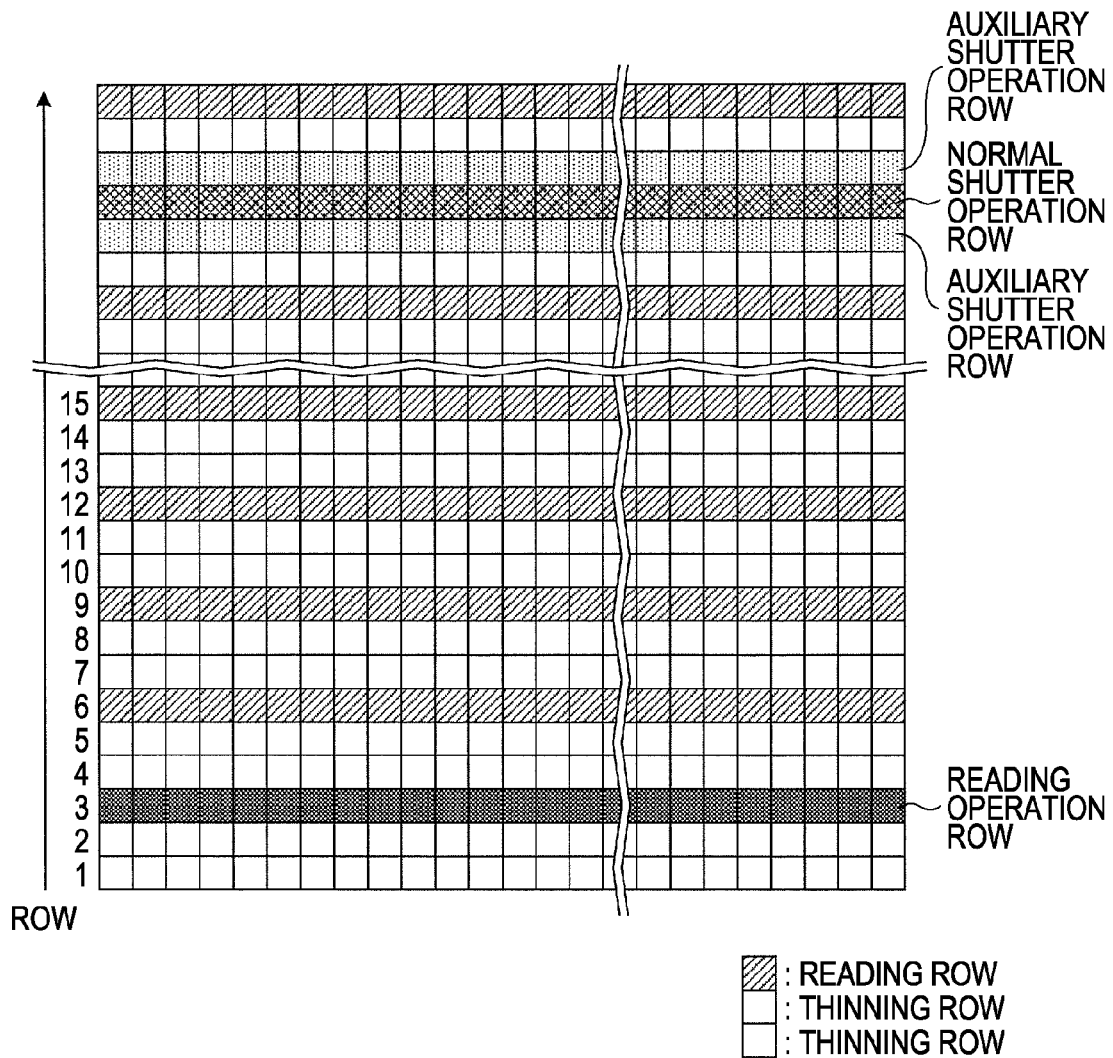

<SECOND COMPARATIVE EXAMPLE>

SHOWING ONLY TRANSFER PULSE TRG

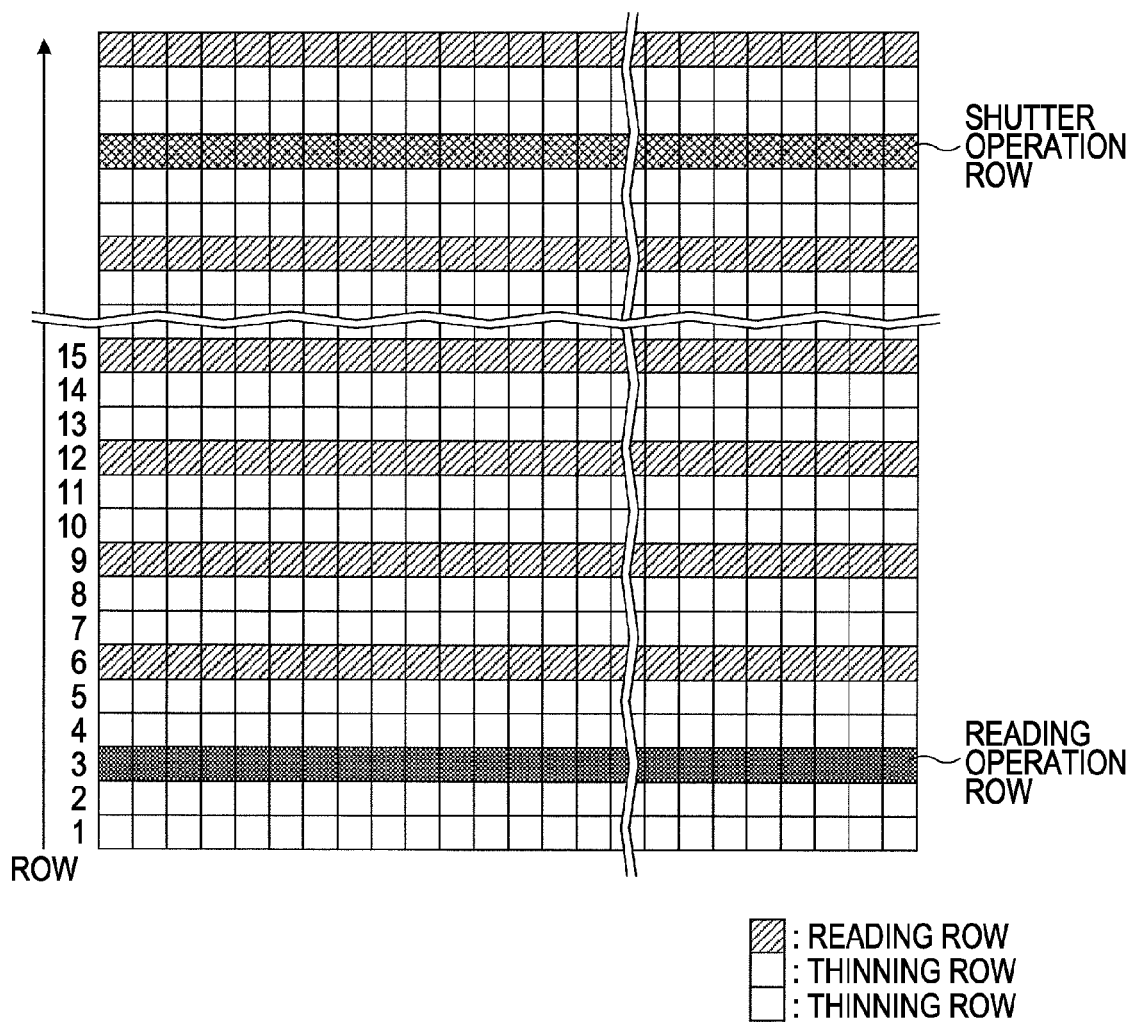

<THIRD COMPARATIVE EXAMPLE>

SHOWING ONLY TRANSFER PULSE TRG

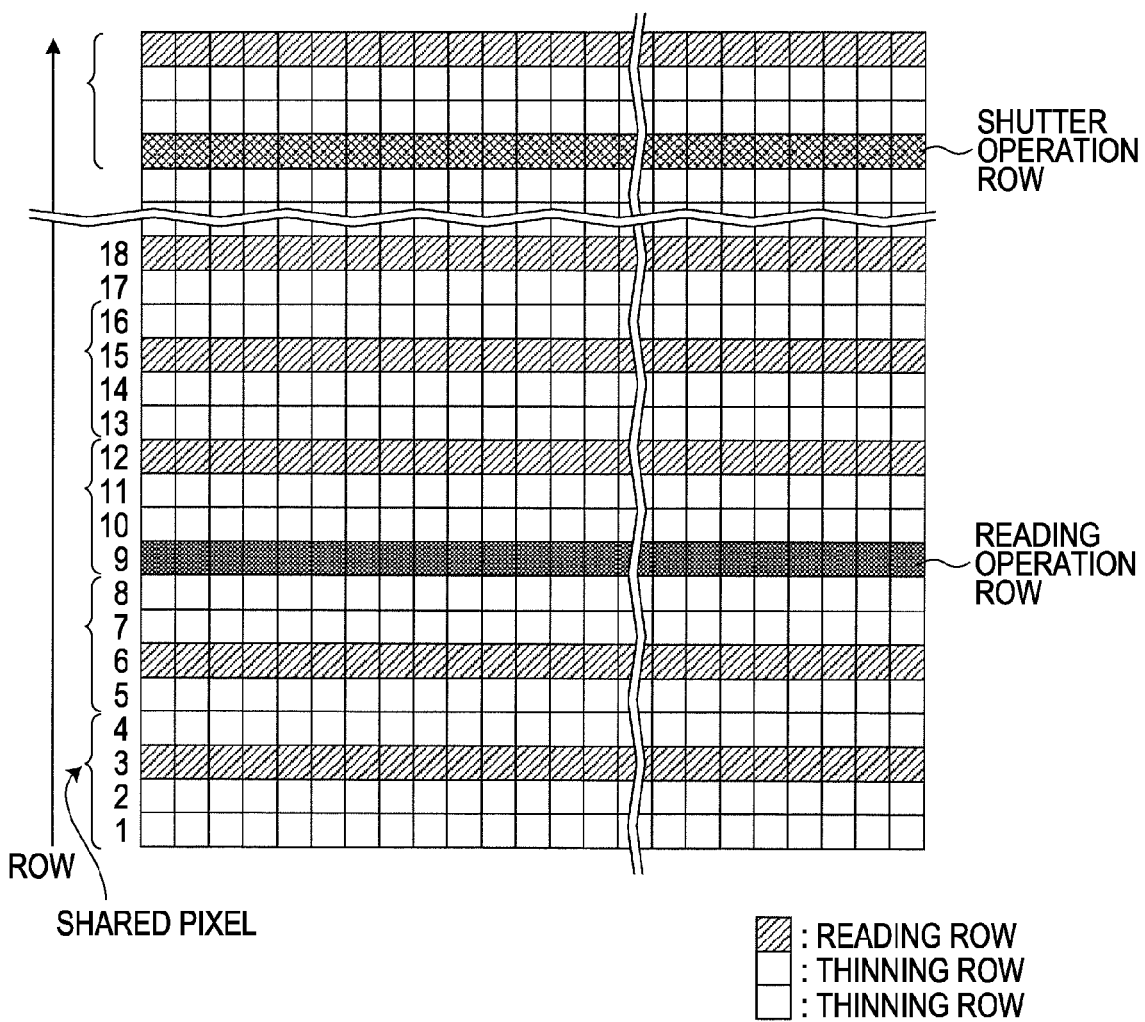

<PRESENT EMBODIMENT>

SHOWING ONLY TRANSFER PULSES TRG AND RST

FIG. 16

| REQUIRED CONDITIONS | | | | GATE INPUT OF OUTPUT BUFFER AND ON/OFF STATE FOR TRG (OUTPUT) | | |
|---|---|---|---|---|---|---|
| INTERMEDIATE POTENTIAL SETTING SIGNAL G1 | SHARED | φTRG (INPUT) | TRG (OUTPUT) | 328H | 328M | 328L |
| EITHER | EITHER | L | L | H (OFF) | L (OFF) | H (ON) |
| H | YES: G2 | H | L | H (OFF) | L (OFF) | H (ON) |
| | NO: G3 (NG2) | H | M | H (OFF) | H (ON) | L (OFF) |
| L | EITHER | H | H | L (ON) | L (OFF) | L (OFF) |

⟨CONFIGURATION CONDITIONS FOR GATE CIRCUIT⟩

$328H\ (H) = \phi NTRG \cdot NG1 + \phi TRG \cdot G1$ $328M\ (H) = \phi TRG \cdot G1 \cdot G3$ $328L\ (H) = \phi NTRG + G1 \cdot G2 \cdot \phi TRG$
$= (1 + G1 \cdot G2)\ \phi NTRG + G1 \cdot G2 \cdot \phi TRG$
$= \phi NTRG + G1 \cdot G2\ (\phi NTRG + \phi TRG)$
$= \phi NTRG + G1 \cdot G2$

SOLID-STATE IMAGING DEVICE AND IMAGING DEVICE

CROSS REFERENCES TO RELATED APPLICATIONS

The present invention contains subject matter related to Japanese Patent Application JP 2007-004755 and Japanese Patent Application JP 2007-004756, both filed in the Japanese Patent Office on Jan. 12, 2007, the entire contents of which are incorporated herein by reference.

BACKGROUND OF THE INVENTION

1. Field of the Invention

The present invention relates to a solid-state imaging device and an imaging device which are examples of a semiconductor device for physical quantity distribution detection. Specifically, the present invention relates to an arrangement wherein multiple unit configuration elements are arrayed which has sensitivity as to an electromagnetic wave input externally such as light or a radiation beam for example, and reads the physical quantity distribution converted to an electrical signal by the unit configuration elements as an analog electrical signal or digital data. Particularly, the present invention relates to an arrangement having a function to thin out and output pixels at the time of reading an image signal.

2. Description of the Related Art

A physical quantity distribution detecting semiconductor device made up of an array of multiple unit configuration elements (for example pixels), in a linear form or in a matrix form, which have sensitivity as to physical quantity change such as an electromagnetic wave input externally such as light or a radiation beam, or pressure (such as contact), is employed in various fields.

As an example, in the field of picture devices, a solid-state imaging device is used which employs an imaging element (imaging device) of a CCD (Charge Coupled Device) type which detects changes to the light (one example of an electromagnetic wave) which is an example of physical quantity, or an MOS (Metal Oxide Semiconductor) or a CMOS (Complementary Metal-oxide Semiconductor) type.

In recent years, as an example of a solid-state imaging device, image sensors of an MOS type or CMOS type which can overcome various problems which a CCD image sensor has, have been gaining attention.

For example, a method called column parallel output type, or column type, is widely used, wherein a CMOS image sensor has an amplifying circuit made up of a floating diffusion amplifier for each pixel or the like, wherein upon the reading of a pixel signal, as an example of address control, a certain row from the pixel array unit is selected, the one row worth is simultaneously accessed and the pixel signals are read simultaneously in parallel from the pixel array in increments of rows, i.e. all of the pixels of the one row worth are simultaneously read in parallel.

Also, in the field of computer equipment, fingerprint authentication devices and the like are employed, which detect an image of a fingerprint with information relating to fingerprints, based on changes to electrical features based on pressure or changes to optical features. A physical quantity distribution which has been converted to an electrical signal by unit configuration elements (pixels with a solid-state imaging device) is read out as an electrical signal.

Also, among solid-state imaging devices, there is an amplifying-type solid-state imaging device which has pixels in a configuration of amplifying-type solid-state imaging elements (APS; Active Pixel Sensor, also called gain cells) having a driving transistor for amplification at the pixel signal generating unit which generates a pixel signal according to a signal charge generated at the charge generating unit. For example, many of the CMOS-type solid-state imaging devices have this sort of configuration.

In order to read a pixel signal to the outside with such an amplifying solid-state imaging device, an arrangement is made wherein address control is performed as to the pixel unit wherein multiple unit pixels are arrayed, and signals from individual unit pixels are selected in a determined address order or arbitrarily, and read out. That is to say, the amplifying solid-state imaging device is an example of an address control type of solid-state imaging device.

For example, with an amplifying solid-state imaging device which is one type of an X-Y address-type solid-state imaging device wherein unit pixels are arrayed in a matrix form, pixels are configured employing an active element (MOS transistor) with an MOS configuration or the like, in order for the pixels themselves to have an amplifying function. That is to say, the signal charge (photoelectron or hole) accumulated in the photodiode which is a photoelectrical converter is amplified with the above-mentioned active element, and read out as image information.

As tendencies for solid-state imaging devices in recent years, miniaturization and increase in speed of the pixels is significant. A shared problem herein is that of sensitivity. The miniaturization of the former relates to decreased incident light amount per pixel from the shrinking of the light-receiving unit. Also, the increase in speed of the latter relates to decrease in incident light amount from the reduction in exposure time.

Regarding the former, an arrangement is known, for example, wherein the are occupied by the circuit is decreased by a portion of the circuit which is held within each pixel cell is shared among multiple pixels, whereby the area of the photoelectric converter is secured (hereafter this will be called a pixel sharing method).

With Japanese Unexamined Patent Application Publication No. 2006-054276, an arrangement is proposed wherein one voltage converter is disposed between two photoelectric converters which are diagonally adjacent within a 2-dimensional array (pixel array unit and imaging unit), and the one voltage converter is configured to be shared by two photoelectric converters, whereby the occurrence of an invalid region being generated on the periphery of the voltage converter is suppressed, thereby securing the regional area of the photoelectric converters as to the pixel area, and the photoelectric converters are disposed at the optical center of each pixel, and the optical pixel center is disposed 2-dimensionally with even spacing.

Further, as to the latter, a thinning reading is known as an example of a high-speed method for shortening the readout processing time of a pixel signal, which only reads a portion of the pixel signals instead of reading pixel signals from all of the pixels of the pixel array unit (imaging unit) (for example, see Japanese Unexamined Patent Application Publication No. 2006-054276). With Japanese Unexamined Patent Application Publication No. 2006-054276, a mode is shown to perform thinning in increments of rows or in increments of columns, as an example.

In PCT Japanese Translation Patent Publication No. WO2003/079675, thinning reading is described as being employed for processing to reduce the number of pixels according to the situation, such as reading all pixels at the time of photographing a still image but thinning out the number of pixels at the time of photographing a moving image to perform reading at a high speed, for example.

SUMMARY OF THE INVENTION

However, if thinning reading is performed in increments of rows or increments of columns (hereafter this will be written as increments of rows, representatively), driving conditions as to the pixels (driving frequency of transistors) differ between a thinning row wherein a reading operation is not performed and a reading row wherein thinning is not performed, whereby various problems can occur.

PCT Japanese Translation Patent Publication No. WO2003/079675 discloses deterioration in image features and improvement measures thereto, wherein when switching to all-pixel reading mode after use in the thinning reading mode for a long period of time, for example, between the thinning rows and the reading rows which are not thinned, differences occur in the deterioration rate of transistors which make up the pixels, the pixel wiring for driving thereof, and the driving buffers, the influence thereof is visible as periodic striations.

On the other hand, from the perspective of a high-speed method which shortens the readout processing time of the pixel signals, there is a thinning reading wherein the pixel signals are not read out from all of the pixels of a pixel array unit (imaging unit), but rather only a portion of the pixel signals are read out, such as increments of rows and in increments of columns. This thinning reading may be possibly used in combination with the pixel sharing method.

However, if thinning reading is performed in increments of rows or increments of columns (hereafter this will be written as increments of rows, representatively), driving conditions as to the pixels (driving frequency of transistors) differ between a thinning row wherein a reading operation is not performed and a reading row wherein thinning is not performed, whereby various problems can occur.

As an example thereof, a phenomenon occurs (called blooming phenomenon) wherein reading operations are not performed for thinning rows where there is exposure, whereby the charge generated at the photoelectric converter overflows and influences the reading rows.

Also, there are problems relating to thinning reading other than those disclosed in PCT Japanese Translation Patent Publication No. WO2003/079675. As an example thereof, a phenomenon occurs (called blooming phenomenon) wherein reading operations are not performed for thinning rows where there is exposure, so if the exposure is continued, the charge generated at the photoelectric converter overflows and influences the reading rows.

There has been recognized a need for the blooming phenomenon which occurs at the time of thinning reading to be alleviated, thereby providing an arrangement wherein favorable image quality can be maintained. In particular, there has been realized a need for an arrangement wherein the blooming phenomenon is alleviated even with a combination with the pixel shared configuration, while the operations of the reading rows within the shared pixel group are not affected negatively by the influence of the blooming phenomenon measures, or the extent of the negative influence thereof is small.

Further, there has been realized a need for the blooming phenomenon which occurs at the time of thinning reading to be alleviated, thereby providing an arrangement wherein favorable image quality can be maintained.

According to an embodiment of the present invention, a solid-state imaging device includes: a pixel array unit wherein a unit pixel group having a configuration wherein a portion of elements of a unit pixel is shared with multiple unit pixels is arrayed in a matrix form, such unit pixel having a detecting unit configured to detect changes in physical quantity by charge (a photodiode such as a photoelectric converter is typical), a pixel signal generating unit configured to convert the charge detected at the detecting unit to a pixel signal (an amplification amplifier of a floating diffusion configuration is typical), a transfer unit configured to transfer the charge detected at the detecting unit to the pixel signal generating unit based on the input transfer control potential (a transfer transistor is typical), and an initializing unit configured to initialize the potential of the pixel signal generating unit based on the input initialized control potential (a reset transistor is typical); and a driving control unit configured to control the unit pixels with a thinning reading mode to read a pixel signal of a portion of unit pixels of the pixel array unit, for example in row increments or in column increments.

With consideration for the pixel-sharing configuration at the time of the thinning reading mode, i.e. based on whether or not the thinning row is in a shared relation with the reading operation row, the driving control unit controls the blooming reduction potential which is the transfer control potential supplied to the transfer unit of the unit pixel to be thinned, such that the charge overflowing at the detecting unit of the unit pixel to be thinned transitions to a state readily transferred to the pixel signal generating unit side of the unit pixel to be thinned.

By performing such blooming reduction potential control as to the transfer unit of the unit pixel to be thinned, compared to the case of supplying a normal inactive level, the potential barrier under a transfer electrode of the transfer unit is lowered. Thus, the unneeded charge overflowing into the detecting unit beginning with the photodiode transitions to a state readily discharged on the pixel signal generating unit side.

Thus, as a feature of an embodiment of the solid-state imaging device relating to the present invention, the supply of the blooming reduction potential to the transfer unit of the thinning rows is controlled according to whether or not the thinning row is in a shared relation with the reading operation row. Specifically, when the unit pixel to be thinned is in a pixel-sharing relation with the unit pixel of the reading operation, the supply of blooming reduction potential as to the transfer unit of the unit pixel to be thinned is stopped, and potential on the more inactive side (for example, this can be the same as the potential regulating the inactive state) is supplied.

As an actual operation, the unit pixels to be subjected to reading operations are sequentially switched over, so together with this, the supply of blooming reduction potential and the supply of potential on the more inactive side is also switched.

However, other arrangements may be made; or example, the blooming reduction potential only needs to be a potential more on the active level side than the inactive level, but from the perspective of reliability or dark current, a potential excessively on the active level side is not desirable. Accordingly, an appropriate potential between the inactive level and the active level (intermediate potential) is actually desirable.

With the blooming reduction potential supplied to the transfer unit of the unit pixel to be thinned, if a potential equivalent to an intermediate potential is being employed already for another purpose, using this potential is desirable. A blooming reduction potential may be provided to be dedicated between the active level and the inactive level, but in this case, handling of the circuit which generates the blooming reduction potential becomes necessary, so using the intermediate potential itself which already exists for another purpose, as the blooming reduction potential, has the advantage of enabling a more compact circuit configuration.

"For another purpose" may be that the transfer control potential itself for driving the transfer unit may be used for a purpose other than blooming reduction, or may be the initializing control potential to drive the initializing unit, or may be a control potential to drive other unit pixels, and with an extreme example, may be a control potential to control other elements which make up the solid-state imaging device without being limited to a control potential for driving the unit pixels.

Alternatively, the blooming reduction potential supplied to the transfer unit of the unit pixel to be thinned may be in a floating state not actually having a potential. With the present specification, "blooming reduction potential" is not only a potential of a certain size which can suppress the blooming phenomenon, but also includes a floating state which has no size as a potential.

Note that when performing control of the blooming reduction potential as to the transfer unit of the unit pixels to be thinned, and thereby discharging unneeded charge overflowed within the detecting unit to the pixel signal generating unit side, the processing of the discharged charge also needs to be considered.

As a first example of such handling, a method wherein the initializing unit has a transistor with a depletion configuration is desirable. By employing the depletion configuration, even if the control voltage is left to be inactive, operations of a leak current can be used, whereby the unneeded charge which is transferred automatically from the detecting unit of the initializing unit can be discharged on the power source side.

Also, in the case of not employing the first example, controlling the initializing unit of the unit pixel to be thinned, and discharging the charge transferred to the pixel signal generating unit by supplying the blooming reduction potential to the transfer unit is desired. With this operation, as with a shutter operation with a normal reading operation, processing in conjunction with the reading operation rows is not necessary, but rather appropriate timing may be used which has no influence on the control of the shutter operation rows or reading operation rows.

Note that the solid-state imaging device may be formed as one chip, or may be in the form of a module having imaging functions wherein an imaging unit and a signal processing unit or optical system is packaged together.

Also, the present invention is applicable to an imaging device, not only to a solid-state imaging device. In this case, an imaging device can obtain the same advantages as the solid-state imaging device. An imaging device here refers to a camera (or camera system) or a portable device having an imaging function. Also "imaging" includes not only capturing images at the time of normal camera photography, but also in a broader sense includes fingerprint detecting and so forth.

According to another embodiment of the present invention, a solid-state imaging device includes: a pixel array unit wherein unit pixels are arrayed in a matrix form, the unit pixels having a detecting unit configured to detect changes in physical quantity by charge (a photodiode such as a photoelectric converter is typical), a pixel signal generating unit configured to convert the charge detected at the detecting unit to a pixel signal (an amplification amplifier of a floating diffusion configuration is typical), a transfer unit configured to transfer the charge detected at the detecting unit to the pixel signal generating unit based on the input transfer control potential (a transfer transistor is typical), and an initializing unit configured to initialize the potential of the pixel signal generating unit based on the input initialized control potential (a reset transistor is typical); and a driving control unit configured to control the unit pixels with a thinning reading mode to read a pixel signal of a portion of unit pixels of the pixel array unit, for example in row increments or in column increments.

The driving control unit controls the blooming reduction potential which is the transfer control potential supplied to the transfer unit of the unit pixel to be thinned, such that the charge overflowing at the detecting unit of the unit pixel to be thinned transitions to a state readily transferred to the pixel signal generating unit side of the unit pixel to be thinned at the time of the thinning reading mode.

By performing such blooming reduction potential control as to the transfer unit of the unit pixel to be thinned, compared to the case of supplying a normal inactive level, the potential barrier under a transfer electrode of the transfer unit is lowered. Thus, the unneeded charge overflowing into the detecting unit beginning with the photodiode transitions to a state readily discharged on the pixel signal generating unit side.

However, other arrangements may be made; for example, the blooming reduction potential only needs to be a potential more on the active level side than the inactive level, but from the perspective of reliability or dark current, a potential excessively on the active level side is not desirable. Accordingly, an appropriate potential between the inactive level and the active level (intermediate potential) is actually desirable.

With the blooming reduction potential, if a potential equivalent to an intermediate potential is being employed already for another purpose, using this potential is desirable. A blooming reduction potential may be provided to be dedicated between the active level and the inactive level, but in this case, handling of the circuit which generates the blooming reduction potential becomes necessary, so using the intermediate potential itself which already exists for another purpose, as the blooming reduction potential, has the advantage of enabling a more compact circuit configuration.

"For another purpose" may be that the transfer control potential itself for driving the transfer unit may be used for a purpose other than blooming reduction, or may be the initializing control potential to drive the initializing unit, or may be a control potential to drive other unit pixels, and with an extreme example, may be a control potential to control other elements which make up the solid-state imaging device without being limited to a control potential for driving the unit pixels.

Alternatively, the blooming reduction potential supplied to the transfer unit of the unit pixel to be thinned may be in a floating state not actually having a potential. With the present specification, "blooming reduction potential" is not only a potential of a certain size which can suppress the blooming phenomenon, but also includes a floating state which has no size as a potential.

Note that when performing control of the blooming reduction potential as to the transfer unit of the unit pixels to be thinned, and thereby discharging unneeded charge overflowed within the detecting unit to the pixel signal generating unit side, the processing of the discharged charge also needs to be considered.

As a first example of such handling, a method wherein the initializing unit has a transistor with a depletion configuration is desirable. By employing the depletion configuration, even if the control voltage is left to be inactive, operations of a leak current can be used, whereby the unneeded charge which is transferred automatically from the detecting unit of the initializing unit can be discharged on the power source side.

Also, in the case of not employing the first example, controlling the initializing unit of the unit pixel to be thinned, and discharging the charge transferred to the pixel signal generating unit by supplying the blooming reduction potential to the transfer unit is desired. With this operation, as with a shutter operation with a normal reading operation, processing in conjunction with the reading operation rows is not necessary, but rather appropriate timing may be used which has no influence on the control of the shutter operation rows or reading operation rows.

Note that the solid-state imaging device may be formed as one chip, or may be in the form of a module having imaging functions wherein an imaging unit and a signal processing unit or optical system is packaged together.

Also, the present invention is applicable to an imaging device, not only to a solid-state imaging device. In this case, an imaging device can obtain the same advantages as the solid-state imaging device. An imaging device here refers to a camera (or camera system) or a portable device having an imaging function. Also "imaging" includes not only capturing images at the time of normal camera photography, but also in a broader sense includes fingerprint detecting and so forth.

According to one embodiment of the present invention, relating to the unit pixel to be thinned when in the thinning reading mode, the transfer control potential supplied to the transfer unit is set as a blooming reduction potential so that the charge overflowing at the detecting unit transitions to a state readily transferable to the pixel signal generating unit side. Thus, the unneeded charge which overflowed within the detecting unit transitions to a state readily dischargeable on the pixel signal generating unit side, whereby blooming phenomenon, wherein charge generated at the thinned unit pixels overflows and leaks into the unit pixels of adjacent reading operations, can be suppressed.

With consideration for the point that the pixel array unit is made up of unit pixel groups with a pixel-sharing configuration, when the unit pixel to be thinned is in a pixel-sharing relation with the unit pixel of the reading operation, supply of the blooming reduction potential as to the transfer unit of the unit pixel to be thinned is stopped and potential on the more inactive side is supplied, thereby preventing signal level variations due to the signal leaking from the detecting unit of the unit pixel to be thinned into the pixel signal generating unit of the unit pixels of the reading operation.

With a combination with the pixel sharing configuration also, the blooming phenomenon can be alleviated, while an arrangement can be realized wherein the influence of the blooming phenomenon does not negatively affect the reading row operations within the shared pixel group, or an arrangement can be realized wherein the extent of the negative influence thereof is small.

According to one embodiment of the present invention, relating to the unit pixel to be thinned when in the thinning reading mode, the transfer control potential supplied to the transfer unit is set as a blooming reduction potential so that the charge overflowing at the detecting unit transitions to a state readily transferable to the pixel signal generating unit side. Thus, the unneeded charge which overflowed within the detecting unit transitions to a state readily dischargeable on the pixel signal generating unit side, whereby blooming phenomenon, wherein charge generated at the thinned unit pixels overflows and leaks into the unit pixels of adjacent reading operations, can be suppressed.

BRIEF DESCRIPTION OF THE DRAWINGS

FIG. 1 is an overall configuration diagram of a CMOS solid-state imaging device according to an embodiment of a solid-state imaging device relating to an embodiment of the present invention;

FIGS. 2D and 2E are diagrams illustrating a configuration example of a unit pixel 3 using in the solid-state imaging device illustrating in FIG. 1, wherein FIG. 2D is a diagram illustrating a pixel cell layout example of the components making up the unit pixel 3, and FIG. 2E is a diagram illustrating the configuration example of the unit pixel 3 thereof and a connection state between a driving unit and a driving control line and a pixel transistor.

FIG. 3A is a schematic diagram of a density distribution cross-sectional configuration taking the B-B' cross-section and C-C' cross-section focusing on a charge generating unit and floating diffusion of the unit pixel making up the unit pixel group illustrated in FIGS. 2A and 2B;

FIG. 3B is an example of a potential cross-sectional view taking the A-A' cross-section in FIG. 3A and the B-B' cross-section in FIG. 2;

FIG. 5 is a diagram focusing on a pixel array unit to describe a first comparison example as to a pixel driving method when in thinning reading mode according to the present embodiment;

FIG. 7 is a diagram focusing on a pixel array unit to describe a second comparison example as to the pixel driving method when in thinning reading mode according to the present embodiment;

FIG. 9 is a diagram focusing on a pixel array unit to describe a third comparison example as to the pixel driving method when in thinning reading mode according to the present embodiment;

FIG. 12 is a diagram focusing on a pixel array unit to describe the pixel driving method when in thinning reading mode according to the present embodiment;

FIG. 16 is a true value chart to describe the operations of the transfer driving buffer illustrated in FIG. 15;

DESCRIPTION OF THE PREFERRED EMBODIMENTS

Figure 2A:
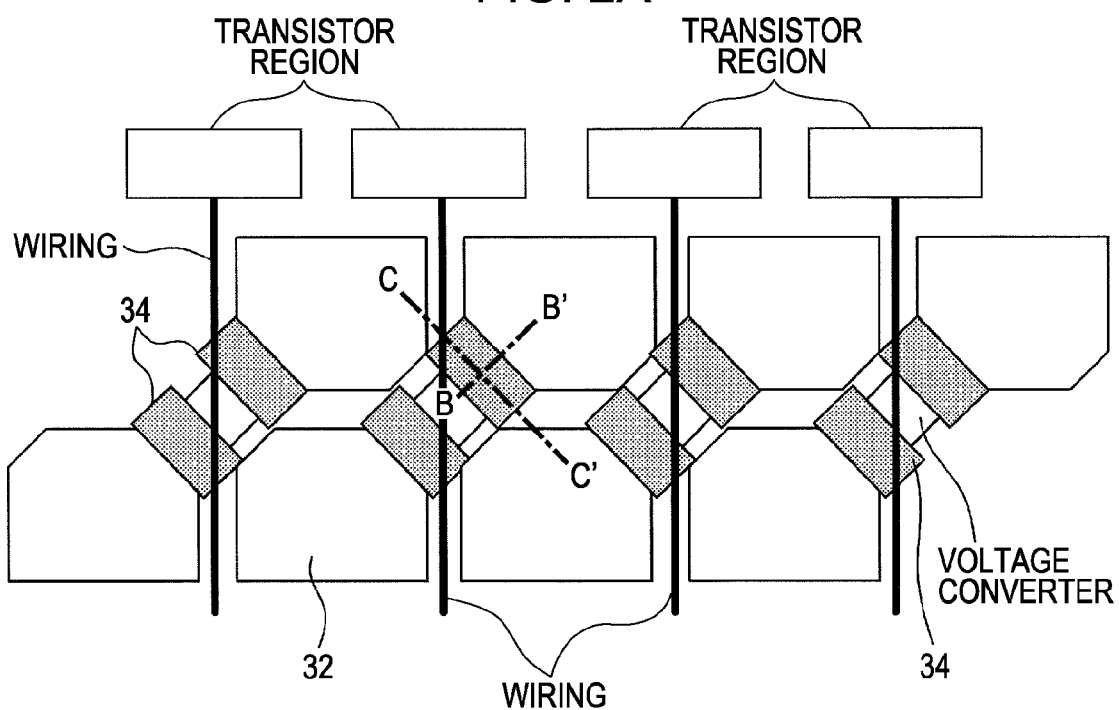
FIG. 2A is a diagram illustrating a placement layout example of various configuration elements making up a unit pixel group employed for the solid-state imaging device illustrated in FIG. 1.

Embodiments according to the present invention will be described in detail below with reference to the diagrams. Note that an example will be described below wherein a CMOS solid-state imaging device, which is an example of a solid-state imaging device of an X-Y address form, is used as a device. Also, the CMOS solid-state imaging device is described as all pixels being formed from NMOS.

In particular, with the solid-state imaging device of the present embodiment, unit configuration elements making up a pixel array unit have a feature of having a unit pixel group of a pixel sharing configuration with a configuration, wherein a portion of the elements within the unit pixels are shared with multiple unit pixels.

However, this is only one example, and the object device is not limited to a MOS-type solid-state imaging device. All of the embodiments to be described later can be similarly applied to all semiconductor devices for physical quantity distribution detecting, which are formed from multiple unit configuration elements having sensitivity as to electromagnetic waves input externally such as light or radiation beams and are arrayed linearly or in a matrix form.

<Overview of Solid-State Imaging Device>

FIG. 1 is an overall configuration diagram of a CMOS solid-state imaging device (CMOS image sensor) according to an embodiment of a solid-state imaging device relating to an embodiment of the present invention.

The solid-state imaging device 1 has a pixel unit wherein multiple pixels including light-receiving elements (an example of a charge generating unit) which output signals according to the amount of incident light are arrayed in rows and in columns (i.e. in a 2-dimensional matrix), the signal output from each pixel is a voltage signal, and a CDS (Correlated Double Sampling) processing function unit, digital converter (ADC: Analog digital Converter), and so forth are provided in parallel.

"A CDS processing function unit and a digital converter are provided in parallel" means that multiple CDS processing function units and digital converters are provided in parallel in actuality as to a vertical signal line (an example of a row signal line) 19 of a vertical column.

Each of the multiple function units may be in a form arrayed only on one edge side in the column direction (the output side disposed on the lower side of the diagram) as to a pixel array unit 10 when viewing the device as a plan view, or may be in a form arrayed by being divided into one edge side (the output side disposed on the lower side of the diagram) in the column direction as to the pixel array unit 10 and the other edge side on the opposite side thereof (the upper side of the diagram). In the case of the latter, it is desirable to divide and array the horizontal scanning units which perform reading scanning in the row direction (horizontal scanning) to each edge side, whereby each are independently operable.

For example, a typical example wherein CDS processing function units or digital converters are provided in parallel is a column-type wherein a vertical column and a CDS processing function unit or digital converter is connected one-on-one, and the CDS processing function units and other analog signal processing units or digital converters are provided at a portion called a column region, provided on the output side of the imaging unit, for each vertical column and read out sequentially to the output side. Also, this is not limited to a column-type (in parallel type), but a form wherein one CDS processing function unit or digital converter is assigned to multiple (for example, two) adjacent vertical signal lines 19 (vertical columns), or a form wherein one CDS processing function unit or digital converter is assigned to N vertical signal lines 19 (vertical columns) every N columns (N is a positive integer; N−1 columns are disposed in between), may be taken.

Except for the column-type, all forms have a configuration wherein one CDS processing function unit or digital converter share multiple vertical signal lines 19 (vertical columns), so a switchover circuit (switch) is provided to supply the pixel signals for multiple columns supplied from the pixel array unit 10 side to the one CDS processing function unit or digital converter. Note that with downstream processing, handling becomes necessary such as providing memory to hold the output signals.

Regardless, by taking a form which assigns one CDS processing function unit or digital converter as to multiple vertical signal lines 19 (vertical columns), the signal processing of each pixel signal is performed after reading in increments of pixel columns, whereby compared to performing similar signal processing within each unit pixel, the configuration within each unit pixel can be simplified, and the image sensor can be improved to have increased pixels, reduced size, and reduced cost.

Also, one row worth of pixel signals can be simultaneously processed in parallel at multiple signal processing units disposed in column-parallel, so compared to the case of performing processing with one CDS processing function unit or digital converter on the output circuit side or outside the device, the signal processing unit can be operated at a low speed, and is advantageous from the perspective of power consumption, bandwidth function, and noise. Conversely, in the case of keeping the power consumption and bandwidth function the same, the overall sensor is enabled to operate at a high speed.

Note that in the case of a column-type configuration, operations can be performed at low speed which is advantageous from the perspective of power consumption, bandwidth function, and noise, while there is also the advantage that a switchover circuit (switch) is not needed. With the embodiments below, unless particularly mentioned, this column-type will be described.

As shown in FIG. 1, the solid-state imaging device 1 of the present embodiment has a pixel array unit 10 which is also called a pixel unit or imaging unit, wherein a unit pixel group 2 of a pixel-sharing configuration having a configuration of a portion of elements within a unit pixel 3 shared with multiple unit pixels 3 is arrayed in rows and columns, a driving control unit 7 provided on the outer side of the pixel array unit 10, a reading current source unit 24 which supplies operating current (reading current) for reading the pixel signals to the unit pixels 3 of the pixel array unit 10, a column processing unit 26 having a column A/D circuit 25 disposed every vertical column, a reference signal generating unit 27 supplying a reference signal Vslop for A/D conversion to the column processing unit 26, and an output circuit 28. These various function units are provided on the same semiconductor board.

Note that the reference signal Vslop only needs to have a waveform which changes to a linear form at a certain slope overall, and the change thereof can have a smooth slope shape or can change sequentially in a staircase pattern.

A column A/D circuit 25 of the present embodiment has a function for an A/D converter which converts a reset level Srst and signal level Ssig which are standard levels of a pixel signal So independently into digital data, and a function for a difference processing unit which obtains digital data for signal components shown as the difference between the reset level Srst and signal level Ssig, by executing difference processing between the A/D conversion results of the reset level Srst and the A/D conversion results of the signal level Ssig.

Note that at an earlier stage or later stage of the column processing unit 26, an AGC (Automatic Gain Control) circuit having a signal amplifying function as needed, or the like, can be provided on the same semiconductor region as the column processing unit 26. In the case of performing AGC at the earlier stage of the column processing unit 26, the amplification is analog amplifying, and in the case of performing AGC downstream of the column processing unit 26, the amplification is digital amplifying. If the digital data of n bits is simply amplified, gradation can be lost, so it is more desirable than not to perform digital conversion after analog amplifying.

The driving control unit 7 has a control circuit function for sequentially reading the signal of the pixel array unit 10. For example the driving control unit 7 has a horizontal scanning circuit (column scanning circuit) 12 including a horizontal decoder 12a and horizontal driving unit 12b to control column address and column scanning, a vertical scanning circuit (row scanning circuit) 14 including a vertical decoder 14a and vertical driving unit 14b to control row address and row scanning, and a communication/timing control unit 20 having a function to generate an internal clock and so forth.

Note that although omitted from the diagrams, as an example of a high-speed clock generating unit, a clock converter which generates a pulse of a high-speed clock frequency greater than the input clock frequency may be provided. The communication/timing control unit 20 generates an internal clock based on the high-speed clock generated with an input clock (master clock) CLK0, which is input via a terminal 5a, or a clock converter.

By employing a signal having a high-speed clock generated at the clock converter as the source thereof, the A/D converter processing and the like can be operated at high speed. Also, movement extracting or compression processing which requires high-speed calculations can be performed employing a high-speed clock. Also, parallel data output from the column processing unit 26 can be converted to serial data, whereby picture data D1 can be output to the outside of the device. Thus, a configuration can be made to perform high-speed operation output with few terminals than the bits of digital data subjected to A/D conversion.

In FIG. 1, a portion of the rows and columns are omitted for simplification, but in reality, each row and each column has several tens to several thousands of unit pixels 3 (actually, unit pixel groups 2) disposed therein. The unit pixel 3 is typically made up of a photodiode serving as a light-receiving element which is an example of a detecting unit (charge generating unit) and an inner-pixel amplifier having a semiconductor device for amplification (for example a transistor).

An inner pixel amplifier only needs to be able to output a signal charge generated and accumulated at the charge generating unit of the unit pixel 3 as an electrical signal, and can take various configurations, but generally a floating diffusion amplifier configuration is employed. As an example, a configuration can be used which is made up of four general-use transistors serving as CMOS sensors which have a transfer unit having a reading selection transistor serving as one example of a charge reading unit (transfer gate unit/reading gate unit) as to the charge generating unit, an initializing unit having a reset transistor serving as one example of a reset gate unit, a vertical selection transistor, and an amplifying transistor of a source-follower configuration serving as one example of a detecting element to detect potential change in the floating diffusion (also called floating node) (for example, see FIG. 2A to be described later).

Alternatively, a configuration made up of three transistors can be used, having an amplifying transistor connected to a drain line (DRN) for amplifying the signal voltage corresponding to the signal charge generated at the charge generating unit, a reset transistor for resetting the charge generating unit, and a reading selection transistor (transfer gate unit) to scan from the vertical shift register via the transfer wiring (TRF).

Note that the solid-state imaging device 1 can use a color-separation filter to enable the pixel array unit 10 to handle color imaging. That is to say, color image imaging can be handled by providing one of a color filter from a color separation filter made up of a combination of color filters of multiple colors for the purpose of imaging a color image, with the so-called Bayer array for example, on a light-receiving surface wherein electromagnetic waves (light, in the present example) of each charge generating unit (photodiode or the like) is incident, with the pixel array unit 10.

The unit pixels 3 are each connected to the vertical scanning unit 14 via a row control line 15 for row selection, and the column processing unit 26 wherein the column A/D circuit 25 is provided for each vertical column via the vertical signal line 19. The row control line 15 shows the entire wiring entering the pixel from the vertical scanning unit 14.

The horizontal scanning circuit 12 has a function of a reading scanning unit to read the count value from the column processing unit 26 to the horizontal signal line 18.

Each element of the driving control unit 7 such as the horizontal scanning unit 12 or vertical scanning circuit 14 is formed in an integrated manner with the pixel array unit 10 as well as a semiconductor region such as a single-crystal silicon employing a similar technique as with a semiconductor integrated circuit manufacturing technique, and is configured as a solid-state imaging device which is an example of a semiconductor system.

These function units are configured to form a portion of the solid-state imaging device 1 of the present embodiment serving as a CMOS image sensor which is an example of the semiconductor system, as a so-called one-chip (that which is provided on the same semiconductor board) which is formed in an integrated manner on the semiconductor region such as a single-crystal silicon employing a similar technique as with a semiconductor integrated circuit manufacturing technique.

Note that the solid-state imaging device 1 may be thus formed as one chip which is formed with each portion in an integrated manner with the semiconductor region, or although omitted from the diagram may be formed as a module having an imaging function with, in addition to various signal processing units such as the image array unit 10, driving control unit 7, column processing unit 26 and so forth, an optical system such as a photographing lens, optical low-pass filter, or infrared light cutting filter and so forth packaged together.

The horizontal scanning unit 12 and vertical scanning unit 14 are configured to include a decoder, for example, and arranged to start shifting operations (scanning) in response to control signals CN1 and CN2 provided from the communication/timing control unit 20. Therefore for example, the row control line 15 includes various pulse signals for driving the unit pixels 3 (for example, a pixel reset pulse RST to regulate the initializing control potential, a transfer pulse TRG to regulate the transfer control potential, a vertical selection pulse VSEL, and so forth).

The communication/timing control unit 20 receives, though not shown in the drawings, a function block of a timing generator TG (an example of a reading address control device) supplying a clock necessary for operation of various portions or a predetermined timing pulse signal, and a master clock CLK0 supplied externally from a main control unit via the terminal 5a, and receives data to instruct the operation mode and so forth which is supplied externally from the main control unit via the terminal 5b, and further has a communication interface function block to output data including the information of the solid-state imaging device 1 to the external main control unit.

The communication/timing control unit 20 outputs a horizontal address signal to the horizontal decoder 12a and outputs a vertical address signal to the vertical decoder 14a, for example, whereby the decoders 12a and 14a respectively select the corresponding row or column.

In this event, the unit pixel group 2 (in reality, unit pixels 3) are disposed in a 2-dimensional matrix, so the analog pixel signals generated by the pixel signal generating unit 5 and output in the column direction via the vertical signal line 19 are accessed and imported in increments of rows (in column-parallel) to perform (vertical) scan reading, following which the pixel signals are accessed in the row direction which is the order direction of the vertical columns, and (horizontal) scan reading to read the pixel signals (digitized pixel data in the present example) to the output side is performed, whereby increased speed of reading the pixel signals or pixel data can be achieved. It goes without saying that this is not limited to scan reading, but by directly specifying the address of the unit pixels 3 to be read, random access to read only the information of the necessary unit pixels 3 can be read.

Also, with the communication/timing control unit 20, the clock CLK1 having the same frequency as the input clock (master clock) CLK0 which is input via the terminal 5a, or a clock which frequency-divides this in two, or a low-speed clock which is further frequency-divided, is supplied to the various units within the device, such as the horizontal scanning unit 12, vertical scanning unit 14, column processing unit 26, and so forth. Hereafter, the clocks divided in half and the clocks further frequency-divided will also be collectively called a low-speed clock CLK2.

The vertical scanning unit 14 selects a row of the pixel array unit 10, and supplies the necessary pulse to the row thereof. For example, the vertical scanning unit 14 has a vertical decoder 14a which regulates the reading row in the vertical direction (selects a row of the pixel array unit 10), and a vertical driving unit 14b which supplies a pulse for driving to the row control line 15 as to the unit pixel 3 of the reading address (row direction) which is regulated with the vertical decoder 14a. Note that the vertical decoder 14a selects rows for electronic shuttering in addition to rows for reading signals.

Thus, with the X-Y address form of imaging device, as with the solid-state imaging device 1 of a CMOS form of the present embodiment, an accumulation sequence reading method to read each pixel every accumulation frame time is used, whereby a driving pulse is supplied in increments of rows in this case, whereby the incident light in the photoelectric converting element during the same time period is accumulated as a signal charge, and differs greatly from an accumulation simultaneous reading method which fulfills simultaneity of accumulation by reading simultaneously from all pixels into the vertical CCD, i.e. a CCD form with Global Exposure, and is also called a line exposure (Rolling Shutter) or focal plane accumulation.

Regarding the electronic shutter operation of the Rolling Shutter method, from the point-in-time that a certain reading row is set to a shutter operation row and that reset processing is performed as to the photoelectric converting element (detecting unit) which configures the unit pixel 3, until the time that the reading row thereof is set to the reading operation row and the signal charge is actually read to the vertical signal line 19 side, is the exposure time.

The horizontal scanning unit 12 is synchronized to the low-speed clock CLK2 and sequentially selects the column A/D circuit 25 of the column processing unit 26, and guides the signal thereof to the horizontal signal line (horizontal output line) 18. For example, the horizontal scanning unit 12 has a horizontal decoder 12a which regulates the reading column in the horizontal direction (selects individual column A/D circuits 25 within the column processing unit 26) and a horizontal driving unit 12b which guides the various signals of the column processing unit 26 to the horizontal signal line 18 according to the reading addresses regulated with the horizontal decoder 12a. Note that the number of bits n (n is a positive integer) handled by the column A/D circuit 25 is the number of horizontal signal lines 18 disposed, e.g. if 10 (=n) bits, then 10 horizontal signal lines 18 are disposed corresponding to this bit count number.

With the solid-state imaging device 1 with such a configuration, the pixel signal output from the unit pixel 3 is supplied to the column A/D circuit 25 of the column processing unit 26 via the vertical signal line 19 for each vertical column.

The various column A/D circuits 25 of the column processing unit 26 receive an analog signal So of the unit pixel 3 of the corresponding column, and processes the analog signal So thereof. For example, the various column A/D circuits 25 have an ADC (Analog Digital Converter) circuit which employs the low-speed clock CLK2 for example, to convert the analog signal So to a 10-bit digital signal for example.

Regarding A/D converting processing with the column processing unit 26, a method can be taken wherein the analog signal So which is held in parallel in row increments is subjected to A/D conversion by each row in parallel, using the column A/D circuit 25 provided for each column. In this event, a single-slope integration type (or a ramp signal comparison type) of A/D conversion method is used. This method can be realized by an A/D converter with a simple configuration, so even if provided in parallel, the circuit scale is not excessive.

Regarding the single-slope integration type of A/D conversion, the analog signal to be processed is converted to a digital signal, based on the time from the start of conversion until the reference signal Vslop and the signal voltage to be processed matches. An arrangement to realize this in principle supplies a ramp-form of reference signal Vslop to a comparator (voltage comparing unit), while starting the count (total number) with the clock signal, and A/D conversion is performed by comparing the analog pixel signal input via the vertical signal line 19 with the reference signal Vslop, and counting the clock counts until the pulse signal showing comparison results is obtained.

Also, in this event, by arranging the circuit configuration innovatively, along with A/D conversion, processing can be performed to take the difference between the signal level immediately following pixel resetting (called noise level or reset level) and a true (according to receiving light quantity) signal level Vsig (equivalent value as so-called CDS processing) as to the pixel signal of the voltage mode input via the vertical signal line 19. Thus, noise signal components called fixed pattern noise (FPN) or reset noise can be removed.

<Details of Reference Signal Generating Unit and Column A/D Circuit>

The reference signal generating unit 27 is configured to have a D/A converting circuit (DAC; Digital Analog Converter) 27a, which is synchronized with a count clock CKdac from the initial value shown in the control data CN4 from the communication/timing control unit 20, generates a saw-tooth wave in a staircase pattern (ramp waveform; hereafter may be also called reference signal Vslop), and supplies the generated reference signal Vslop of the saw-tooth wave in a staircase pattern to the individual column A/D circuits 25 of the column processing unit 26 as a reference voltage for A/D conversion (ADC standard signal). Note that although omitted from the diagram, providing a noise prevention filter is desirable.

Note that the reference signal Vslop can be changed at a higher speed by setting the high-speed clock which is generated based on a multiplying clock generated with a multiplying circuit to a reference clock for example, than by generating based on the master clock CLK0 which is input via the terminal 5a.

So that the reference signal Vslop for each comparison processing becomes basically the same slope (change rate), the control data CN4 which is supplied from the communication/timing control unit 20 to the D/A converting circuit 27a of the reference signal generating unit 27 includes information to cause the change rate of the digital data as to the time to be the same. Specifically, the control data is synchronized to the count clock CKdac, the count value is changed by one for each unit of time, and the count value thereof is converted to a voltage signal with the D/A converting circuit of a current adding type.

The column A/D circuit 25 has an n-bit A/D conversion function configured with a reference signal Vslop which is generated at the D/A conversion circuit 27a of the reference signal generating unit 27, a voltage comparison unit (comparator) 252 which compares the analog pixel signals obtained via the vertical signal lines 19 (H1, H2, . . . , Hh) from the unit pixels 3 for each row control line 15 (V1, V2, V3, . . . Vv as to the unit pixel group 2: more specifically, row control lines of the unit pixels 3), and a counter unit 254 which counts the time and holds the result thereof until the voltage comparison unit 252 completes comparison processing.

With the present embodiment, the reference signal Vslop is supplied to the voltage comparison units 252 disposed by column from the D/A conversion circuit 27a in a common manner, and each voltage comparison unit 252 employs a common reference signal Vslop to perform comparison processing for the corresponding assigned pixel signal voltage Vx.

The communication/timing control unit 20 has a control unit function to switch the count processing mode with the counter unit 254, according to whether the voltage comparison unit 252 performs which comparison processing of the reset level Vrst of the pixel signal or the signal component Vsig. A control signal CN5 for instructing the counter unit 254 whether to operate in down-count mode or whether to operate in up-count mode, or for instructing other control information, is input into the counter unit 254 of each column A/D circuit 25 from the communication/timing control unit 20.

A staircase pattern reference signal Vslop which is generated at the reference signal generating unit 27 is input into an input terminal RAMP on one side of the voltage comparison unit 252 and into the input terminal RAMP of another voltage comparison unit 252 in a common manner, and pixel signal voltage from the pixel array unit 10 is individually input into the other input terminal, wherein the vertical signal lines 19 of the corresponding vertical columns are respectively connected. Output signals of the voltage comparison unit 252 are supplied to the counter unit 254.

A counting clock CK0 is input into a clock terminal CK of the counter unit 254 from the communication/timing control unit 20 and into the clock terminal CK of another counter unit 254 in a common manner.

This counter unit 254 can be realized by modifying the wiring formation of the data storage unit configured with a latch into a synchronizing counter format, although the configuration of the counter unit 254 is omitted from the diagrams, whereby inputting one counting clock CK0 enables internal counting to be performed. The counting clock CK0 also can use a multiplying clock (high-speed clock) generated with a multiplying circuit, similar to the reference signal Vslop, and in this case, can have a higher resolution than using the master clock CLK0 which is input via the terminal 5a.

The counter unit 254 is configured so as to enable common up/down counting (U/D CNT) regardless of the counting mode, to perform counting processing by switching between down-count operation and up-count operation (specifically, alternately).

Also, regarding a counter unit 254 of the present embodiment, it is desirable to use an asynchronous counter wherein the count output value is output without synchronizing with the counting clock CK0. Basically, a synchronizing counter can be used, but in the case of a synchronizing counter, all of the flip-flop (basic counter elements) operations are restricted at the counting clock CK0. Accordingly, in the case that a higher-frequency operation is required, use of an asynchronous counter unit 254 is more desirable, which is appropriate to high-speed operations since the operation restriction frequency operations are determined only by the restriction frequency of the first flip-flop (basic counter element).

A control pulse is input into the counter unit 254 from the horizontal scanning circuit 12 via the control line 12c. The counter unit 254 has a latch function which holds the counting results, and holds the counter output values until there is instruction from the control pulse via the control line 12c.

The output side of the individual column A/D circuits 25 can have the output of the counter unit 254 connected to the horizontal signal lines 18. Alternatively, as shown in the diagram, a configuration can be arranged which has a data storage unit 256 serving as an n-bit memory which holds the count results held by the counter unit 254, and a switch 258 disposed between the counter unit 254 and the data storage unit 256, downstream of the counter unit 254.

In the case of arranging a configuration having a data storage unit 256, a memory transfer instruction pulse CN8 serving as a control pulse is supplied to the switch 258 from the communication/timing control unit 20 at a predetermined timing, in a common manner with another vertical column switch 258. Upon being supplied with the memory transfer instruction pulse CN8, the switch 258 transfers the count value of the corresponding counter unit 254 to the data storage unit 256. The data storage unit 256 holds and stores the transferred count value.

Note that an arrangement wherein the count value of the counter unit 254 is held by the data storage unit 256 at a predetermined timing is not limited to the configuration wherein a switch 258 is disposed therebetween, and for example can be realized by the counter unit 254 and the data storage unit 256 being directly connected, while output enabling of the counter unit 254 is controlled with the memory transfer instruction pulse CN8, and the memory transfer instruction pulse CN8 is employed as a latch clock which determines the data importing timing of the data storage unit 256.

A control pulse is input into the data storage unit 256 from the horizontal scanning circuit 12 via the control line 12c. The data storage unit 256 holds the count value imported from the counter unit 254 until instructions are given from the control pulse via the control line 12c.

The horizontal scanning circuit 12 has a function of a reading scanning unit which reads the count value held by each data storage unit 256, wherein each voltage comparison unit 252 of the column processing unit 26 and the counter units 254 perform the corresponding assigned processing.

The output of the data storage unit 256 is connected to the horizontal signal line 18. The horizontal signal line 18 has a signal line n-bits in width which is the bit width of the column A/D circuit, and is connected to the output circuit 28 via n sensor circuits corresponding to the unshown respective output lines.

Particularly, with a configuration having a data storage unit 256, the count results held by the counter unit 254 can be transferred to the data storage unit 256, whereby the counting operation of the counter unit 254, i.e. A/D conversion processing, and reading operations to the horizontal signal line 18 of the count results can be independently controlled, and a pipeline operation can be realized wherein A/D conversion processing and reading operations of the signal to the outside can be performed in parallel.

With such a configuration, the column A/D circuit 25 performs counting operations during a pixel signal reading period equating to a horizontal blanking period, and outputs the count results at a predetermined timing. That is to say, first, the voltage comparison unit 252 compares the ramp waveform voltage from the reference signal generating unit 27 and the pixel signal voltage which is input via the vertical signal line 19, and when the voltage of both are the same, the comparator output of the voltage comparison unit 252 is inverted. For example, with the voltage comparison unit 252, when the H-level of power source potential is in an inactive state, and the pixel signal voltage Vx and reference signal Vslop matches, the potential is transitioned to an L-level (active state).

The counter unit 254 starts a counting operation in a down-count mode or up-count mode synchronized to the ramp waveform voltage which is generated at the reference signal generating unit 27, and the information of the inverted comparator output is notified to the counter unit 254, whereby the counting operation is stopped and the counting value at that point-in-time is latched (held/stored) as the pixel data, thereby completing the A/D conversion.

Following this, the counter unit 254 sequentially outputs the pixel data which is stored/held to the outside of the column processing unit 26 and outside of the chip having a pixel array unit 10, from the output terminal 5c, based on shifting operations from the horizontal selection signal CH(i) which is input from the horizontal scanning circuit 12 at a predetermined timing via the control line 12c.

Note that there are cases wherein other various types of signal processing circuits are included in the configuration elements of the solid-state imaging device 1, but are not particularly shown in the diagrams as these are not directly related for the description of the present embodiment.

<Circuit Configuration Example of Unit Pixel Group>

Figure 2B:
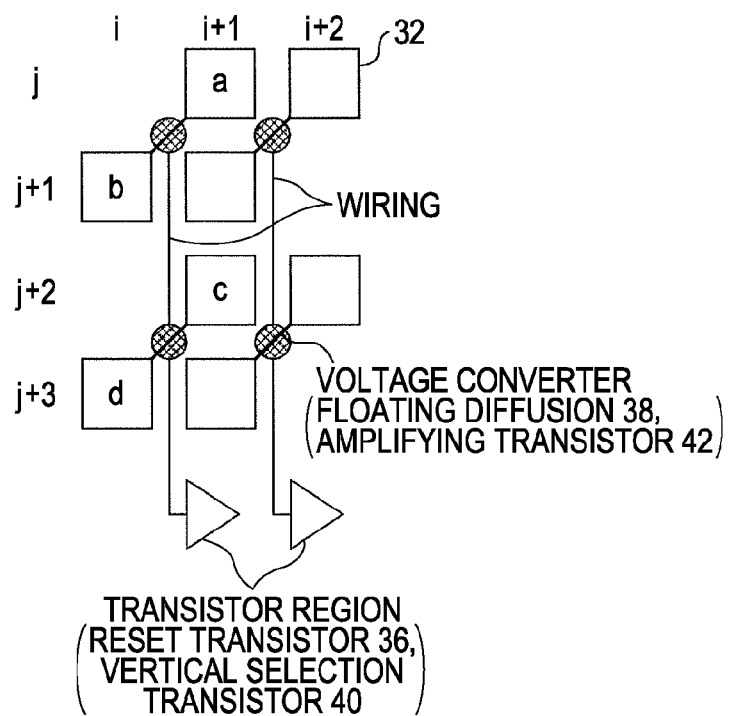
FIG. 2B is a diagram illustrating the configuration example of a unit pixel group employed for the solid-state imaging device illustrated in FIG. 1 and a connection state between a driving unit and a driving control line and a pixel transistor.
Figure 2C:
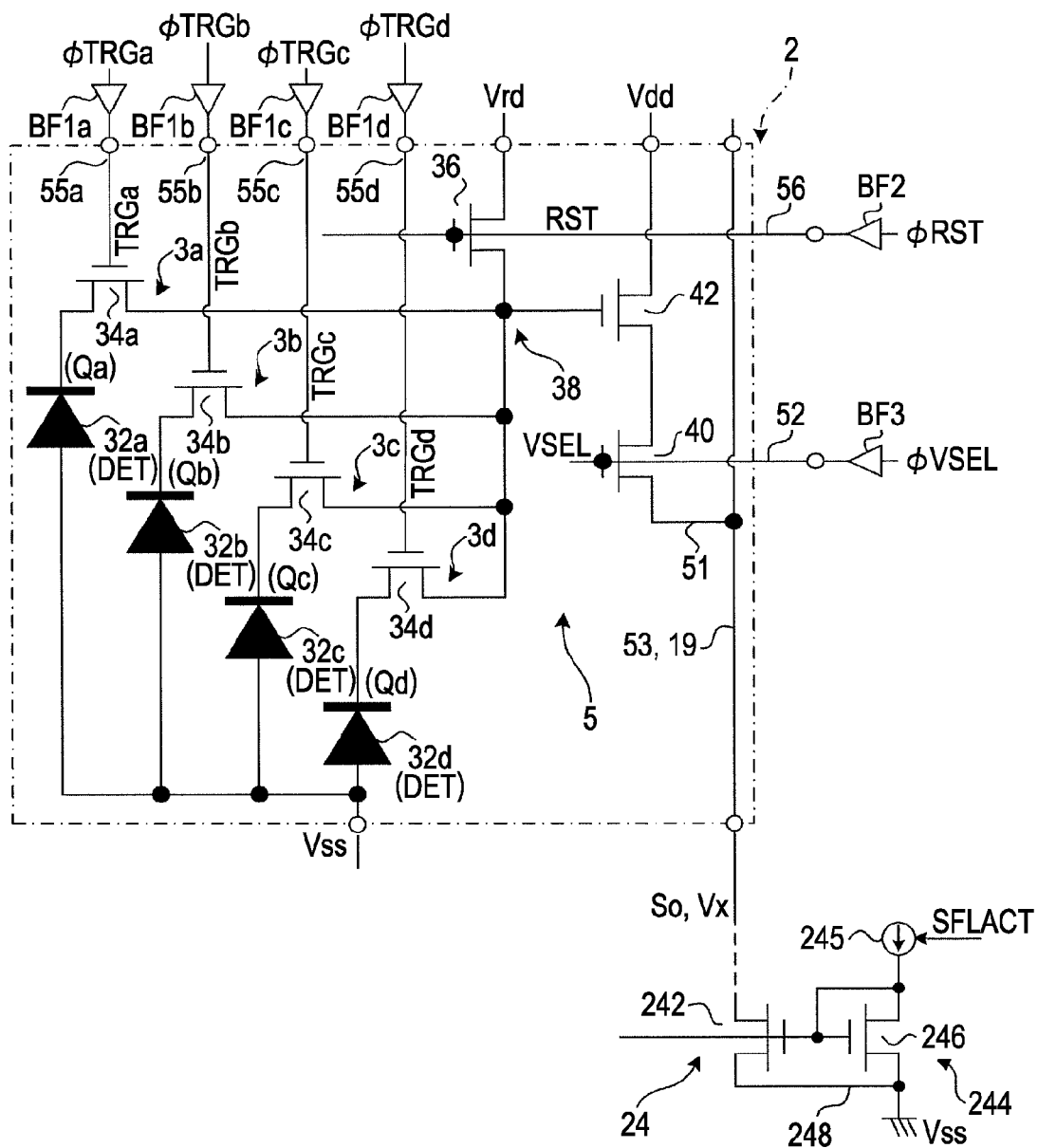
FIG. 2C is a diagram illustrating a placement layout example of various configuration elements making up a unit pixel group employed for the solid-state imaging device illustrated in FIG. 1.

FIGS. 2A, 2B, and 2C are diagrams to describe a configuration example of the unit pixel group 2 which is employed in the solid-state imaging device 1 shown in FIG. 1. FIGS. 2A and 2B are diagrams showing a placement layout example of various configuration elements making up a unit pixel group 2. Also, FIG. 2C is a diagram illustrating the circuit configuration example of a unit pixel group 2 thereof and a connection state between a driving unit and a driving control line and a pixel transistor. The configuration of the unit pixel group 2 within the pixel array unit 10 has a feature of having a pixel sharing configuration wherein a portion of the elements within the pixel element 3 is shared by multiple unit pixels 3.

As an example of the pixel sharing configuration, a case of 4-pixel sharing will be shown wherein four unit pixels 3 are combined to configure a unit pixel group 2. Note that the unit pixels 3 and the configuration of the unit pixel group 2 made up of a combination thereof is one example, and should not be limited to that shown here. For example, with the configuration shown in FIG. 2C, one unit pixel group 2 is made up of four unit pixels 3, but should not be limited to this, and for example, one unit pixel group 2 may be configured with two or eight unit pixels 3.

Note that the configuration of the unit pixels (pixel cell) 3 making up the unit pixel group 2 within the pixel array unit 10 is similar to that of a normal CMOS image sensor, and with the present embodiment, a general-use 4-TR configuration, or a 3-TR configuration made up of three transistors, can be used as a CMOS sensor. It goes without saying that these pixel configurations are only examples, and any normal CMOS image sensor array configuration can be used.

Also, for an inner-pixel amplifier, for example a floating diffusion amplifier configuration can be employed. As an example, a configuration can be used which is made up of four general-use transistors serving as CMOS sensors which have a reading selection transistor serving as one example of a charge reading unit (transfer gate unit/reading gate unit) as to the charge generating unit, a reset transistor serving as one example of a reset gate unit, a vertical selection transistor, and an amplifying transistor of a source-follower configuration serving as one example of a detecting element to detect potential change in the floating diffusion (hereafter also called 4TR configuration).

On the layout surface, in the case of using the unit pixels 3 in a 4TR configuration as a basis, as shown in FIGS. 2A and 2B, wiring is provided to electrically connect a charge generating unit 32 which has each function of a photoelectric converting function which receives light and converts this into charge and a charge-accumulating function to accumulate the charge thereof, a voltage converter which converts the signal charge generated by photoelectric conversion at the charge-generating unit 32 into a voltage signal, a reading selection transistor 34 (transfer transistor) which is an example of the charge reading unit (transfer gate unit/reading gate unit) to control the charge reading from the charge generating unit 32 to the voltage converter, a transistor region wherein a circuit group is disposed to perform processing as to the charge transferred to the voltage converter and the voltage signal converted at the voltage converter, and the circuit group with the voltage converter and transistor region.

As shown in FIG. 2B, the voltage converter has a floating diffusion 38, which is a diffused layer with a parasitic capacity for example, and an amplifying transistor 42 of a source-follower configuration, which is an example of a detecting element to detect the potential changes of the floating diffusion 38, as the primary components thereof. It is generally known that the smaller the parasitic capacity of the floating diffusion 38, the more the conversion efficiency can be increased.

Such a unit pixel group 2 has a major feature in the placement layout of the various configuration elements. Specifically, as shown in FIG. 2A, an arrangement is made wherein, as to the charge generating unit 32 disposed in a 2-dimensional array made up of multiple columns and multiple rows, one voltage converter is disposed between two charge generating units 32 which are diagonally adjacent within the 2-dimensional array, and one voltage converter or transistor region is shared via the reading selection transistor 34 wherein two charge generating units 32 are attached to each charge generating unit 32.

Sharing is performed as shown in FIG. 2B, for example, wherein in a 2-dimensional array made up of i, i+1, i+2, . . . columns and j, j+1, j+2, . . . rows, the charge generating unit 32a with the coordinates (i+1, j) and the charge generating unit 32b with the coordinates (i, j+1) each share a voltage converter configured with one floating diffusion 38 and amplifying transistor 42, and also the charge generating unit 32c with the coordinates (i+1, j+2) and the charge generating unit 32d with the coordinates (i, j+3) each share another voltage converter configured with one floating diffusion 38 and amplifying transistor 42.

Also, as shown in FIGS. 2A and 2B, between charge generating units 32 with no voltage converters disposed, a transistor region is provided, and a circuit group with the transistor region is arranged wherein two charge generating units 32 which are electrically connected to the circuit group via wiring share the circuit group. At this time, the shared circuit group can be a reset transistor 36 which is an example of the reset gate unit or vertical selection transistor 40 as shown in FIG. 2C, but let us say that the various circuit elements are disposed in a manner dispersed over multiple transistor regions.

That is to say, with the solid-state imaging device 1 of the present embodiment, as shown in FIGS. 2A and 2B, two voltage converters which are parallel along the same column direction share one pair of circuit groups which are disposed in a manner dispersed over two transistor regions which are parallel along the column direction of the 2-dimensional array, while each of the voltage converters are shared by two charge generating units 32 which are diagonally adjacent within the 2-dimensional array, thus configuring a unit pixel group 2 wherein one circuit group, two voltage converters and a total of four charge generating units 32 make up one shared unit (unit block).

As shown in FIG. 2C, the unit pixel group 2 has four charge generating units 32a, 32b, 32c, and 32d, which share the circuit configuration of a configuration wherein one pixel signal generating unit 5 is made up of a floating diffusion 38 and amplifying transistor 42. Note that the pixels to be shared are to be adjacent, and in the case that the unit pixels 3 are arrayed in a square matrix, the adjacent direction can be any of a vertical direction or a horizontal direction of the screen, or both (i.e. diagonal). With the present embodiment, four unit pixels 3 are shared in the row direction (vertical direction) to configure one unit pixel group 2.

One unit pixel group 2 is configured with four unit pixels 3 so as to share a charge-voltage converter (specifically the pixel signal generating unit 5) of a FDA configuration between four pixels, so the reading selection transistor 34 has a function serving as means to transfer the signal charge accumulated in the multiple (four with the present example) charge generating units 32 to a shared pixel signal generating unit 5, and the reading selection transistor 34 and transfer driving buffer BF1 also have independent reading selection transistors 34a, 34b, 34c, and 34d, and transfer driving buffer BF1a, BF1b, BF1c, and BF1d provided thereto, whereby signal charges Qa, Qb, Qc, and Qd are each independently moved (transferred) from the charge generating units 32a, 32b, 32c, and 32d to the floating diffusion 38.

Such a configuration can be regarded as a configuration wherein a first unit pixel 3a is configured with a charge generating unit 32a and reading selection transistor 34a and pixel signal generating unit 5, a second unit pixel 3b is configured with a charge generating unit 32b and reading selection transistor 34b and pixel signal generating unit 5, a third unit pixel 3c is configured with a charge generating unit 32c and reading selection transistor 34c and pixel signal generating unit 5, and a fourth unit pixel 3d is configured with a charge generating unit 32d and reading selection transistor 34d and pixel signal generating unit 5.

That is to say, with such a configuration, in overall a unit pixel group 2 is configured with the seven transistors, but in the case of viewing from each of the charge generating units 32a, 32b, 34c, and 34d, this is a 4TR configuration wherein a unit pixel 3 is made up of four transistors.

Note that in the case of making this for color imaging, the unit pixel 3 to be shared can be configured so as to share not only same-color pixels, but can share a charge-voltage converter (pixel signal generating unit 5) of an FDA configuration with multiple colors, or a configuration may be made to share a charge-voltage converter (pixel signal generating unit 5) of an FDA configuration with only the same-color pixels.

<Circuit Configuration Example of Unit Pixels>

The reading selection transistor 34 configuring the transfer unit is driven via a transfer wiring (reading selection line TX) 55 with a transfer driving buffer BF1 to which a transfer signal φ TRG is supplied. The reset transistor 36 configuring the initializing unit is driven by a reset driving buffer BF2 to which a reset signal φ RST is supplied, via a reset wiring (RST) 56. The vertical selection transistor 40 is driven by a selection driving buffer BF3 to which a vertical selection signal φ VSEL is supplied, via a vertical selection line (SEL) 52. The various driving buffers can be driven by the vertical driving unit 14b of the vertical scanning unit 14.

The charge generating unit 32, which is one example of a detecting unit configured with a light-receiving element DET such as a photodiode PD, has one edge of the light-receiving element DET (anode side) connected to a standard potential Vss on the low potential side (negative potential: for example approximately −1V), and the other edge thereof (cathode side) is connected to the input edge (typically the source) of the reading selection transistor 34. Note that the standard potential Vss can also be a ground potential GND.

The reading selection transistor 34 has the output edge (typically the drain) connected to a connection node wherein the reset transistor 36 and floating diffusion 38 and amplifying transistor 42 are connected, and a transfer pulse TRG is supplied to the control input edge (gate) from the transfer driving buffer BF1.

The reset transistor 36 with the pixel signal generating unit 5 has the source thereof connected to the floating diffusion 38 and the drain thereof connected to the power source Vrd (normally common with the power source Vdd), and the pixel reset pulse RST is input to the gate (reset gate RG) thereof from the reset driving buffer.

The details will be described later, but with the present embodiment, it is desirable to use a reset transistor 36 of a Depletion configuration. This is so that when the reset transistor 36 is turned on, the reset voltage Vrd to be the power source of the unit pixel 3 and the potential of the floating diffusion 38 is not scattered but rather is the same, and also to securely perform resetting and avoid residual images. When the reset power source Vrd and the power source Vdd for the amplifying transistor 42 is shared, the potential of the floating diffusion 38 when the reset transistor 36 is turned on matches overall the potential levels of the various power source lines (considering threshold voltage).

Note that if a depletion configuration is used for a reset transistor 36, leakage current can flow even when the reset transistor 36 is in an off state (non-selected). The details will be described later, but with the present embodiment, this feature is used as one method for blooming reduction when in thinning reading mode.

An example of the vertical selection transistor 40 has the drain thereof connected to the source of the amplifying transistor 42 and the source thereof connected to a pixel line 51, and the gate thereof (particularly called the vertical selection gate SELV) is connected to a vertical selection line 52. Note that this is not limited to such a connection configuration, but the placement of the vertical selection transistor 40 and amplifying transistor 42 is inverted, whereby the vertical selection transistor 40 has the drain thereof connected to the power source Vdd, and the source thereof connected to the drain of the amplifying transistor 42, and the source of the amplifying transistor 42 may be connected to a pixel line 51. The vertical selection line 52 has a vertical selection signal SEL applied thereto.

The amplifying transistor 42 has the gate thereof connected to a floating diffusion 38, the drain thereof is connected to the power source Vdd, the source thereof is connected to the pixel line 51 via the vertical selection transistor 40, and further connected to the vertical signal line 53 (19).

The transfer pulse TRG, the pixel reset pulse RST, and the vertical selection pulse VSEL generally all use an binary pulse of an active H (high; power source voltage level) and an inactive L (low; standard level). The power source voltage level can for example be approximately 3V. The standard level can be 0.4 to 0.7V or a ground level of 0V, for example, but depending on the case, a portion of pulses can be a negative potential of approximately −1V.

With the present embodiment, regarding the transfer pulse TRG supplied to the gate of the reading selection transistor 34 therein, not only is binary driving used which employs the two types of potential which are power source voltage level and standard level, but also driving which employs at least three or more types of potential including an arbitrary voltage (called 3-value driving) between the high level and low level (called intermediate voltage: includes neither high level nor low level) is also applicable.

When in normal all-pixel reading mode, binary driving to use two values on both edges within the three values is employed, but when in thinning reading mode, by appropriately employing the 3-value and the binary of both edges within the three values between the reading rows and thinning rows, blooming reduction is performed when in thinning reading mode. In order to respond thereto, control information to handle the 3-value driving (3-value control signal G) is supplied to the transfer driving buffer BF1. Appropriate usage for binary and 3-value or the 3-value control signal G will be described later in detail.

Further, the vertical signal line 53 has one edge thereof extended toward the column processing unit 26 side, while a reading current source unit 24 is connected to the path of the vertical signal line 53, and a source-follower configuration wherein a roughly fixed operation current (reading current) is supplied is arranged between the amplifying transistor 42.

Specifically, the reading current source unit 24 has a NMOS-type transistor (specifically called a load MOS transistor) 242 provided on each vertical column, and a standard current source unit 244 having a current generating unit 245 which is shared as to all vertical columns and a NMOS-type transistor 246 wherein the gate and drain thereof are connected in a common manner and the source thereof is connected to a source line 248.

Each load MOS transistor 242 has the drain thereof connected to the vertical signal line 53 of the corresponding column, and the source thereof connected in a common manner to the source line 248 which is a ground wire. Thus, the load MOS transistor 242 of each vertical column configures a current mirror circuit wherein the gates are connected to one another between the transistor 246 of the standard current source unit 244, and is connected so as to function as a power source as to the vertical signal line 19.

The source line 248 is configured to be connected to a ground (GND) which is a board bias at the edge portion (vertical column on the left and right in FIG. 1) in the horizontal direction, and the operation current (reading current) as to the ground of the load MOS transistor 242 is supplied from the left and right edges of the chip.

A load control signal SFLACT for outputting predetermined current only when needed is arranged to be supplied to the current generating unit 245 from an unshown load control unit. At the time of signal reading, by inputting an active state of the load control signal SFLACT, the current generating unit 245 can continuously flow a predetermined constant current with a load MOS transistor 242 which is connected to each amplifying transistor 42. That is to say, the load MOS transistor 242 and the amplifying transistor 42 for the selection rows make up the source follower to supply the reading current to the amplifying transistor 42, thereby outputting a signal to the vertical signal line 53.

With such a 4TR configuration, the floating diffusion 38 is connected to the gate of the amplifying transistor 42, so the amplifying transistor 42 outputs a signal corresponding to the floating diffusion 38 potential (hereafter called FD potential) in voltage mode to the vertical signal line 19 (53) via the pixel line 51.

The reset transistor 36 resets the floating diffusion 38. The reading selection transistor (transfer transistor) 34 transfers the signal charge generated at the charge generating unit 32 to the floating diffusion 38. The vertical signal line 19 has a large number of pixels connected thereto, but in order to select a pixel, the vertical selection transistor 40 only for the selection pixel is turned on. Then only the selection pixel is connected with the vertical signal line 19, and a signal for the selected pixel is output to the vertical signal line 19.

Even in the case of employing a unit pixel group 2 in such a configuration wherein a portion of multiple unit pixels 3 is shared, normal operations can be performed which individually reads the information for all of the pixels. It goes without saying that thinning reading which is another example of a high-speed method to shorten the reading processing time of the pixel signal is also possible. Detailed description will be given later, but at the time of thinning reading with the present embodiment, suitable driving is performed to counter the blooming phenomenon by the charge overflowing from the unit pixels 3 on the thinning rows, in which case driving is performed which takes into account that a pixel sharing configuration is being employed.

In order to control these various types of reading operations, the timing of the pulse signal provided to each unit pixel 3 from the communication/timing generating unit 20 is modified, whereby switching is performed between the all-pixel reading mode which is an example of a normal imaging mode and the thinning reading mode which is an example of high-speed driving mode. The controls as to the unit pixels 3 in each mode and the operations of the column A/D circuit 25 will be described later.

<Circuit Configuration Example 3 of Unit Pixels>

Figure 2D:
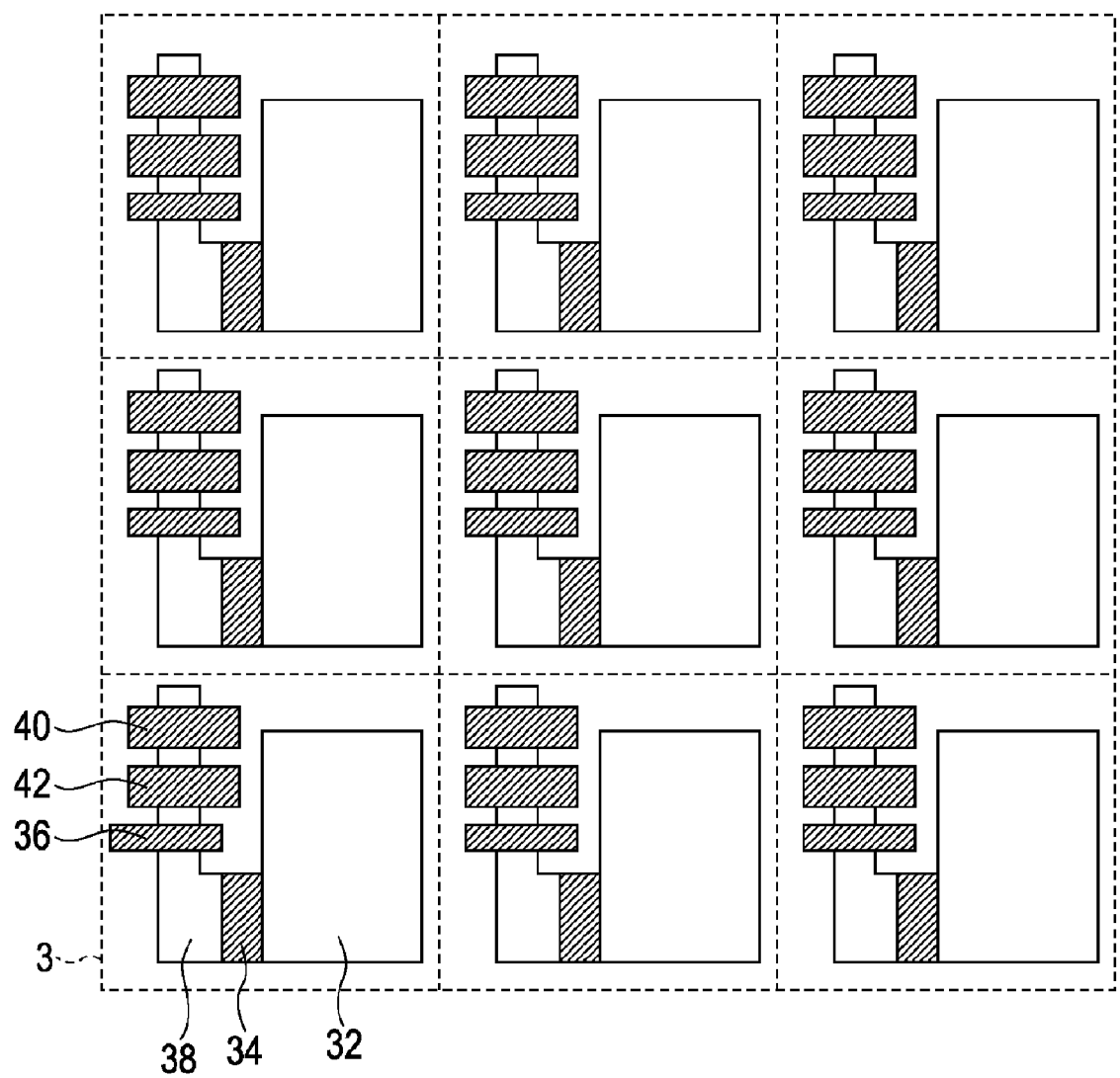
Figure 2E:
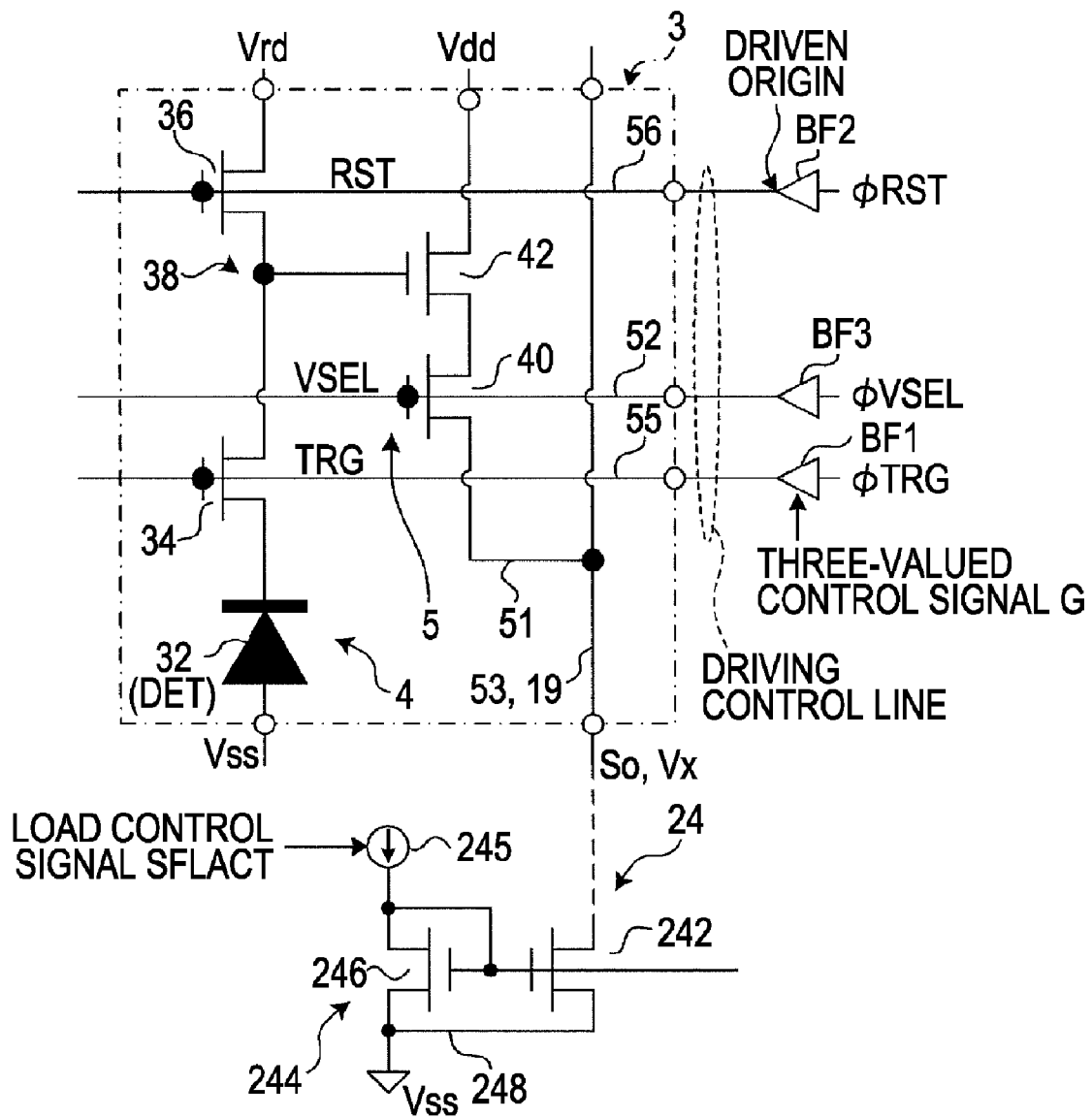

FIGS. 2D and 2E are diagrams to describe a configuration example of a unit pixel 3 employed in the solid-state imaging device 1 shown in FIG. 1. FIG. 2D is a diagram showing a pixel cell layout example of various configuration elements making up the unit pixel 3. Also, FIG. 2E is a diagram illustrating the circuit configuration example of the unit pixel 3 thereof and a connection state between a driving unit and a driving control line and a pixel transistor. The configuration of the unit pixels (pixel cell) 3 within the pixel array unit 10 is similar to that of a normal CMOS image sensor, and with the present embodiment, a general-use 4-TR configuration is described as a CMOS sensor, but a 3-TR configuration made up of three transistors can be used. It goes without saying that these pixel configurations are only examples, and any normal CMOS image sensor array configuration can be used.

For an inner-pixel amplifier, for example a floating diffusion amplifier configuration can be employed. As an example, a configuration can be used which is made up of four general-use transistors serving as CMOS sensors which have a reading selection transistor serving as one example of a charge reading unit (transfer gate unit/reading gate unit) as to the charge generating unit, a reset transistor serving as one example of a reset gate unit, a vertical selection transistor, and an amplifying transistor of a source-follower configuration serving as one example of a detecting element to detect potential change in the floating diffusion (hereafter also called 4TR configuration).

For example, the unit pixels 3 in a 4TR configuration as shown in FIG. 2E have a charge generating unit 32 which has each function of a photoelectric converting function which receives light and converts this into charge and a charge-accumulating function to accumulate the charge thereof, a reading selection transistor 34 (transfer transistor) which is an example of the charge reading unit (transfer gate unit/reading gate unit) as to the charge generating unit 32, a reset transistor 36 serving as one example of a reset gate unit, a vertical selection transistor 40, and an amplifying transistor 42 of a source-follower configuration serving as one example of a detecting element to detect potential change in the floating diffusion 38.

The unit pixel 3 has a pixel signal generating unit 5 of a FDA (Floating Diffusion Amp) configuration made up of a floating diffusion 38 which is an example of a charge inserting unit having the function of a charge accumulating unit. The floating diffusion 38 is a dispersion layer having parasitic capacity.

The reading selection transistor 34 configuring the transfer unit is driven via a transfer wiring (reading selection line TX) 55 with a transfer driving buffer BF1 to which a transfer signal φ TRG is supplied. The reset transistor 36 configuring the initializing unit is driven by a reset driving buffer BF2 to which a reset signal φ RST is supplied, via a reset wiring (RST) 56. The vertical selection transistor 40 is driven by a selection driving buffer BF3 to which a vertical selection signal φ VSEL is supplied, via a vertical selection line (SEL) 52. The various driving buffers can be driven by the vertical driving unit 14*b* of the vertical scanning unit 14.

The charge generating unit 32, which is one example of a detecting unit configured with a light-receiving element DET such as a photodiode PD, has one edge of the light-receiving element DET (anode side) connected to a standard potential Vss on the low potential side (negative potential: for example approximately −1V), and the other edge thereof (cathode side) is connected to the input edge (typically the source) of the reading selection transistor 34. Note that the standard potential Vss can also be a ground potential GND.

The reading selection transistor 34 has the output edge (typically the drain) connected to a connection node wherein the reset transistor 36 and floating diffusion 38 and amplifying transistor 42 are connected, and a transfer pulse TRG is supplied to the control input edge (gate) from the transfer driving buffer BF1.

The reset transistor 36 with the pixel signal generating unit 5 has the source thereof connected to the floating diffusion 38 and the drain thereof connected to the power source Vrd (normally common with the power source Vdd), and the pixel reset pulse RST is input to the gate (reset gate RG) thereof from the reset driving buffer.

The details will be described later, but with the present embodiment, it is desirable to use a reset transistor 36 of a Depletion configuration. This is so that when the reset transistor 36 is turned on, the reset voltage Vrd to be the power source of the unit pixel 3 and the potential of the floating diffusion 38 is not scattered but rather is the same, and also to securely perform resetting and avoid residual images. When the reset power source Vrd and the power source Vdd for the amplifying transistor 42 is shared, the potential of the floating diffusion 38 when the reset transistor 36 is turned on matches overall the potential levels of the various power source lines (considering threshold voltage).

Note that if a depletion configuration is used for a reset transistor 36, leakage current can flow even when the reset transistor 36 is in an off state (non-selected). The details will be described later, but with the present embodiment, this feature is used as one method for blooming reduction when in thinning reading mode.

An example of the vertical selection transistor 40 has the drain thereof connected to the source of the amplifying transistor 42 and the source thereof connected to a pixel line 51, and the gate thereof (particularly called the vertical selection gate SELV) is connected to a vertical selection line 52. Note that this is not limited to such a connection configuration, but the placement of the vertical selection transistor 40 and amplifying transistor 42 is inverted, whereby the vertical selection transistor 40 has the drain thereof connected to the power source Vdd, and the source thereof connected to the drain of the amplifying transistor 42, and the source of the amplifying transistor 42 may be connected to a pixel line 51. The vertical selection line 52 has a vertical selection signal SEL applied thereto.

The amplifying transistor 42 has the gate thereof connected to a floating diffusion 38, the drain thereof is connected to the power source Vdd, the source thereof is connected to the pixel line 51 via the vertical selection transistor 40, and further connected to the vertical signal line 53 (19).

The transfer pulse TRG, the pixel reset pulse RST, and the vertical selection pulse VSEL generally all use an binary pulse of an active H (high; power source voltage level) and an inactive L (low; standard level). The power source voltage level can for example be approximately 3V. The standard level can be 0.4 to 0.7V or a ground level of 0V, for example, but depending on the case, a portion of pulses can be a negative potential of approximately −1V.

With the present embodiment, regarding the transfer pulse TRG supplied to the gate of the reading selection transistor 34 therein, not only is binary driving used which employs the two types of potential which are power source voltage level and standard level, but also driving which employs at least three or more types of potential including an arbitrary voltage (called 3-value driving) between the high level and low level (called intermediate voltage: includes neither high level nor low level) is also applicable.

When in normal all-pixel reading mode, binary driving to use two values on both edges within the three values is employed, but when in thinning reading mode, by appropriately employing the 3-value and the binary of both edges within the three values between the reading rows and thinning rows, blooming reduction is performed when in thinning reading mode. In order to respond thereto, control information to handle the 3-value driving (3-value control signal G) is supplied to the transfer driving buffer BF1. Appropriate usage for binary and 3-value or the 3-value control signal G will be described later in detail.

Further, the vertical signal line 53 has one edge thereof extended toward the column processing unit 26 side, while a reading current source unit 24 is connected to the path of the vertical signal line 53, and a source-follower configuration wherein a roughly fixed operation current (reading current) is supplied is arranged between the amplifying transistor 42.

Specifically, the reading current source unit 24 has a NMOS-type transistor (specifically called a load MOS transistor) 242 provided on each vertical column, and a standard current source unit 244 having a current generating unit 245 which is shared as to all vertical columns and a NMOS-type transistor 246 wherein the gate and drain thereof are connected in a common manner and the source thereof is connected to a source line 248.

Each load MOS transistor 242 has the drain thereof connected to the vertical signal line 53 of the corresponding column, and the source thereof connected in a common manner to the source line 248 which is a ground wire. Thus, the load MOS transistor 242 of each vertical column configures a current mirror circuit wherein the gates are connected to one another between the transistor 246 of the standard current source unit 244, and is connected so as to function as a power source as to the vertical signal line 19.

The source line 248 is configured to be connected to a ground (GND) which is a board bias at the edge portion (vertical column on the left and right in FIG. 1) in the horizontal direction, and the operation current (reading current) as to the ground of the load MOS transistor 242 is supplied from the left and right edges of the chip.

A load control signal SFLACT for outputting predetermined current only when needed is arranged to be supplied to the current generating unit 245 from an unshown load control unit. At the time of signal reading, by inputting an active state of the load control signal SFLACT, the current generating unit 245 can continuously flow a predetermined constant current with a load MOS transistor 242 which is connected to each amplifying transistor 42. That is to say, the load MOS transistor 242 and the amplifying transistor 42 for the selection rows make up the source follower to supply the reading current to the amplifying transistor 42, thereby outputting a signal to the vertical signal line 53.

With such a 4TR configuration, the floating diffusion 38 is connected to the gate of the amplifying transistor 42, so the amplifying transistor 42 outputs a signal corresponding to the floating diffusion 38 potential (hereafter called FD potential) in voltage mode to the vertical signal line 19 (53) via the pixel line 51.

The reset transistor 36 resets the floating diffusion 38. The reading selection transistor (transfer transistor) 34 transfers the signal charge generated at the charge generating unit 32 to the floating diffusion 38. The vertical signal line 19 has a large number of pixels connected thereto, but in order to select a pixel, the vertical selection transistor 40 only for the selection pixel is turned on. Then only the selection pixel is connected with the vertical signal line 19, and a signal for the selected pixel is output to the vertical signal line 19.

<Pixel Configuration>

FIG. 3 is a schematic diagram of density distribution (profile) cross-section configuration of the unit pixels 3 making up the unit pixel group 2 shown in FIGS. 2A and 2B taking the B-B' cross-section and C-C' cross-section focusing on the charge generating unit 32 and floating diffusion 38. FIG. 3A is an example of a potential cross-sectional diagram of the A-A' cross-section in FIG. 3 and the B-B' cross-section in FIG. 2A.

As an example, a p-type impurity (P-well) serving as a semiconductor layer of a second conductivity type is formed on a n-type silicon substrate (semiconductor substrate NSUB of first conductivity type), and a photodiode PD, having a charge accumulation layer (first sensor region) formed by ion implantation of the first conductivity type impurity to the semiconductor layer of the second conductivity type, is formed as a sensor unit (light-receiving unit). That is to say, a n-type photodiode PD is formed within the P-well as a charge generating unit 32 by employing an n-type semiconductor substrate NSUB. The signal charge subjected to photoelectric conversion by receiving light is accumulated on the charge accumulating layer.

Also, a further desirable configuration with such a sensor unit (photodiode PD) is a so-called HAD (Hole Accumulated Diode) configuration wherein a hole accumulating layer (also called second sensor region) formed from a P+ type impurity region is layered on top of the charge accumulating layer on the surface side of an NP diode formed from a N+ type impurity region.

In this case, the p-type density under the reading gate unit TRG is made to be denser than the p-type density of the well under the photodiode PD, and the potential barrier between the floating diffusion FD and the photodiode PD under the reading gate unit TRG is formed so as to be higher than the potential barrier between the photodiode PD and the well.

If the exposure amount as to the photodiode PD increases and excessive charge (for example, electrons) is generated, the charge leaked into the photodiode PD is discharged in the direction of a low potential barrier, whereby a so-called vertical-type overflow drain configuration is taken wherein charge is discharged in the semiconductor substrate NSUB direction from the well under the photodiode PD, thereby suppressing blooming in the horizontal direction.

However, even with such a vertical-type overflow drain configuration, there is not a small amount of charge movement through the well. If the charge amount overflowing from the charge generating unit 32 is small, the advantages of blooming suppression by the vertical-type overflow drain configuration outweigh the problems, but if the overflowing charge amount is too great, the charge movement through the well is increased, and the problem of blooming to the adjacent pixels remains in not a small amount. An example thereof will be described later.

<Operation of Solid-State Imaging Device; Basic Operation>

Figure 4:
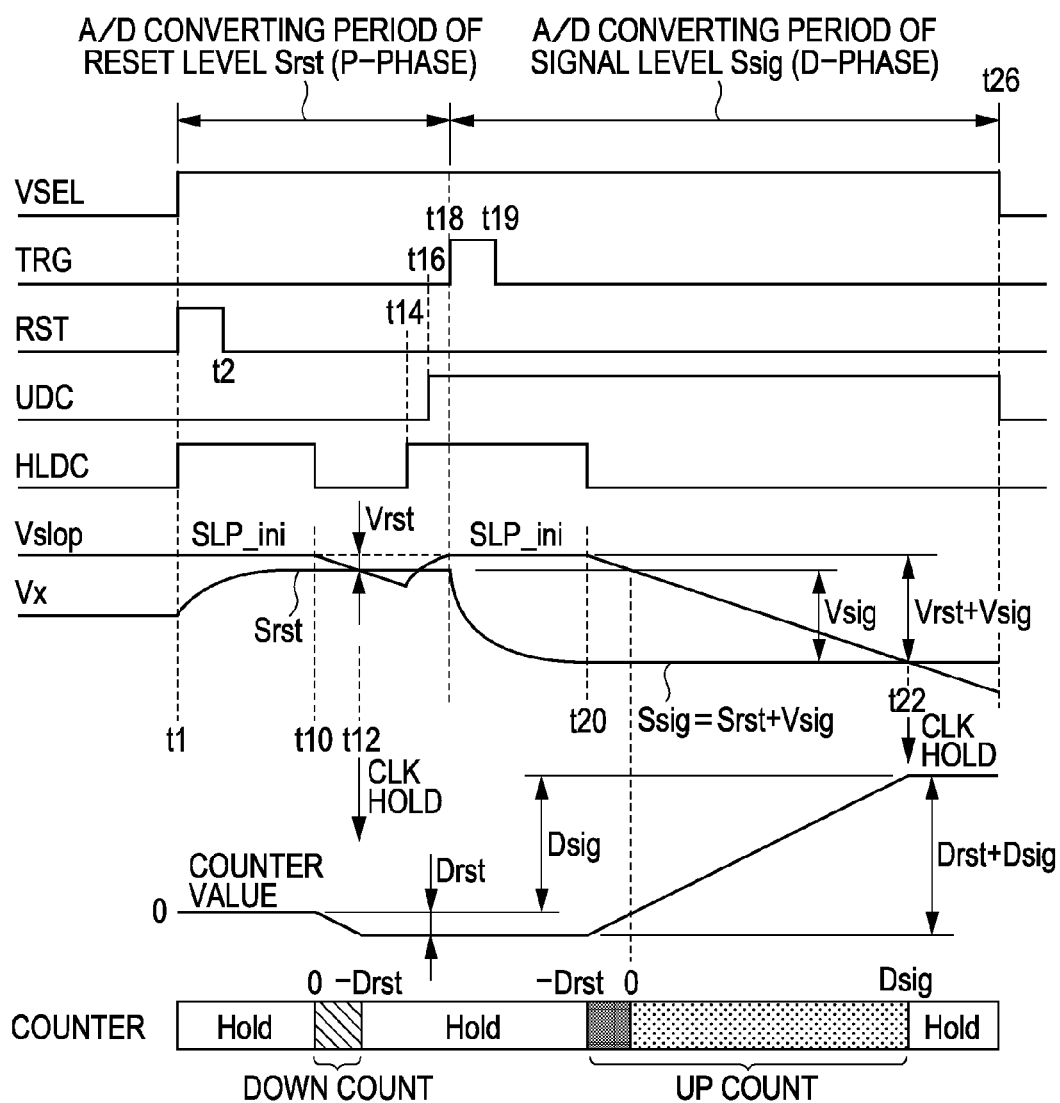
FIG. 4 is a timing chart for describing signal obtaining difference processing which is a basic operation with the column A/D circuit of the solid-state imaging device shown in FIG. 1.

FIG. 4 is a timing chart for describing signal obtaining difference processing when in all-pixel reading mode which is an example of a normal imaging mode, which is a basic operation of the column A/D circuit 25 of the solid-state imaging device 1 shown in FIG. 1.

In the all-pixel reading mode, similar driving is performed as to each of the unit pixels 3 of the unit pixel group 2 as with conventional driving, and reading is performed individually from the charge generating units 32a, 32b, 32c, and 32d provided in each unit pixel 3.

Regarding an arrangement to convert an analog pixel signal, which is sensed with each unit pixel 3 of the pixel array unit 10, into a digital signal, for example, a method is taken wherein a point is searched wherein the voltage for each of a reference signal Vslop in a ramp waveform descending at a predetermined slope (a case of descending in a staircase pattern is also acceptable) and the standard components or signal components with the pixel signals from the unit pixels 3 match, and by counting (totaling), by way of count clock, from the point-in-time of generating the reference signal Vslop employed with the comparison processing (start of change) to the point-in-time that the electric signal and reference signal according to the standard components or signal components with the pixel signal match, the count values of the pixel signal level corresponding to the size of each of the standard components or signal components are obtained.

That is to say, the analog pixel signal voltage Vx read to the vertical signal line 19 is compared to the reference signal Vslop at the voltage comparison unit 252 of the column A/D circuit 25 which is disposed for every column. At this time, the counter unit 254 disposed for every column which is similar to the voltage comparison unit 252 is operated, and the pixel signal voltage Vx of the vertical signal line 19 is converted to digital data by making changes while corresponding one-to-one with the potential of the reference signal Vslop and the counter unit 254. Thus, the changes in the reference signal Vslop is to convert the changes in voltage to changes in time, and by quantizing the time thereof with a cycle (clock) while counting with the counter unit 254, this is converted into digital data. If the reference signal Vslop is changed by ΔV during a certain time Δt, and the counter unit 254 is operated at a cycle of Δt, the counter value when the reference signal Vslop is changed by N×ΔV becomes N.

The pixel signal So (pixel signal voltage Vx) output from the vertical signal line 19 is a time-series wherein a signal level Ssig appears after the reset level Srst which includes noise of the pixel signal serving as a standard level. In the case of performing P-phase processing for the standard level (equivalent to reset level Srst and actual reset level Vrst), the D-phase processing becomes processing for the signal level Ssig wherein a signal component Vsig is added to the reset level Srst.

Hereafter, the reset control signal CLR and count mode control signal UDC and data holding control pulse HLDC will be described in detail as control information CN5, as being supplied from the communication/timing control unit 20 to the counter unit 254.

First, when obtaining a signal for a pre-charge phase (sometimes abbreviated as P-phase) which is an A/D conversion time period for the reset level Srst, the communication/timing control unit 20 controls the reset control signal CLR to be active H, resets the count value output from a non-inverted output edge Q for each flip-flop of the counter unit 254 to be an initial value of "0", while setting the counter unit 254 in down-count mode (t1). At this time, the communication/timing control unit 20 controls the data holding control pulse HLDC to be active H, and sets the count mode control signal UDC at a low level (i.e. down-count mode).

At this time, with the unit pixels 3, the vertical selection signal φVSEL of the row to be read Vn is controlled to be active H and permits outputting to the vertical signal line 19 of the pixel signal So, and approximately simultaneously the reset signal φRST is set to active H and the floating diffusion 38 is set to a reset potential (t1 through t2). This reset potential is output as the pixel signal So to the vertical signal line 19. Thus, as the pixel signal voltage Vx, the reset level Srst begins to appear in the vertical signal line 19.

Upon the reset level Srst on the vertical signal line 19 (H1, H2, . . .) converging and becoming stable, the communication/timing control unit 20 uses the data holding control pulse HLDC as the control data CN4 so that the reference signal Vslop begins to change at the same time as the counter operation starting with the counter unit 254, thereby controlling the data holding control pulse HLDC to be inactive L (t10).

Upon receiving this, the reference signal generating unit 27 inputs a staircase pattern or linear voltage waveform which is subjected overall to time change in a sawtooth form (RAMP form), with the initial voltage SLP_ini as the starting point serving as the reference signal Vslop which is comparative voltage to the input terminal RAMP of one of the voltage comparison units 252. The voltage comparison unit 252 compares the reference signal Vslop and the pixel signal voltage Vx of the vertical signal line 19 supplied from the pixel array unit 10.

At the same time as inputting the reference signal Vslop to the input terminal RAMP of the voltage comparison unit 252, the comparison time with the voltage comparison unit 252 is synchronized with the reference signal Vslop which is generated from the reference signal generating unit 27, and measured with the counter unit 254 disposed for each row. In actuality, the data holding control pulse HLDC is controlled to be inactive L for generating the reference signal Vslop, whereby the holding operation of the data holding unit 512 is released, and therefore the counter unit 254 starts a down-count from the initial value "0" as the P-phase count operation. That is to say, counting processing is started in the negative direction.

The voltage comparison unit 252 compares the reference signal Vslop in a ramp form from the reference signal generating unit 27 and the pixel signal voltage Vx which is input via the vertical signal line 19, and when the voltage of both are the same, a comparator output is inverted from H level to L level. That is to say, the voltage signal according to the reset level Vrst (reset level Srst) and reference signal Vslop are compared, and an active low (L) pulse signal having a size in the time axis direction corresponding to the size of the reset level Vrst is generated and supplied to the counter unit 254.

Upon receiving this result, the counter unit 254 stops the counting operation at approximately the same time as the inversion of the comparator output, whereby A/D conversion is completed by latching (holding/storing) the count value at that point-in-time (denoted as "−Drst" coupled with the sign) as pixel data. In other words, by counting (totaling) the width of an active low (L) pulse signal having a size in the time axis direction obtainable by the comparison processing with the voltage comparison unit 252 using the count clock CK0, a count value indicating a digital value Drst (denoted as −Drst coupled with the sign) corresponding to the size of the reset level Vrst can be obtained.

Upon exceeding a predetermined down-count time period, the communication/timing control unit 20 controls the data holding control pulse HLDC as active H (t14). Thus, the reference signal generating unit 27 stops the generating of the ramp form of the reference signal Vslop (t14), and returns to the initial voltage SLP_ini.

At the time of P-phase processing, the reset level Vrst with the pixel signal voltage Vx is detected with the voltage comparison unit 252 and counting operation performed with the counter unit 254, whereby the reset level Vrst of the unit pixels 3 is read and A/D conversion is performed for the reset level Vrst.

At the time of obtaining the signal of the data phase (may be abbreviated as D-phase) which is an A/D conversion period with the following signal level Ssig, in addition to the reset level Vrst, the signal component Vsig according to the incident light amount for each unit pixel 3 is read out, and similar operations are performed as with the P-phase reading. That is to say, first, the communication/timing control unit 20 controls the count mode control signal UDC to high level and sets the counter unit 254 to up-count mode (t16).

Also at this time, with the unit pixels 3, the vertical selection signal φVSEL of the row to be read Vn is controlled to be active H while the transfer signal φTRG is controlled to be active H, and the signal level Ssig is read to the vertical signal line 19 (t18 through t19).

Upon the signal level Ssig on the vertical signal line 19 (H1, H2, . . . ) converging and becoming stable, the communication/timing control unit 20 uses the data holding control pulse HLDC as the control data CN4 so that the reference signal Vslop begins to change at the same time as the counter operation starting with the counter unit 254, thereby controlling the data holding control pulse HLDC to be inactive L (t20).

Upon receiving this, the reference signal generating unit 27 inputs a staircase pattern or linear voltage waveform which is subjected overall to time change in a sawtooth form (RAMP form) having the same slope as the P-phase, with the initial voltage SLP_ini as the starting point serving as the reference signal Vslop which is comparative voltage to the input terminal RAMP of one of the voltage comparison units 252. The voltage comparison unit 252 compares the reference signal Vslop and the pixel signal voltage Vx of the vertical signal line 19 supplied from the pixel array unit 10.

At the same time as inputting the reference signal Vslop to the input terminal RAMP of the voltage comparison unit 252, the comparison time with the voltage comparison unit 252 is synchronized with the reference signal Vslop which is generated from the reference signal generating unit 27, and measured with the counter unit 254 disposed for each row. Here also, in actuality, the data holding control pulse HLDC is controlled to be inactive L for generating the reference signal Vslop, whereby the holding operation of the data holding unit 512 is released, and therefore the counter unit 254 starts an up-count opposite from the P-phase as the D-phase count operation, from the digital value Drst of the reset level Srst of the pixel signal voltage Vx obtained at the time of P-phase reading and A/D conversion (a negative value here). That is to say, counting processing is started in the positive direction.

The voltage comparison unit 252 compares the reference signal Vslop in a ramp form from the reference signal generating unit 27 and the pixel signal voltage Vx which is input via the vertical signal line 19, and when the voltage of both are the same, a comparator output is inverted from H level to L level (t22). That is to say, the voltage signal according to the signal component Vsig (signal level Ssig of the pixel signal voltage Vx) and reference signal Vslop are compared, and an active low (L) pulse signal having a size in the time axis direction corresponding to the size of the signal component Vsig is generated and supplied to the counter unit 254.

Upon receiving this result, the counter unit 254 stops the counting operation at approximately the same time as the inversion of the comparator output, whereby A/D conversion is completed by latching (holding/storing) the count value at that point-in-time as pixel data (t22). In other words, by counting (totaling) the width of an active low (L) pulse signal having a size in the time axis direction obtainable by the comparison processing with the voltage comparison unit 252 using the count clock CK0, a count value corresponding to the signal level Ssig with the pixel signal voltage Vx can be obtained.

Upon exceeding a predetermined up-count period, with the unit pixels 3, the vertical selection signal φVSEL of the row to be read Vn is controlled to be inactive L and inhibits outputting to the vertical signal line 19 of the pixel signal So, and the vertical selection signal φVSEL is set to active H for the next row to be read Vn+1 (t26). At this time, the communication/timing control unit 20 prepares for processing for the next row to be read Vn+1. For example, the count mode control signal UDC is set to a low level and the counter unit 254 is set to an up-down count mode.

With the processing time of the D-phase, the signal level Ssig with the pixel signal voltage Vx is detected with the voltage comparison unit 252 to perform counting operations, so the signal component Vsig of the unit pixel 3 is read out whereby A/D conversion of the signal level Ssig is performed.

The signal level Ssig is a level wherein the signal component Vsig is added to the reset level Srst, so the count value of the A/D conversion results of the signal level Ssig is basically "Drst+Dsig", but the starting point for the up-count is "−Drst" which is the A/D conversion result of the reset level Srst, so the count value actually held becomes "−Drst+(Dsig+Drst)=Dsig".

In other words, with the present embodiment, the counting operations with the counter unit 254 is a down-count for processing a P-phase, and an up-count for processing a D-phase, so difference processing (subtraction processing) is automatically performed between the count value "−Drst" which is the A/D conversion result of the reset level Srst, and the count value "Drst+Dsig" which is the A/D conversion result of the signal level Ssig, and a count value Dsig according to the difference processing results is held in the counter unit 254. The count value Dsig which is held in the counter unit 254 according to the difference processing results corresponds to the signal component Vsig.

As described above, with the difference processing within the counter unit 254 with the reading and counting processing twice, which is the down-count when processing the P-phase and the up-count when processing the D-phase, the reset level Vrst which includes irregularities for each of the unit pixels 3 can be removed, and A/D conversion results only for the signal component Vsig according to the incident light quantity for each unit pixel 3 can be obtained with a simple configuration.

Accordingly, the column A/D circuit 25 of the present embodiment not only serves as a digital conversion unit which converts an analog pixel signal into digital pixel data, but also operates as a CDS (Correlated Double Sampling) processing function.

Also, with the column A/D circuit 25 according to the present embodiment, a data storage unit 256 is provided downstream after the counter unit 254, and prior to operation of the counter unit 254, based on a memory transfer instruction pulse CN 8 from the communication/timing control unit 20, the count results of the previous row Hx−1 can be transferred to the data storage unit 256.

That is to say, after the A/D conversion period is ended, the data within the counter unit 254 is retreated into the data storage unit 256, and the column A/D circuit 25 starts the A/D conversion of the next row Vx+1. The data within the data storage unit 256 is selected in sequence by the horizontal scanning circuit 12 at the back side thereof, and can be read employing the output circuit 28.

By taking the difference between the digital data of the P-phase (reset level Srst) and the digital data of the D-phase (signal level Ssig) automatically in the course of A/D conversion processing over two times, the A/D conversion results of the signal component Vsig which is expressed with the difference between the P-phase signal potential (reset level potential) and D-phase signal potential (signal level potential) is obtained, but in order for the A/D conversion result thereof to be accurate, processing for the pixel signal voltage Vx (=Ssig) expressing only the signal charge quantity which is read from the charge generating unit 32 of the reading row to the floating diffusion 38 with the D-phase processing process after P-phase processing becomes crucial.

Accordingly, when unneeded charge generated outside the charge generating unit 32 of the reading row flows into the floating diffusion 38 in the D-phase processing process, the signal level Sn at that time becomes a value wherein a signal component based on unneeded charge (hereafter called unneeded signal component Vnoise) is added to the original signal level Ssig (Sn=Ssig+Vnoise), so even if the above-described CDS processing is performed, the count value which is obtained as A/D conversion results does not becomes Dsig.

That is to say, if the count value of the unneeded signal component Vnoise is Dnoise, difference processing (subtraction processing) is performed automatically between the count value "−Drst" which is the A/D conversion results of the reset level Srst and the count value "Drst+Dsig+Dnoise" which is the A/D conversion results of "signal level Ssig+ unneeded signal component Vnoise", the count value "Dsig+ Dnoise" according to the difference processing results herein is held in the counter unit 254. Clearly, the count value "Dsig+ Dnoise" which is held in the counter unit 254 according to the difference processing results is not digital data Dsig which corresponds to the signal component Vsig, but shows that which is added the unneeded signal component Vnoise to the signal component Vsig.

In particular, as with the present embodiment, with A/D conversion of a single slope integration type, the P-phase obtaining time and D-phase processing time differ, and the greater the pixel signal level the longer the comparison processing time until the reference signal Vslop and pixel signal level matches, and the potential of the floating diffusion 38 continues to decline during this time. As a result, the larger the pixel signal level, the greater the unneeded signal component Vnoise which cannot be cancelled with the CDS processing. An example wherein this problem occurs, and reduction thereof, will be described later.

<<Thinning Reading Mode>>

The solid-state imaging device 1 shown in FIG. 1 is a CMOS sensor of a type to perform reading of the pixel signal from the pixel array unit 10 in increments of entire rows, and has two reading modes of an all-pixel reading mode and a thinning reading mode.

When in the all-pixel reading mode which reads the pixel signal voltage Vx from all of the unit pixels 3 making up the pixel array unit 10, the processing as to the shutter rows and the processing as to the reading rows is performed with the timing as shown in FIG. 4 by selecting all of the rows from the first row to the last row in sequence.

Also, for example, in the case of desiring to operate at a high frame rate, or in the case of desiring to reduce the information quantity for each frame, the thinning reading mode is employed, and rather than sequentially reading all of the rows, one row for every m rows is selected to become a reading row, thus performing a 1/m thinning operation. That is to say, with the operation sequence to read one row worth of pixel signals->skip m−1 rows->read one row worth-> . . . , only the pixel signals equating to 1/m of the total row number in the pixel array unit 10 are read. This operation mode is called a 1/m rows thinning reading mode, and the rows to be thinned which are "m−1" rows out of m rows are called thinning rows (or unselected rows), and the rows not to be thinned are called reading rows (or selected rows or signal output rows).

If the 1/m row thinning reading mode is provided besides the all-pixel reading mode, when in the 1/m row thinning reading mode, the information quantity for each frame can be 1/m, and the imaging speed can be m times greater, whereby responding to needs contradictory to the many pixels and high-speed reading. Switching to the thinning operation is performed by inputting an external signal for switching the operation mode to the 1/m thinning mode, and switching the driving signal transferred from the communication/timing control unit 20 to the horizontal scanning circuit 12 or vertical scanning circuit 14 to be used for 1/m thinning.

For example, with a digital still camera, before capturing a still image, normally, work is performed to display a moving image (subject image) on a small screen which is a liquid crystal monitor, for example, to confirm the subject (monitoring). At the stage of confirming the subject (monitoring mode), the image to be displayed on the liquid crystal monitor does not need to be a high-resolution image, but can be a rough image according to the number of pixels in the liquid crystal monitor (low-resolution image), so thinning processing of the pixel information is performed. Also, with image transfer for a portable device such as a digital still camera, the data rate for transfer is limited. Accordingly, the pixel information for all pixels is transferred in order to obtain a high-resolution image for a still image, and thinning processing for the pixel information for a moving image is performed in order to reduce the information quantity by thinning the pixel information and transferring this.

With the thinning processing of the pixel information in the vertical direction, processing is performed to thin the rows actually used. In this case, after reading all pixels (all rows) of pixel information from the image sensor, a method for thinning the pixel information in increments of rows with an external signal processing system, and a method for thinning the reading itself of the pixel signal from the unit pixels in increments of rows can be considered.

With the thinning reading mode according to the present embodiment, the thinning method is employed, such as the latter, to thin the reading itself of the pixel signal from the unit pixels in increments of rows. Such a thinning operation can also respond to operations with low power consumption, and since there are fewer rows to read, has the advantage of facilitating high-speed reading.

<⅓ Row Thinning Reading Mode>

FIGS. 5 and 6 are diagrams showing a first comparative example as to the pixel driving method when in the thinning reading mode according to the present embodiment. The first comparative example illustrates in pattern form the operations of a ⅓ row thinning reading mode wherein the signal for one row out of three rows is output, as an example of a thinning reading mode.

FIG. 5 shows in pattern form an array of the unit pixels 3 arrayed in a matrix form in the pixel array unit 10 of the CMOS-type solid-state imaging device 1, wherein each one of the grids in the pixel array unit 10 of the outer frame illustrate the unit pixels 3.

As described before, when in all-pixel reading mode which is the normal reading mode, the pixels of all rows are selected in sequence (from the lower side of the diagram) by an operation of the vertical scanning circuit 14, but in the ⅓ row thinning reading mode, operations are performed such that, of the pixel array unit 10, only the rows shown with the diagonal line hatching are sequentially selected and read as the reading rows, while the thinning rows which are "3–1", i.e., 2 rows out of 3 rows are omitted, and remaining two rows out of the three rows shown by a white frame are not selected so as to be thinned rows.

Figures 6A, 6B:
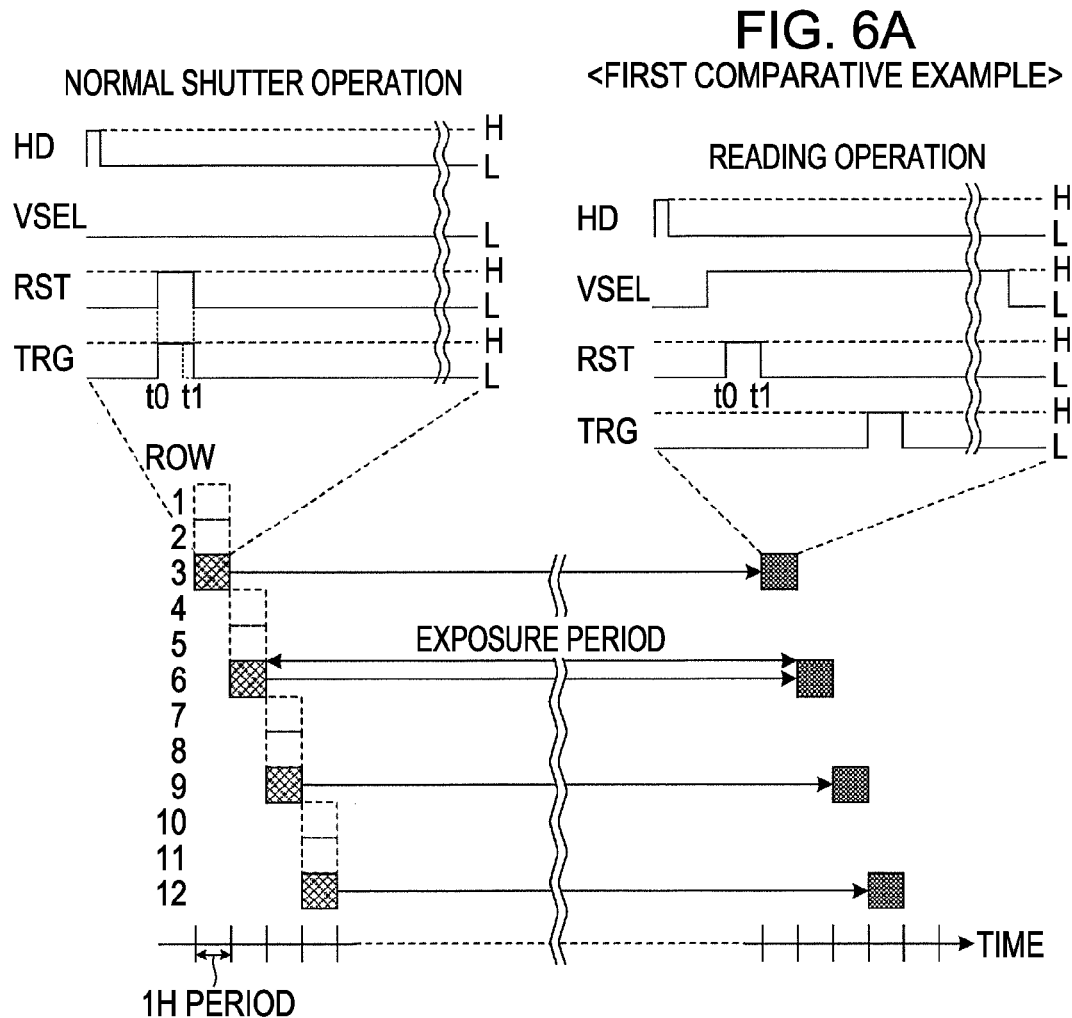
FIG. 6 is a timing chart to describe the first comparison example as to the pixel driving method when in thinning reading mode according to the present embodiment.

FIG. 6 shows a timing chart to describe the operations of the unit pixels 3 corresponding to FIG. 5. Here, FIG. 6A shows the entire schematics of the operation thereof, and FIG. 6B illustrates along multiple horizontal time periods with a focus on the transfer pulse TRG.

As can be seen from FIG. 6 also, only the reading rows which are the reading operation rows or shutter operation rows have high voltage or low voltage supplied as to the reading selection transistor 34, reset transistor 36, and vertical selection transistor 40 to operate, and the thinning rows constantly have low voltage supplied as to the reading selection transistor 34, reset transistor 36, and vertical selection transistor 40.

At a certain point-in-time in the horizontal time period equating to a row wherein the reading row performs shutter operations (shutter operation row), the transfer pulse TRG is set to be active H and the reading selection transistor 34 is turned on, and the charge which had been accumulated previously in the charge generating unit 32 but is unneeded for reading is transferred to the floating diffusion 38, and approximately simultaneously to this or after this the pixel reset pulse RST is set to be active H, whereby the reset transistor 36 is turned on, and the unneeded charge transferred to the floating diffusion 38 is discarded to the reset power source Vrd. This operation is called the shutter operation.

The timing for the activation of the transfer pulse TRG and pixel reset pulse RST for the shutter operation row should be considered so as not to negatively influence the operations of the reading operation rows subjected to processing in parallel with the shutter operation or the output image thereof. In order to do so, it is imperative that the timing of the transfer pulse TRG of the shutter operation rows and the pixel reset pulse RST match the timing of other pulses (with the present example, the pixel reset pulse RST and transfer pulse TRG) of the reading operation rows.

In this case, in the case that the pixel reset pulse RST is generated after the transfer pulse TRG with the shutter operation rows, the timing of the transfer pulse TRG of the shutter operation rows and the pixel reset pulse RST of the reading operation rows are necessarily matched, while the timing of the pixel reset pulse RST of the shutter operation rows and the transfer pulse TRG of the reading operation rows are matched. Also, with the shutter operation rows, in the case of matching the timing of the transfer pulse TRG and the timing of the pixel reset pulse RST, the timings thereof are matched to the timing of the pixel reset pulse RST or the transfer pulse TRG of the reading operation rows.

With the present embodiment, the timing of the transfer pulse TRG and the pixel reset pulse RST is matched for the shutter operation rows, and also the timing thereof is matched to the timing of the pixel reset pulse RST of the reading operation rows. Note that in the case of matching the timing of the pixel reset pulse RST of the shutting operation rows and the transfer pulse TRG of the reading operation rows, in order to secure the reset operation, for the off-timing, strictly speaking, it is desirable for the pixel reset pulse RST to be set to inactive L after the transfer pulse TRG is set to be inactive L, as shown with the dotted lines in the diagram.

At a certain point-in-time in the horizontal time period wherein the row which has performed shutter operations (shutter operation row) is equivalent to a row to be read of the pixel signals, the vertical selection pulse VSEL is set to be active H and the vertical selection transistor 40 is turned on, and first the pixel reset pulse RST is set to be active H and the reset transistor 36 is turned on, whereby the unneeded charge accumulated in the floating diffusion 38 is discarded to the reset power source Vrd.

Following this, the transfer pulse TRG is set to be active H and the reading selection transistor 34 is turned on, and the charge (specifically called signal charge) accumulated in the charge generating unit 32 from after the shutter operation to this point-in-time is transferred to the floating diffusion 38. Thus, the voltage of the floating diffusion 38 is changed according to the signal charge quantity, so the amplifying transistor 42 converts the change thereof to pixel signal voltage and transfers this to the column processing unit 26 via the vertical signal line 53 (vertical signal line 19). As can be seen from this diagram, each horizontal time period is incremented with the shutter operation rows and the reading operation rows as a pair, in a state shifted by the amount of rows regulating the shutter time period.

<Problems Arising from Thinning Reading>

However, when driving the unit pixels 3 with such a method, various problems can occur as a result of different driving conditions (driving frequency of the transistors) as to the unit pixels 3 between the thinning rows and the reading rows which are not thinned.

For example, with the unit pixel group 2 (unit pixels 3) shown in FIGS. 2A through 2C, after use for a long period of time, differences occur in the degradation level of the transistors making up the unit pixels 3 or the driver transistors making up each driving buffer BF1 through BF3 which drive the pixel wiring (vertical selection line 52, transfer wiring 55, and reset wiring 56) between the thinning rows and the reading rows which are not thinned, and when in the all-pixel reading mode, image feature degradation occurs which can be seen by the eye as cyclic horizontal striations.

In order to counter this, for example, an arrangement may be made wherein, during driving with the thinning reading mode, a driving signal is input as to the thinning pixel rows to operate each pixel, the difference between thinned pixels and pixels which are not thinned is eliminated, and the degradation level of the transistors making up the pixels and so forth is aligned, whereby occurrence of image striation noise during all-pixel reading mode can be prevented.

<Blooming>

Also, as another problem, blooming phenomenon readily occurs when in the thinning reading mode. That is to say, the charge generating unit 32 performs photoelectric conversion according to the total quantity of incident light and generates and accumulates a signal charge (for example electrons), but there is a limit to capacity for accumulating, so when the incident light intensity is strong or when the charge accumulating time is long, the limit value is exceeded and the signal charge subjected to photoelectric conversion overflows from the accumulating region. As described relating to FIG. 3, the device is designed employing a vertical-type overflow drain configuration such that the majority of the overflowing signal charge flows to the board side, but with advances in miniaturization in recent years, the distance between adjacent pixels is closer, and as a result, of the overflowing signal charge, the ratio of charge flowing into adjacent pixels is increased.

For example, in the case of a color imaging method, color filters for color separation of R (red), G (green), B (blue) for example are provided in a predetermined placement order in each of the unit pixels 3 of the pixel array unit 10. Let us say that a large quantity of light with green components is incident, and the quantity of light with red components is comparatively less as compared therewith. In this case, if the aperture of the camera system is opened and so forth to increase the quantity of incident light, the charge generating unit 32 of the green pixels become full of signal charge and become saturated, so the signal charge overflowing therefrom jump into the red charge generating unit 32.

On the other hand, with the unit pixels 3 which are actually read out, after the signal charge is read from the charge generating unit 32, the signal level (brightness) of the unit pixels 3 is determined based on how much light is converted to a signal charge until the next signal charge is read out. As described earlier, when operating an electronic shutter with the CMOS sensor, from the reset processing for charge discarding as to the charge generating unit 32 until actually reading the signal charge to the vertical signal line 53 (vertical signal line 19) side becomes a problem. Accordingly, in order to suppress the blooming phenomenon, it is imperative that as small a quantity as possible of the signal charge jumps in from adjacent pixels, from the reset point-in-time of the shutter operation until the reading thereof.

When in the 1/m row thinning reading mode, one row becomes the reading row, and the m−1 rows thereafter become thinning rows, and this array is repeated so that with a simple thinning reading, the reading selection transistor 34 (reading gate) is constantly turned off as to the thinning row, so even in the case of imaging of a still image wherein only one frame worth is imaged, particularly when accumulating for a long period of time, electrons are accumulated within the charge generating unit 32, causing blooming to the adjacent pixels. Also, in the case of imaging of a moving image, while there is continuous accumulation of signal charge along multiple frames, reading is not performed, whereby excess charge overflows into the adjacent reading rows, and the problem of blooming occurring is almost certain.

That is to say, with the thinning reading mode, the thinning rows and reading rows all have the charge generating unit 32 of each unit pixel 3 to be exposed to light, so if the shutter operation is not performed, charge from the charge generating unit 32 of the thinning rows overflows to the adjacent (pixels of the) reading rows, which could undesirably influence the pixel signals of the reading rows (blooming phenomenon).

Considering this point, it is desirable for preliminary pixel resetting (shutter operation) to be performed in advance as to the unit pixels 3 with the possibility of overflowing which are adjacent to the unit pixel 3 to be read of interest, so as to minimize the influence of excess charge overflowing from other unit pixels 3 adjacent to the unit pixel of interest 3. When in thinning reading mode, not performing reading operation of the pixel signals for the thinning rows, but performing only the shutter operations may be an effective solution method.

Figure 8A:
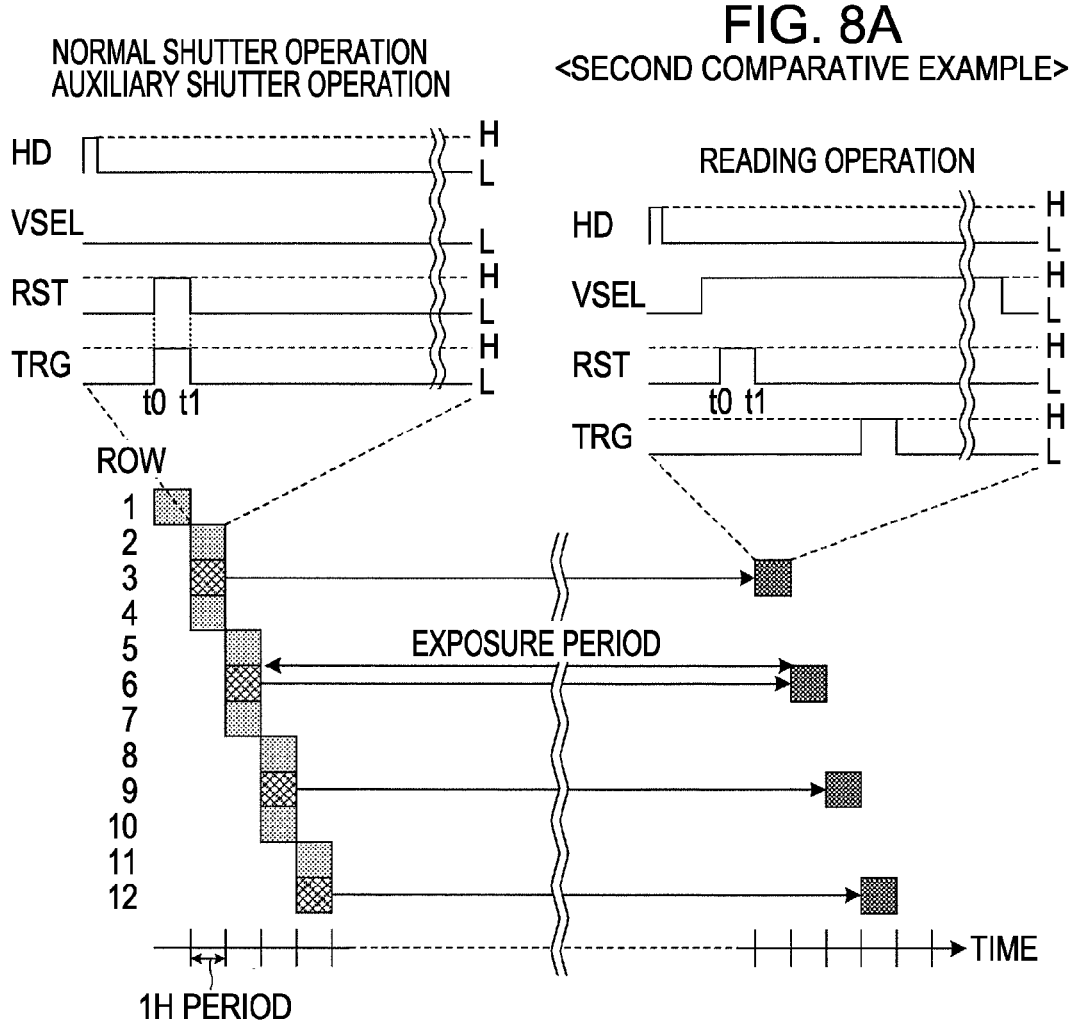
FIG. 8 is a timing chart to describe the second comparison example as to the pixel driving method when in thinning reading mode according to the present embodiment.
Figure 8B:
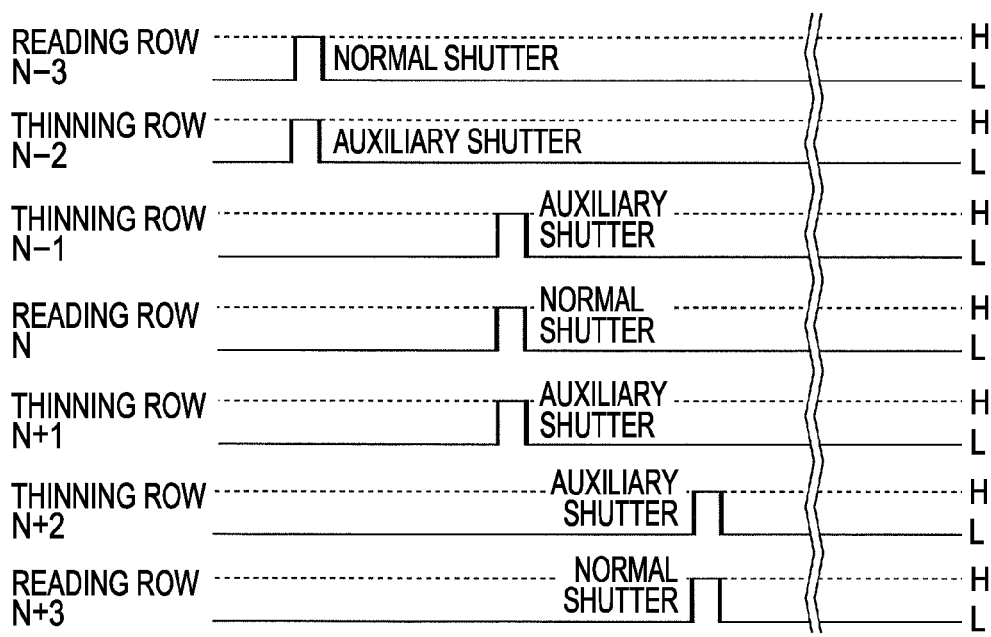

FIG. 7 is a diagram showing a second comparative example as to the pixel driving method when in the thinning reading mode according to the present embodiment. To use the ⅓ row thinning reading mode as an example, FIG. 7 shows the state of the row scanning in the pixel array unit 10 so as to correspond to FIG. 5, and FIG. 8 shows the timing chart describing the operation thereof so as to correspond to FIG. 6.

The second comparative example exemplifies a method for solving the above-mentioned blooming phenomenon. With this method, for thinning rows, a reading operation is not performed for the pixel signals, but only the shutter operation is performed. That is to say, before reading the signal charge from the unit pixels 3 of the reading row, a preparatory pixel resetting operation (shutter for countering blooming) is performed by using an electronic shutter function of the unit pixels 3 of the shutter rows corresponding to the adjacent (one side of the scanning directions is sufficient) thinning rows. Regarding the shutting rows corresponding to the thinning rows on the other side of the scanning directions, occurrence of excessive charge can be suppressed by a shutter for countering blooming at the next reading row.

In the ⅓ row thinning reading mode, as shown in FIG. 7, operations are performed such that, of the pixel array unit 10, only the rows shown with the diagonal lines are sequentially selected and read as the reading rows, while the thinning rows which are "3−1", i.e., 2 rows out of 3 rows are omitted, and remaining two rows out of the three rows shown are not selected so as to be thinned rows.

At this time, by applying a shutter to the shutter rows and the thinning rows before and after the shutter rows, the charge generated with the charge generating unit 32 is discharged to the reset power source Vrd side so as not to saturate the charge generating unit 32 by charge, thus controlling the blooming to the adjacent pixels. The shutter for countering the blooming as to the thinning row is in particular called an auxiliary shutter, and the shutter as to the reading rows is called a normal shutter so as to distinguish from the auxiliary shutter.

After auxiliary shutter operations, similar to after the normal shutter operations, the charge according to the exposure thereafter is accumulated in the charge generating unit 32, but the vertical selection pulse VSEL is constantly at inactive L and is not selected as a reading operation row, so the pixel signals according to the charge accumulated after auxiliary shutter operation is not output to the vertical signal line 53 (vertical signal line 19). In the case of a moving image, with the auxiliary shutter operation at the time of the next frame scanning, the charge accumulated in the charge generating unit 32 up to that time (in reality, the period of scanning one frame) is discarded on the reset power source Vrd side.

However, with such a method, it becomes necessary to systematically add a new vertical scanning circuit (row selection circuit) to the auxiliary shutter operation for thinning rows (unselected rows), which has a disadvantage regarding chip size.

Note that if we consider performing shutting operations for thinning rows also, inputting a driving signal as to the pixel rows to be thinned also and operating each pixel when driving in the thinning reading mode can be an effective method for resolving the blooming phenomenon, as disclosed in the above-mentioned Japanese Unexamined Patent Application Publication No. 2006-054276.

Also, as another method to resolve the blooming phenomenon, the thinning rows can continuously performing shutting, i.e. the transfer pulse TRG and pixel reset pulse RST are constantly in active H, whereby the reading selection transistor 34 and reset transistor 36 are constantly turned on, and the charge generated with the charge generating unit 32 of the thinning rows is transferred to the floating diffusion 38 and continues to discard to the reset power source Vrd.

However, with this method, it becomes necessary to systematically add a new vertical scanning circuit (row selection circuit) to the constant shutter operation for thinning rows, which has a disadvantage regarding chip size. Also, the transistors 34, 36, and 40 making up the unit pixels 3 are operated to turn on and off only for the reading operation rows or the reading rows to be the shutter operation rows, and the reading selection transistor 34 and reset transistor 36 are constantly turned on and the vertical selection transistor 40 is constantly turned off for the thinning rows, whereby after long periods of use, driving frequency of the pixels can differ between the thinned rows and the reading rows which are not thinned, causing the problem of image feature deterioration which is similar to that described above, and has the disadvantage of image quality. Additionally, constantly on means that the absolute usage time of transistors increases dramatically, causing a disadvantage regarding reliability when compared to the case of remaining constantly off.

With regard to reliability, this is also related to element separation formation. Forming methods for inter-pixel element separation including known methods such as a method to form an insulating oxidizing film within Si or a method to form element separation with implantations, such as STI (Shallow Trench Isolation) or LOCOS (Local Oxidation of Silicon). STI is a manufacturing method to etch Si and bury an insulating oxidizing film, but plasma damage during etching can cause a large quantity of dark current to form. LOCOS is a method to selectively oxidize only the Si portion with an oxidizing core, but the oxidizing film can seep in to the gate edge (gate bird's beak), causing parasitic capacitance. Also, this is a technique not suitable for forming narrow element separation, so in recent years, LOCOS is being replaced by STI.

The pixel array unit 10 includes a photoelectric conversion location (charge generating unit 32 with the present example), so forming element separation with implantation is most desired as reduction of dark current. However, in the case of forming element separation with implantation, an insulating oxidizing film is necessary on top of the element separation in order to insulate the board and gate electrode. The thickness of the element separation insulating oxidizing film is a range distance of the diffusion implantation of the source/drain, and needs to be of a thickness wherein the insulating oxidizing layer is not penetrated when ion implantation is performed beyond the insulating oxidizing film, i.e. so that within the Si is not influenced.

However, when forming the element separation with a high-concentration implantation, if the reset transistor 36 is constantly turned on, the gate can be turned on through the element separation insulating oxidizing film in a case wherein the insulating oxidizing film on top of the element separation cannot sufficiently insulate, whereby dark current can be generated from the element separation unit, resulting in decreased reliability, hence this is not desirable. Note that compared to the diffusion element separation formation, the element separation formation by the STI has less problem with reliability, so the reset transistor 36 for the thinning row can be constantly turned on.

<<Thinning Reading Mode of the Present Embodiment>>

<Blooming Reduction Method>

Figure 10A:
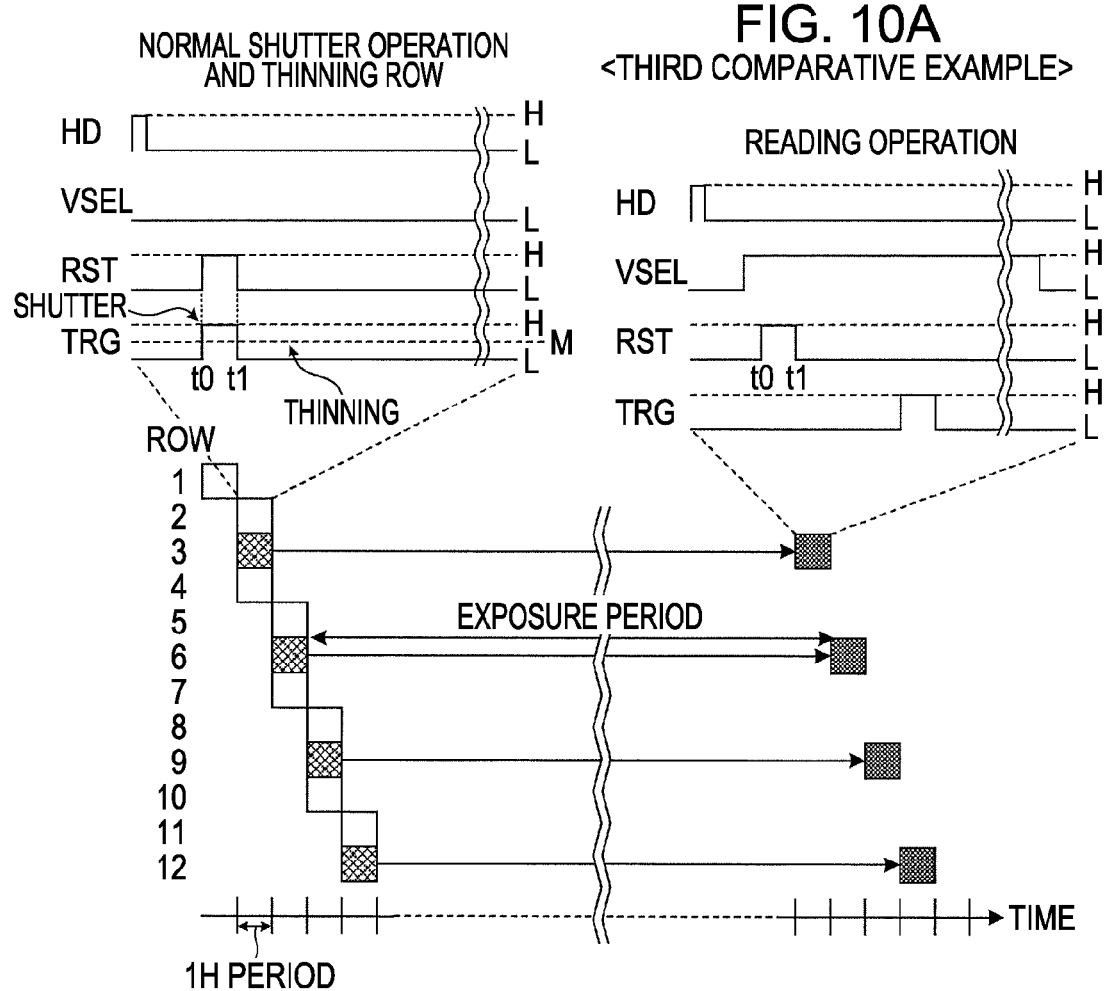
FIG. 10 is a timing chart to describe the third comparison example as to the pixel driving method when in thinning reading mode according to the present embodiment.
Figure 10B:
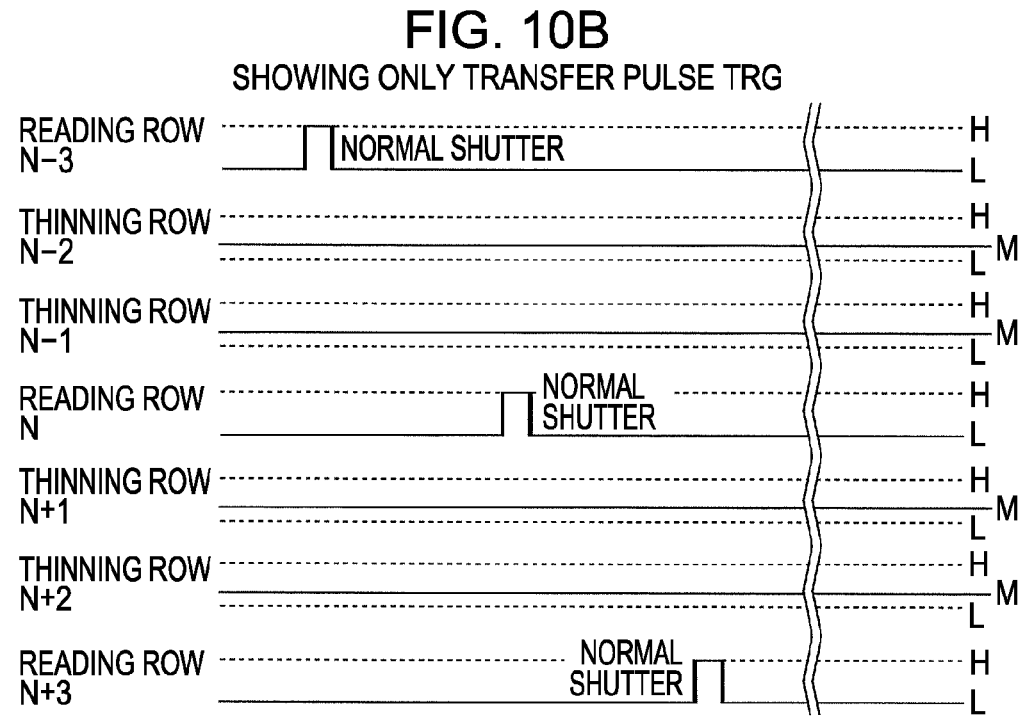

FIG. 9 is a diagram to describe a third comparative example as to the pixel driving method when in the thinning reading mode according to the present embodiment. Using the ⅓ row thinning reading mode as an example, FIG. 9 illustrates the state of row scanning of the pixel array unit 10 so as to corresponded to FIG. 5, and FIG. 10 illustrates a timing chart describing the operations thereof, focusing on the transfer pulse TRG so as to correspond to FIG. 6.

As we can see from the comparison of FIG. 9 and FIG. 5, when in the thinning reading mode of the third comparative example, similar to the first comparative example, an auxiliary shutter such as that used with the second comparative example is not used for the thinning rows.

Instead, with the blooming reduction with the third comparative example, the transfer pulse TRG for the potential (hereafter referred to as blooming reduction potential) wherein the charge overflow itself of the thinning rows which is transferable to the floating diffusion 38 side is constantly supplied to the reading selection transistor 34 for the thinning rows.

With the third comparative example, as a blooming reduction potential, a potential of an intermediate level between the L level and the H level (intermediate potential M) is used, or alternatively, a floating potential which in actuality voltage is applied is used. In the case of floating, there is the advantage of not needed a circuit to generate the intermediate potential M.

In the thinning reading mode, with the reading selection transistor 34 (also called transfer gate or reading gate), the voltage applied to the gate edge of the reading selection transistor 34 for the thinning rows is not based on point-in-time, but rather an arrangement is made with the thinning rows wherein an intermediate potential M (Middle) between the high potential H regulating the H-level and low potential L regulating the L-level for binary driving is fixed to operate the reading selection transistor 34 in a suitable state, or an arrangement of a floating state is made so that the transfer pulse TRG is not supplied to the gate edge of the reading selection transistor 34.

For the intermediate potential M, a potential is desirable which satisfies a range wherein the overflow barrier which is in the floating diffusion (horizontal) direction rather than the semiconductor substrate (lower) direction is set as the lower limit thereof, and a potential wherein dark current is not generated is set as the upper limit thereof. Thus, the influence of the dark current while countering the blooming phenomenon can be suppressed while suppressing the blooming phenomenon during thinning reading.

In the reading rows, the reading selection transistor 34 is driven to turn on/off with the binary L-level and H-level, and when the shutter operation row and reading operation row are applicable, the reading selection transistor 34 is turned on.

When in the thinning reading mode, all of the row addresses of the thinning rows which are unselected rows are selected, and depending on whether the transfer pulse TRG supplied to the reading gate (reading selection transistor 34) of the thinning rows as an example of the blooming reduction potential are fixed to an intermediate potential M or floated, the overflow barrier (potential barrier) of the charge generating unit 32 (such as a photodiode) of the thinning rows can be lowered compared in the case of applying a normal inactive potential (L-level potential).

Thus, when in the thinning reading mode, the unneeded charge stored in the charge generating unit 32 of the thinning rows and overflowed to the adjacent rows (adjacent pixels in the vertical direction) can be arranged in a state readily discharged to the floating diffusion 38 side, and blooming to the unit pixels 3 of the adjacent reading rows is reduced.

If not using a pixel-sharing method, in the case of setting the transfer pulse TRG to an intermediate potential M, the dark current is increased somewhat, but with the thinning reading mode the thinning rows are not selected as reading rows, and are not output to the vertical signal line 53 (vertical signal line 19) as a pixel signal so does not become a problem. Therefore, the blooming phenomenon to the adjacent pixels in the vertical direction by the unneeded electrons moving through the well can be suppressed, while a simple operation mode can be used wherein an auxiliary shutter is not needed.

<Problems with Pixel-Sharing Method>

Figure 11:
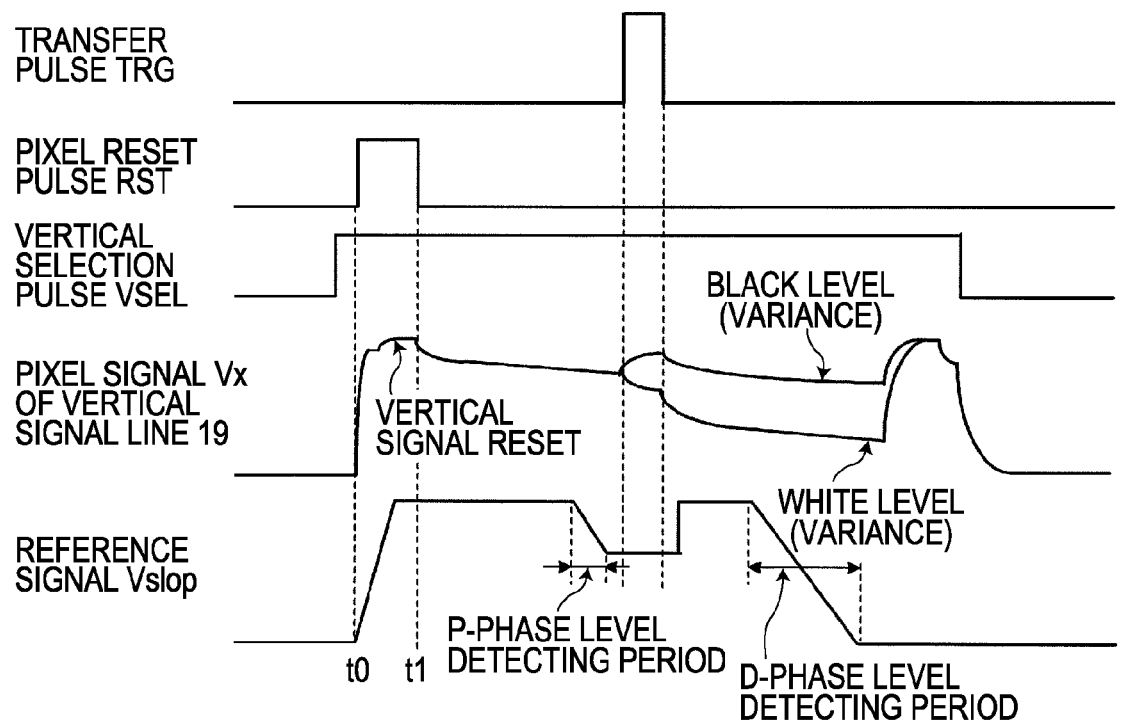
FIG. 11 is a schematic diagram to describe problems occurring in the pixel signal when the third comparison example shown in FIGS. 9 and 10 is applied in the case that the pixel array unit is a pixel sharing method.

FIG. 11 is a schematic diagram describing problems occurring to the pixel signal when applying the third comparative example shown in FIGS. 9 and 10 in the case wherein the pixel array unit 10 employs a pixel-sharing method. Here, the driving timing and the states of pixel signals or reference signals are illustrated so as to correspond to FIG. 4.

As shown in FIG. 2A, if a pixel-sharing method is used wherein the pixel array unit 10 is configured with unit pixel groups 2 wherein a portion of the elements of the unit pixels 3 are shared by multiple unit pixels 3, the floating diffusion FD is shared with multiple rows, so when changed to the thinning reading mode, in the event of reading the pixel signals of the reading rows into the vertical signal line 53 (vertical signal line 19), charge is continuously discharged from the charge generating unit 32 (for example the photodiode PD of a HAD configuration) of the thinning rows into the floating diffusion FD, and from the time of obtaining the P-phase until obtaining the D-phase of the reading rows, in particular the signal level Ssig of the D-phase, is modified.

The charge generated in the charge generating unit 32 of the other rows which are shared, other than in the charge generating unit 32 of the reading rows (hereafter referred to as shared rows), readily flow into the floating diffusion 38, and for example, a black level Ssig_BK with no exposure or a white level Ssig_WH with sufficient exposure each become a value wherein a signal component based on unneeded charge (unneeded signal component Vnoise) generated in the charge generating unit 32 of the shared row is added to the original signal level Ssig_BK or Ssig_WH (Sn_BK=Ssig_BK+ Vnoise, Sn_WH=Ssig_WH+Vnoise), whereby even if CDS processing is performed accompanying A/D conversion, the count value obtained as A/D conversion results do not become Dsig_BK or Dsig_WH.

As can be assumed from the diagram also, during the time period that comparison processing is performed until the reference signal Vslop and pixel signal level match, the potential of the floating diffusion 38 continuously decreases, whereby the signal level is modified for either the black level or the white level, but with the white level with the larger the pixel signal level, the longer the comparison processing time becomes, so as an A/D conversion result, the unneeded signal component Vnoise which cannot be cancelled with the CDS processing accompanying A/D conversion becomes greater with the white level.

<Blooming Reduction Method Corresponding to Pixel-Sharing Method>

Figure 13A:
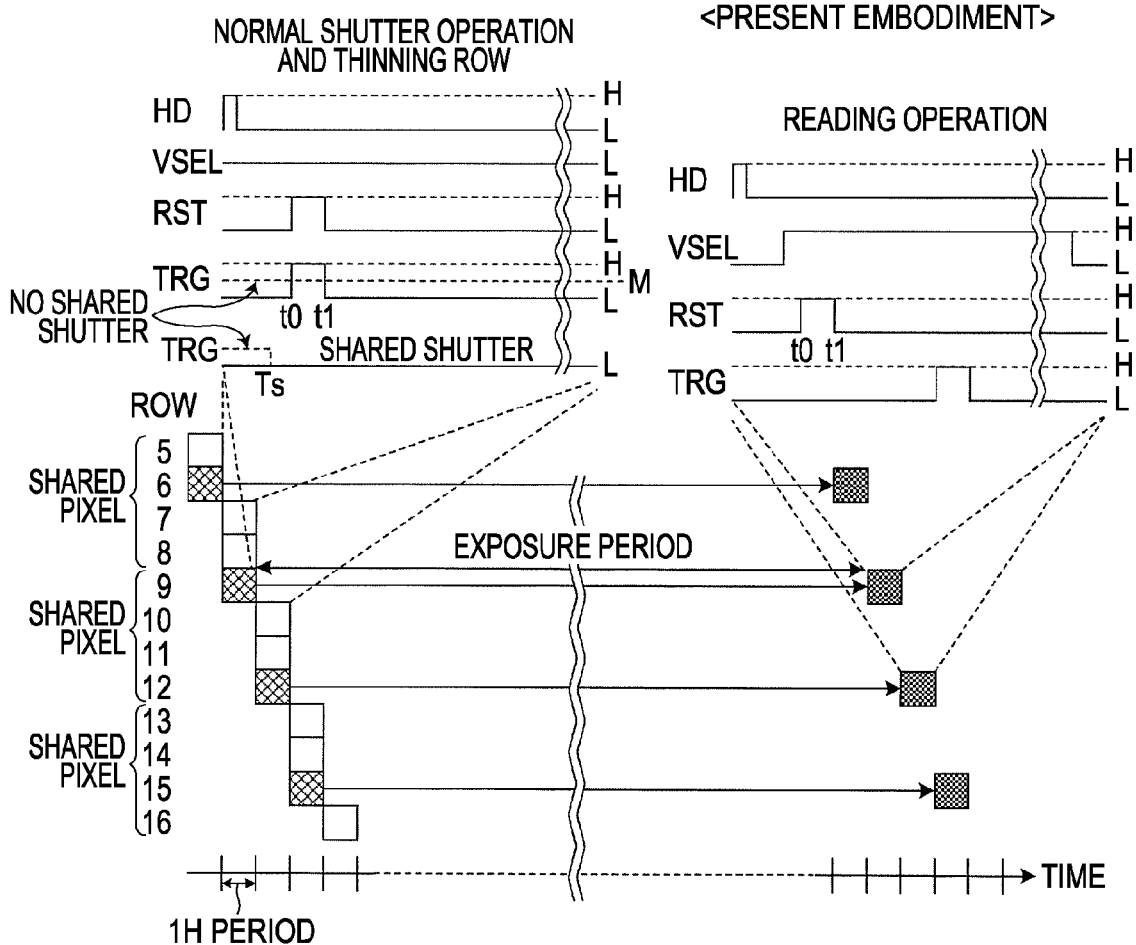
FIG. 13 is a timing chart to describe the pixel driving method when in thinning reading mode according to the present embodiment.
Figure 13B:
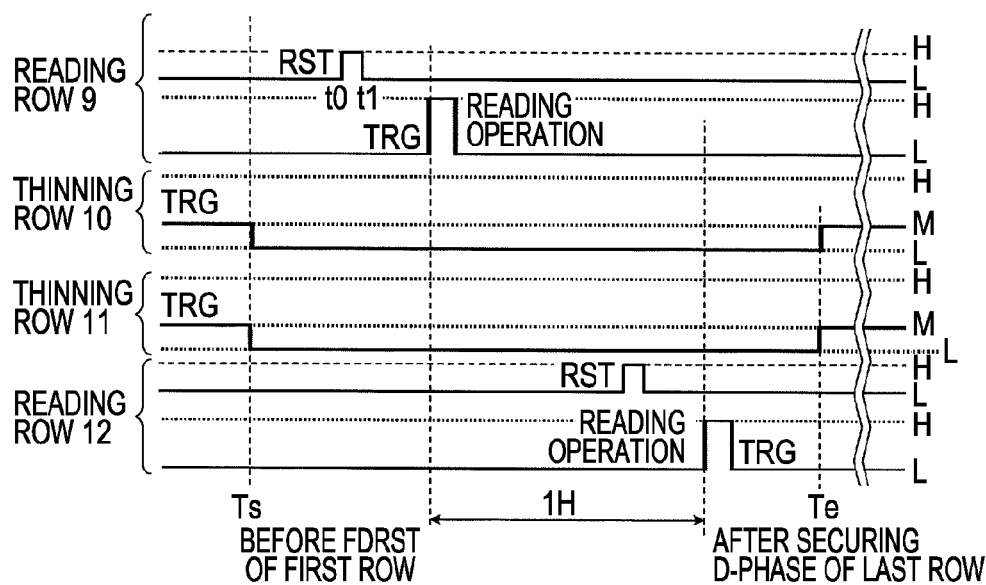
Figure 14:
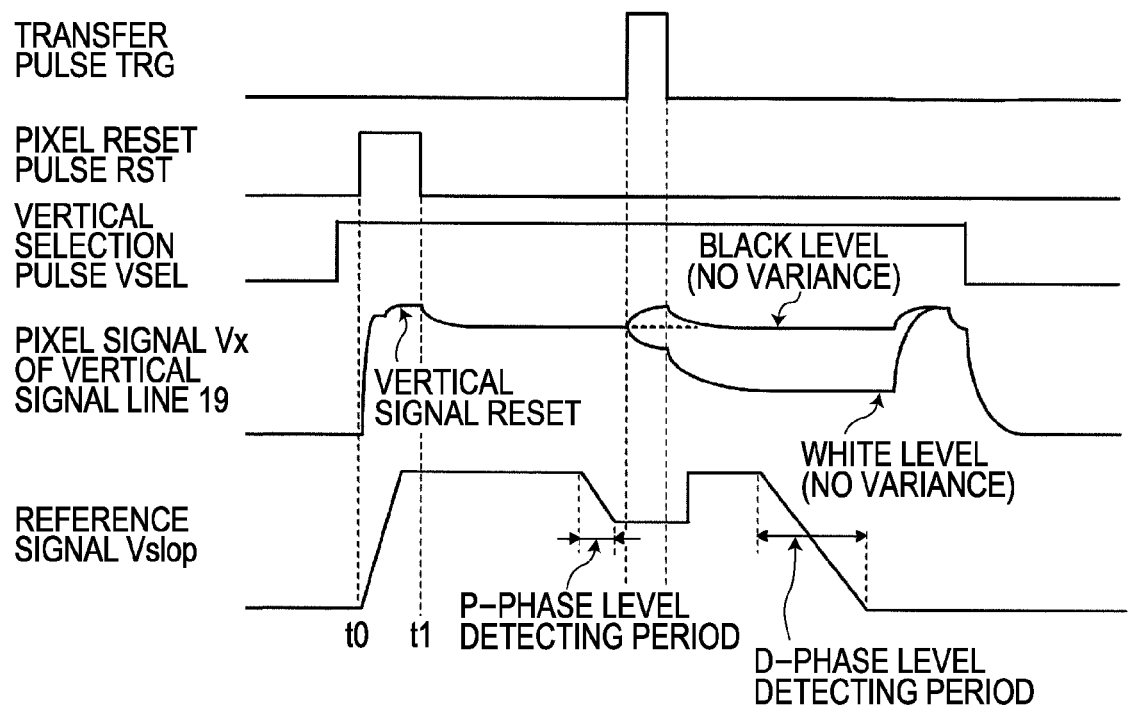
FIG. 14 is a schematic diagram to describe the effects when the driving method according to the present embodiment illustrated in FIGS. 12 and 13 is applied in the case that the pixel array unit is the pixel sharing method.

FIGS. 12 through 14 are diagrams describing the pixel driving method when in the thinning reading mode according to the present embodiment corresponding to the pixel sharing method. As shown in FIG. 2C, in the case that the unit pixel group 2 shares four pixels vertically, using the ⅓ row thinning reading mode as an example, FIG. 12 shows the state of the row scanning of the pixel array unit 10 so as to correspond to FIG. 5 and FIG. 9, and FIG. 13 shows a timing chart describing the operations thereof with particular interest in the transfer pulse TRG so as to correspond to FIGS. 6 and 10.

FIG. 14 is a schematic diagram describing the effects when the driving method according to the present embodiment shown in FIGS. 12 and 13 is applied in the case that the pixel array unit 10 employs the pixel sharing method. FIG. 14 shows the driving timing and state of pixel signals and reference signals so as to correspond to FIG. 11.

As we can see from the comparison between FIG. 12 and FIG. 9, when in the thinning reading mode according to the present embodiment, similar to the first comparative example and the third comparative example, an auxiliary shutter such as that used with the second comparative example is not used as to the thinning rows.

Instead, with the blooming reduction according to the present embodiment, according to whether or not the thinning rows are shared with the reading operation rows, switching is performed between setting the transfer pulse TRG to an intermediate level potential and setting the transfer pulse TRG to a potential further on the inactive side than an intermediate level. That is to say, when the reading rows are equivalent to the reading operation rows according to whether or not the reading operation rows are included in the pixel sharing rows, switching is performed between supplying the transfer pulse TRG of an intermediate level to the reading selection transistor 34 of the thinning rows and setting the transfer pulse TRG to a potential further on the inactive side than an intermediate level.

The potential further on the inactive side than an intermediate level can be any potential value further on the inactive side as to an intermediate level in a range which excludes the H-level (active side) and L-level (inactive side) with a normal binary driving, and as an example thereof, can be the same as the potential regulating the L-level. A fourth potential between the intermediate level and L-level (inactive side) can be used, but in this case, handling of the circuit to generate such fourth potential becomes necessary, using the potential on the inactive side itself has the advantage of enabling a compact circuit configuration. With the description hereafter, description will be made with the assumption that the potential is further on the inactive side than the intermediate level, and the potential is set as a L-level potential.

Specifically, in the thinning reading mode, regarding the reading selection transistor 34 (also called transfer gate or reading gate), with the reading rows the reading selection transistor 34 is driven to be turned on/off with the binary levels of L-level and H-level, and the reading selection transistor 34 is turned on when applicable to the shutter operation rows and reading operation rows.

Also, when the thinning rows are not shared with the reading operation rows, first the voltage to be applied to the gate edge of the reading selection transistor 34 (transfer pulse TRG) is set to be an intermediate potential M (Middle) between the high potential H regulating the H-level during binary driving and the low potential L regulating the L-level, to operate the reading selection transistor 34 in a suitable state. On the other hand, when the thinning rows are shared with the reading operation rows, the voltage to be applied to the gate edge of the reading selection transistor 34 (transfer pulse TRG) is set to a low potential L regulating the L-level, and the reading selection transistor 34 is completely turned off.

Note that it is desirable that, the timing for dropping the voltage to be applied to the reading selection transistor 34 of the thinning rows from the intermediate potential M to the low potential L regulating the L-level is before the pixel reset pulse RST of the first row at the beginning (the row read out first) within the rows which are pixel-shared for example goes to an active level, i.e. before the potential of the floating diffusion 38 becomes empty.

As an example thereof, using the time period from the timing wherein the vertical selection pulse VSEL as to the row first read out (in the present example the ninth row) becomes active H until the pixel reset pulse RST of such row becomes active H is sufficient. On the other hand, it is desirable that, the timing for raising the potential from the low potential L regulating the L-level to the intermediate potential M is after securing D-phase processing of the fourth row of the pixel sharing rows (=the row to be read out last), i.e. after securing the A/D conversion data of the signal level Ssig. As one example, using the time period from after completing A/D conversion processing regarding the row to be read out last (in the present example the twelfth row) (in the present example when the reference signal Vslop and the pixel signal level are generally matching) until the vertical selection pulse VSEL as to the row thereof becomes active L is sufficient.

For example, FIG. 12 exemplifies the case of reading the pixel signal of the first row and fourth row within the vertical four rows to the vertical signal line 53 (vertical signal line 19), in particular the case of the ninth row being the reading operation row, in the case of ⅓ thinning reading with vertical four-pixel sharing. Also, FIG. 13 is shown with the same thinning conditions as FIG. 12 with a focus near the reading operation rows of the ninth row and twelfth row.

In this case, as shown in FIG. 13, at the time of reading operation of the ninth row, the tenth and eleventh (and twelfth) rows becomes shared pixels, and at the time of reading operation of the twelfth row, the (ninth and) tenth and eleventh rows become shared pixels. Thus, with the tenth and eleventh rows which become the thinning rows, the transfer pulse TRG is switched from the intermediate potential M to the low potential L (Ts) before the pixel reset pulse RST is turned off with the ninth row which is to be shared first, following which, the transfer pulse TRG is retained in a low potential L until the reading of the twelfth row is completed, and after the A/D conversion data is secured with the D-phase processing at the last twelfth row, the transfer pulse TRG is switched from the low potential L to the intermediate potential M (Te).

Thus, when the reading operation rows are included in the pixel sharing rows, the transfer pulse TRG supplied to the reading selection transistor 34 of the thinning rows (transfer gate) is switched from the blooming reduction potential (intermediate potential M or floating state) to the low potential L, and by cutting the signal from the thinning row to the floating diffusion 38, the above-described problem during pixel sharing when in the thinning reading mode can be avoided.

As shown in FIG. 14, with a unit pixel group 2 of a pixel sharing configuration wherein multiple unit pixels 3 share a portion of elements, applying the third comparative example wherein the transfer pulse TRG of the thinning rows is constantly set to the blooming reduction potential becomes a problem, which is that the variations in the signal level from the signal of the reading operation rows leaking from the charge generating unit 32 of the thinning rows into the floating diffusion 38 can be resolved by not setting the potential to the blooming reduction potential when the thinning rows are in a shared relation with the reading operation rows but rather setting the potential to a potential further on the inactive side thereof.

Note that while setting the transfer pulse TRG of the thinning rows to be the blooming reduction potential (intermediate potential or floating state), the shutter is not applied, i.e. the pixel reset pulse RST is constantly at L-level, whereby the floating diffusion 38 becomes full of unneeded charge, and occurrence of overflow phenomenon at the floating diffusion 38 becomes a concern. In particular, at the time of moving picture imaging, imaging operations are performed along multiple frames, so this phenomenon more readily occurs.

Reduction thereof, for example, can be setting the pixel reset pulse RST to active H at a suitable timing (for example in a V-ranking period for every several frames), and discarding the unneeded charge accumulated in the floating diffusion 38 to the reset power source Vrd side. With the auxiliary shutter of the second comparative example, a separate vertical scanning circuit for setting the addresses of the thinning rows and so forth is necessary, but with the present example, conjunction processing with the reading operation rows such as the shutter operation with the normal reading operation is unnecessary, and a suitable timing without influencing the control of the shutter operation rows or reading operation rows should be used. The vertical scanning circuit 14 can also be used during open times, so a particular vertical scanning circuit does not need to be provided separately. For example, the pixel reset pulse RST as to all of the thinning rows can turned on with a suitable timing such as the V-ranking period for every several frames.

Alternatively, as described above, by using a depletion configuration for the reset transistor 36, leakage current flows even when the reset transistor 36 is in an off state (unselected state), so using this property, the unneeded charge accumulated in the floating diffusion 38 can be naturally discarded in the reset power source Vrd before the floating diffusion 38 overflows.

In the case of using the property of the reset transistor 36 in a depletion configuration to discharge the unneeded charge to the reset power source Vrd side, when the intermediate potential is near a potential regulating the H-level, the increase of unneeded charge quantity speeds up, the discharge function of the unneeded charge by the reset transistor 36 cannot be performed in sufficient time, so the floating diffusion 38 overflowing becomes a concern. In order to securely discharge the unneeded charge to the reset power source Vrd side without overflowing the floating diffusion 38, it is desirable that the intermediate potential is somewhat lower than the potential regulating the H-level. A regulating method of the intermediate potential with consideration for this point will be described in detail later.

<Configuration Example of 3-Value Driving Circuit>

Figure 15:
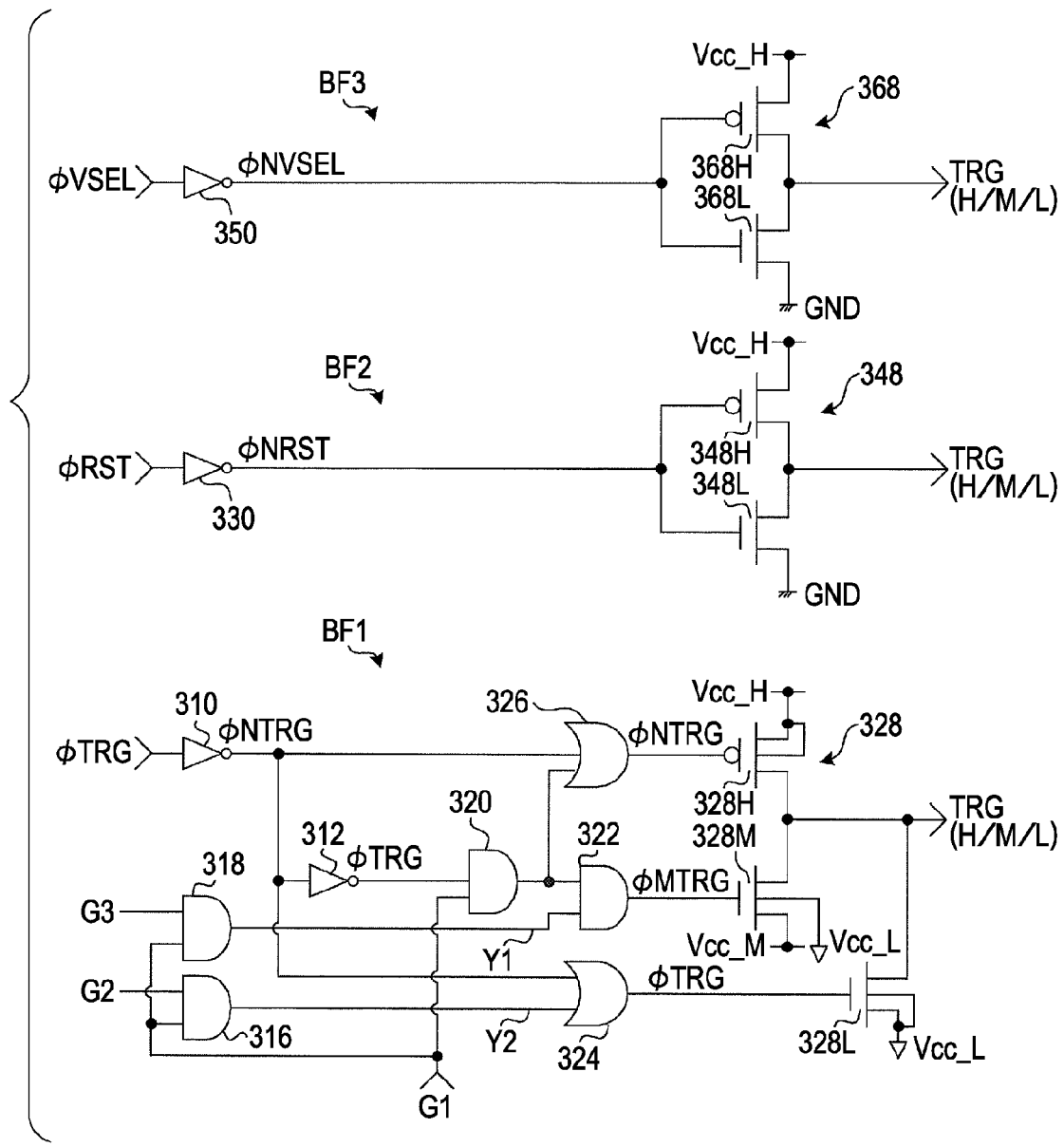
FIG. 15 is a diagram to illustrate a configuration example of a transfer driving buffer for enabling the transfer pulse of the thinning row to be 3-value drivable at time of thinning reading mode.

FIG. 15 is a diagram showing a configuration example of a transfer driving buffer BF1 for enabling 3-value driving of the transfer pulse TRG of the thinning rows when in the thinning reading mode. For reference, a reset driving buffer BF2 for the pixel reset pulse RST and a selection driving buffer BF3 for the vertical selection pulse VSEL, corresponding to the normal binary driving, is also shown. FIG. 16 shows a truth value chart describing the operations of the transfer driving buffer BF1 shown in FIG. 15.

Although omitted in the diagram, three types of voltage which are a first potential Vcc_H on the positive voltage side, a second potential Vcc_M serving as the intermediate potential, a third potential Vcc_L on the negative voltage side, and a standard ground potential GND are supplied to each of the driving buffers BF1, BF2, and BF3, provided externally to the solid-state imaging device from a power circuit wherein the output impedance thereof is sufficiently small. Normally, the first potential Vcc_H is equal to the power source potential Vrd and Vdd (for example, approximately 3V) on the unit pixel 3 side, and the third potential Vcc_L is equal to the standard potential Vss (for example, approximately −1V).

Regarding the relation with the binary output, the first potential Vcc_H corresponds to the H-level, and the ground potential GND corresponds to the L-level. Also, regarding the relation with the 3-value output, the first potential Vcc_H corresponds to the H-level, the second potential Vcc_M corresponds to the intermediate level, and the third potential Vcc_L corresponds to the L-level.

First, the reset driving buffer BF2 and selection driving buffer BF3 will be described.

As shown in FIG. 15, the reset driving buffer BF2 has an inverter 330 which inverts the logic of the reset signal φ RST generated at the vertical decoder 14a and an output buffer 348.

The first potential Vcc_H regulating the H-level and the ground potential GND regulating the L-level are supplied to the output buffer 348. The output buffer 348 is configured such that a p-channel-type transistor (p-type transistor) 348H and an n-channel-type transistor (n-type transistor) 348L are serially arrayed between the first potential Vcc_H and the ground potential GND, for example.

The source of the p-type transistor 348H is connected to the first potential Vcc_H, and the source of the n-type transistor 348L is connected to the ground potential GND. The drain of each of the p-type transistor 348H and the n-type transistor 348L are connected in common, and the connection point thereof is connected to the output edge of the pixel reset pulse RST. The gate of each of the p-type transistor 348H and the n-type transistor 348L are connected in common, and the output of the inverter 300 (reset signal φ NRST) is supplied to the connection point thereof. Overall, the p-type transistor 348H and n-type transistor 348L are configured as a CMOS inverter buffer which outputs a pixel reset pulse RST for binary driving between the first potential Vcc_H and ground potential GND, based on the binary reset signal φ RST supplied from the vertical decoder 14a.

For example, when the reset signal φ RST supplied from the vertical decoder 14a is inactive L, the n-type transistor 348L is turned ON, and the p-type transistor 348H is turned OFF, whereby the pixel reset pulse RST becomes the L-level corresponding to the ground potential GND. Also, when the reset signal φ RST supplied from the vertical decoder 14a is active H, the p-type transistor 348H is turned ON, and the n-type transistor 348L is turned OFF, whereby the pixel reset pulse RST becomes the H-level corresponding to the first potential Vcc_H.

The selection driving buffer BF3 has an inverter 350 which inverts the logic of the vertical selection signal φ VSEL generated at the vertical decoder 14a and an output buffer 368, similar to the reset driving buffer BF2.

The first potential Vcc_H regulating the H-level and the ground potential GND regulating the L-level are supplied to the output buffer 368. The output buffer 368 is configured such that a p-channel-type transistor (p-type transistor) 368H and an n-channel-type transistor (n-type transistor) 368L are serially arrayed between the first potential Vcc_H and the ground potential GND, for example.

The source of the p-type transistor 368H is connected to the first potential Vcc_H, and the source of the n-type transistor 368L is connected to the ground potential GND. The drain of each of the p-type transistor 368H and the n-type transistor 368L are connected in common, and the connection point thereof is connected to the output edge of the vertical selection pulse VSEL. The gate of each of the p-type transistor 368H and the n-type transistor 368L are connected in common, and the output of the inverter 350 (vertical selection signal φ NVSEL) is supplied to the connection point thereof. Overall, the p-type transistor 368H and n-type transistor 368L are configured as a CMOS inverter buffer which outputs a vertical selection pulse VSEL for binary driving between the first potential Vcc_H and ground potential GND, based on the binary vertical selection signal φ VSEL supplied from the vertical decoder 14a.

For example, when the vertical selection signal φ VSEL supplied from the vertical decoder 14a is inactive L, the n-type transistor 368L is turned ON, and the p-type transistor 368H is turned OFF, whereby the vertical selection pulse VSEL becomes the L-level corresponding to the ground potential GND. Also, when the vertical selection signal φ VSEL supplied from the vertical decoder 14a is active H, the p-type transistor 368H is turned ON, and the n-type transistor 368L is turned OFF, whereby the vertical selection pulse VSEL becomes the H-level corresponding to the first potential Vcc_H.

On the other hand, the transfer driving buffer BF1 is configured such that the transfer pulse TRG for 3-value driving can be generated based on the binary transfer signal φ TRG supplied from the vertical decoder 14a and the intermediate potential setting signal G1.

That is to say, in order to set the transfer pulse TRG to an intermediate potential constantly for the thinning rows when in the thinning reading mode, in a state wherein three types of voltage are supplied to the vertical driving unit 14b of the vertical scanning circuit 14 with the configuration of the solid-state imaging device 1 shown in FIG. 1, the addresses of the thinning rows are determined by the vertical decoder 14a based on the instructions from the communication/timing control unit 20, and an intermediate potential only needs to be constantly applied to the reading selection transistor 34 of the thinning rows. On the other hand, a binary (H-level and L-level) transfer pulse TRG is supplied to the reading selection transistor 34 of the reading rows, and the reading selection transistor 34 needs to be turned on at a predetermined timing of one horizontal time period (1H) at a point-in-time equating to the shutter operation rows and reading operation rows.

As shown in FIG. 15, the transfer driving buffer BF1 according to the present embodiment has an inverter 310 to invert the logic of the transfer signal φ TRG generated with the vertical decoder 14a and an inverter 312 to invert the logic of the output of the inverter 310 (transfer signal φ NTRG), and two input-types of AND gates 316 and 318.

The AND gate 316 takes the logical AND of the intermediate potential setting signal G1 and control signal which indicates that the thinning rows and reading operation rows are in a shared relation (shown as "Shared G2") in the diagram, which are each examples of the 3-value control signal G. The AND gate 318 takes the logical AND of the intermediate potential setting signal G1 and control signal which indicates that the thinning rows and reading operation rows are not in a shared relation (shown as "No Shared G2") in the diagram, which are each examples of the 3-value control signal G. The intermediate potential setting signal G1 is logic information which is active H only at the time of intermediate potential setting.

Also, the transfer driving buffer BF1 has the two-input types of AND gates 320 and 322, and the two-input types of OR gates 324 and 326. The AND gate 320 has the output of the inverter 312 (transfer signal φ TRG) input into the first input edge, and the intermediate potential setting signal G1 which is an example of the 3-value control signal G is input into the second input edge. The AND gate 322 takes the logical AND of the AND logic output of the AND gate 320 and the AND logic output of the AND gate 318 as a transfer signal φ MTRG. The OR gate 324 takes the logical OR of the output of the inverter 310 (transfer signal φ NTRG) and the AND logic output of the AND gate 316 as the transfer signal φTRG. The OR gate 326 takes the logical OR of the output of the inverter 310 (transfer signal φNTRG) and the AND logic output of the AND gate 320 as the transfer signal φNTRG.

Note that the AND gate 318 is provided for symmetry with the AND gate 316, but in actuality, the AND gate 320 functions as to the intermediate potential setting signal G1 so can be removed, and the "No Shared G3" can be directly supplied to the wiring Y1 of the AND gate 322. Also, the "No Shared G3" can actually be a logical inversion of "Shared G2", and an inverter to logically invert the output of the "Shared G2" or the AND gate 316 can be provided and the output thereof substituted instead of the AND gate 318.

The transfer driving buffer BF1 has an output buffer 328 similar to an inverter configuration so as to correspond to the 3-value output. The output buffer 328 has three types of voltage supplied thereto, a first potential Vcc_H on the positive voltage side, a second potential Vcc_M serving as the intermediate potential, and a third potential Vcc_L on the negative voltage side.

The output buffer 328 is configured such that a p-channel-type transistor (p-type transistor) 328H and two parallel arrayed n-channel-type transistors (n-type transistors) 328M and 328L are serially arrayed, for example.

The source of the p-type transistor 328H is connected to the first potential Vcc_H, and the source of the n-type transistor 328M is connected to a second potential Vcc_M (for example, the ground potential GND), and the source of the n-type transistor 328L is connected to the third potential Vcc_L. The drain of each of the p-type transistor 328H and the n-type transistor 328M and the n-type transistor 328L are connected in common, and the connection point thereof is connected to the output edge of the transfer pulse TRG.

A transfer signal φNTRG from the OR gate 326 is input into the gate of the p-type transistor 328H, and the transfer signal φMTRG from the AND gate 322 is input into the n-type transistor 328M, and a transfer signal φTRG from the OR gate 324 is input in the gate of the n-type transistor 328L.

Overall, the p-type transistor 328H and the n-type transistor 328L are configured as CMOS inverter buffers which output a transfer pulse TRG for binary driving between the first potential Vcc_H and the third potential Vcc_L based on the binary transfer signal φTRG supplied from the vertical decoder 14a, and the n-type transistor 328M is capable of setting intermediate potential to the transfer pulse TRG under certain conditions.

For example, when the transfer signal φTRG supplied from the vertical decoder 14a is inactive L, the n-type transistor 328L is turned ON, and the p-type transistor 328H and the n-type transistor 328M are turned OFF, regardless of the intermediate potential setting signal G1, whereby the transfer pulse TRG transitions to the L-level corresponding to the third potential Vcc_L.

Also, when the intermediate potential setting signal G1 supplied from the vertical decoder 14a is active H and the transfer signal φTRG is active H, when the Shared G2 is active H, i.e. when the thinning rows are shared with the reading rows, and the intermediate potential setting signal G1 which is input during thinning is active H, the n-type transistor 328L is turned ON while the p-type transistor 328H and n-type transistor 328M are turned OFF, so the transfer pulse TRG transitions to L-level corresponding to the third potential Vcc_L.

Also, when the intermediate potential setting signal G1 supplied from the vertical decoder 14a is active H and the transfer signal φTRG is active H, when the No Shared G3 is active H, i.e. when the thinning rows are not shared with the reading rows, and the intermediate potential setting signal G1 which is input during thinning is active H, the n-type transistor 328M is turned ON while the p-type transistor 328H and n-type transistor 328L are turned OFF, so the transfer pulse TRG transitions to M-(intermediate) level corresponding to the second potential Vcc_M.

Also, when the intermediate potential setting signal G1 supplied from the vertical decoder 14a is inactive L and the transfer signal φTRG is active H, the p-type transistor 328H is turned ON while the n-type transistor 328M and n-type transistor 328L are turned OFF, so the transfer pulse TRG transitions to H-level corresponding to the first potential Vcc_H.

Note that as can be seen from FIG. 15, according to whether the Shared G2 is active H or the No Shared G3 is active H when the intermediate potential setting signal G1 is active H, a circuit to apply a gate becomes necessary, so the wiring Y1 and Y2 in the horizontal direction for two lines increase, whereby storage of the input to each gate edge of the n-type transistor 328M and n-type transistor 328L within the pitch in the vertical direction becomes difficult, resulting in difficulty regarding layout.

The configuration example corresponding to the 3-value driving of the transfer driving buffer BF1 shown here is only an example, and various modifications thereto can be made. For example, in principle, the configuration only needs to accurately reflect the truth value chart shown in FIG. 16, but in reality, in order to prevent the occurrence of through current from two of the p-type transistor 328H and n-type transistor 328M and n-type transistor 328L, or all three thereof, being turned on simultaneously by the gate delay relation, an arrangement can be made to slightly shift the transition timing so that a time period does not occur wherein each transistor 328L, 328M, and 328H are all turned on.

Now, the intermediate level or intermediate potential M which is an example of the blooming reduction potential only needs to have a range excluding the H-level and L-level in normal binary driving, and can be any value as long as the voltage level excludes the second potential Vcc_M which is to regulate the H-level and the third potential Vcc_L which is to regulate the L-level.

Note that a potential wherein the charge overflow of the thinning rows is transferable to the floating diffusion side 38 of itself is a blooming reduction potential, so originally, the potential thereof only needs to be a potential further on the active level (H-level) side than the low potential which regulates the inactive level (L-level), and can even be a potential to regulate the H-level, but as will be described later, an H-level potential is inadvisable, so with the present embodiment, a potential which regulates the H-level is not used as a blooming reduction potential.

That is to say, first, if the potential is excessively close to the third potential Vcc_L which regulates the L-level, the blooming reduction effects are diluted, and if the potential is excessively close to the first potential Vcc_H which regulates the H-level, this is extremely close to a state wherein the reading selection transistor 34 (transfer gate) is constantly turned on, and even if a depletion configuration serving as the reset transistor 36 is used, the discharge function of unneeded charge becomes insufficient, thus overflowing the floating diffusion 38 becomes a concern.

For example, in order to raise the conversion efficiency in the case of converting signal charge to a voltage signal, lowering the capacity of the floating diffusion 38 (including parasitic capacity) becomes necessary, whereby the floating diffusion 38 overflows readily. At this time, if there is insufficient discharge ability to the reset power source Vrd via the reset transistor 36 in the depletion configuration, the floating diffusion 38 overflows readily.

If we add the point that using the second potential Vcc_M is a blooming reduction when in the thinning reading mode, the optimal range of the second potential Vcc_M only needs to be such that the unneeded charge components overflowing from the thinning rows readily flow to the floating diffusion 38 side, and even when exposure quantity is great, the unneeded charge components overflowing from the thinning rows do not overflow the floating diffusion 38. If we also add the above-described problems of reliability and dark current when the reset transistor 36 is constantly turned on, it becomes desirable to have a voltage far lower than the first potential Vcc_H (for example, 50% or less as to |first potential Vcc_H–third potential Vcc_L|) and a potential slightly higher than the third potential Vcc_L (for example, 10% or more as to |first potential Vcc_H–third potential Vcc_L|).

For example, if the first potential Vcc_H is roughly 3.0 to 3.3V of power voltage and the third potential Vcc_L is roughly −1V, then within −0.5 to 1.0V is desirable, and for example the second potential Vcc_M can be fixed to 0V which is the ground potential GND.

Note that there are pulses other than the transfer pulse TRG to drive the unit pixels 3, and regarding these pulses also, for a certain object (such object is not defined here) a 3-value (or more) driving method which employs an intermediate level (for example, 0V) between two values (for example 3.3V and −1V) can be applicable.

Also, regarding the transfer pulse TRG itself, for a purpose other than blooming reduction (such purpose is not defined here) a 3-value (or more) driving method which employs an intermediate level (for example, 0V) between two values (for example 3.3V and −1V) at a certain timing can be applicable.

In these cases, having the potential to regulate the intermediate level and the second potential Vcc_M for blooming reduction of the present embodiment with the thinning reading mode to be in common is effective means to compact the circuit configuration.

That is to say, regarding each type of pulse for driving the unit pixels 3, in the case that a configuration is already made wherein three power sources are supplied to the vertical driving unit 14b, and the 3-value pulse is used when driving the unit pixels 3, the intermediate potential to regulate the intermediate level of the 3-value pulse is used together with the second potential Vcc-M (intermediate potential) of the transfer pulse TRG as to the thinning rows employed with the present embodiment, whereby are the advantages that creating new voltage for the intermediate potential is unnecessary, and handling can be performed by only changing the operation mode.

<Configuration Example of Switching Driving Circuit for 3-Value and Floating>

Figure 17:
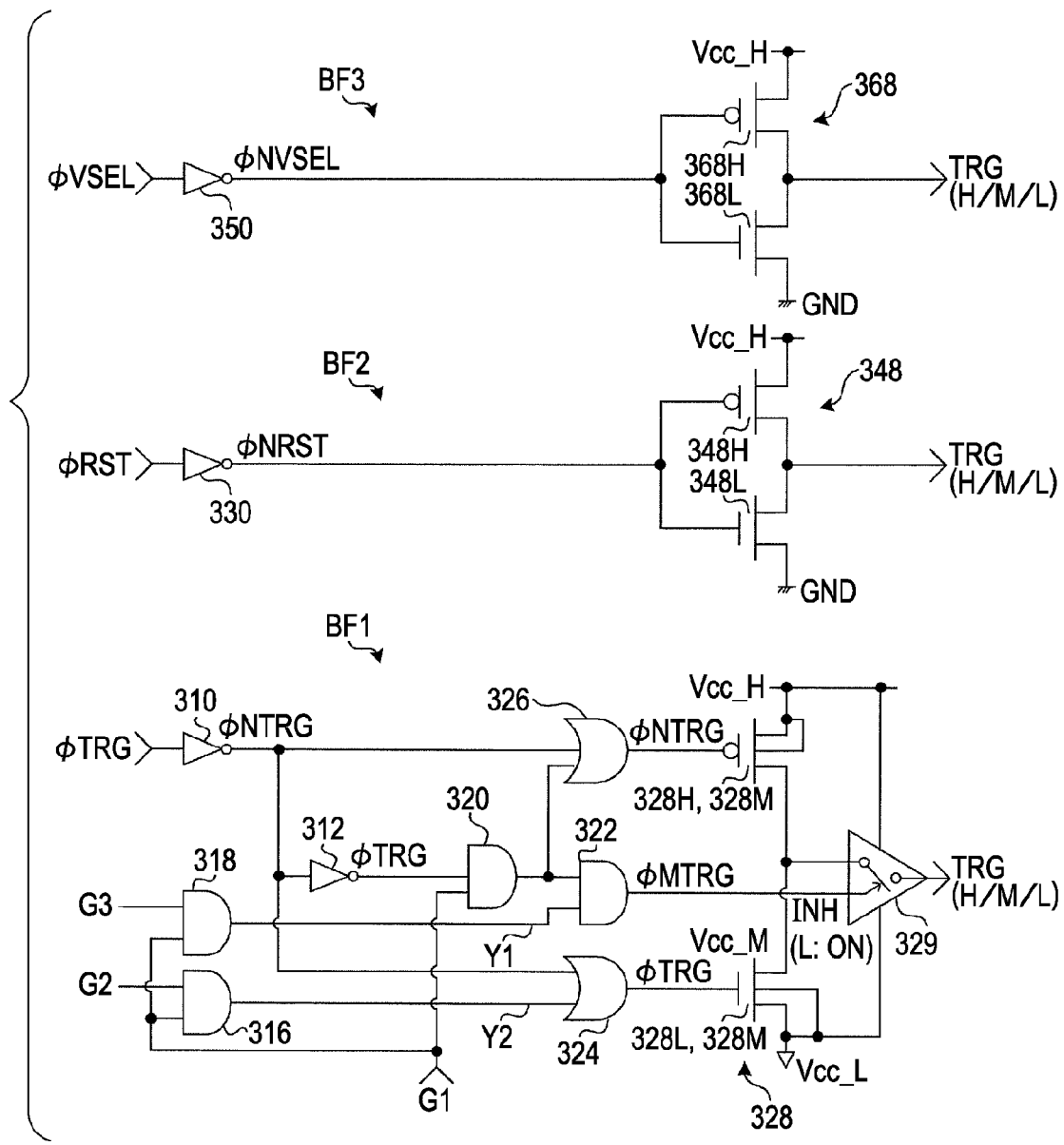
FIG. 17 is a diagram illustrating a configuration example of the transfer driving buffer for switching the transfer pulse of the thinning row at time of thinning reading mode from a binary driving state to a floating state.

FIG. 17 is a diagram showing a configuration example of the transfer driving buffer BF1 for switching the transfer pulse TRG of thinning rows when in the thinning reading mode from the 3-value driving state (in reality only the intermediate level is necessary) to the floating state. A modification example as to the configuration shown in FIG. 15 is shown here.

As we can see from the comparison with FIG. 15, first the n-type transistor 328M for setting the second potential Vcc_M (intermediate potential M for regulating the intermediate level) is removed. Also, a buffer 329 with an inhibiting terminal INH is provided downstream of the output buffer 328.

With the buffer 329, the output of the output buffer 328 is input into the input edge, the transfer signal φMTRG from the AND gate 320 is input into the inhibiting terminal INH, and the transfer pulse TRG supplied to the reading selection transistor 34 is output from the output edge.

When the transfer signal φMTRG from the AND gate 322 which is input into the inhibiting terminal INH is L-level, the buffer 329 outputs the state of the input edge (i.e. the output logic of the output buffer 328) from the output edge, and when the signal is H-level, the output edge is in an open state.

Thus, the transfer pulse TRG supplied to the reading selection transistor 34 becomes binary driving between the first potential Vcc_H (e.g. 3V) and the third potential Vcc_L (e.g. −1V) when the transfer signal φMTRG from the AND gate 322 is L-level, and when the transfer signal φMTRG from the AND gate 322 is H-level, the output edge is open, resulting in a floating state.

The transfer signal φMTRG from the AND gate 322 transitions to H-level, similar to the case of FIG. 15, when the intermediate potential setting signal G1 supplied from the vertical decoder 14a is active H and the transfer signal φTRG is active H, and when there is no sharing. Accordingly, when in the thinning reading mode, the reading gate of the thinning rows which are unselected rows (the gate edge of the reading selection transistor 34) is floated while adding whether or not the pixels are to be shared between the reading operation rows.

<Imaging Device>

Figure 18:
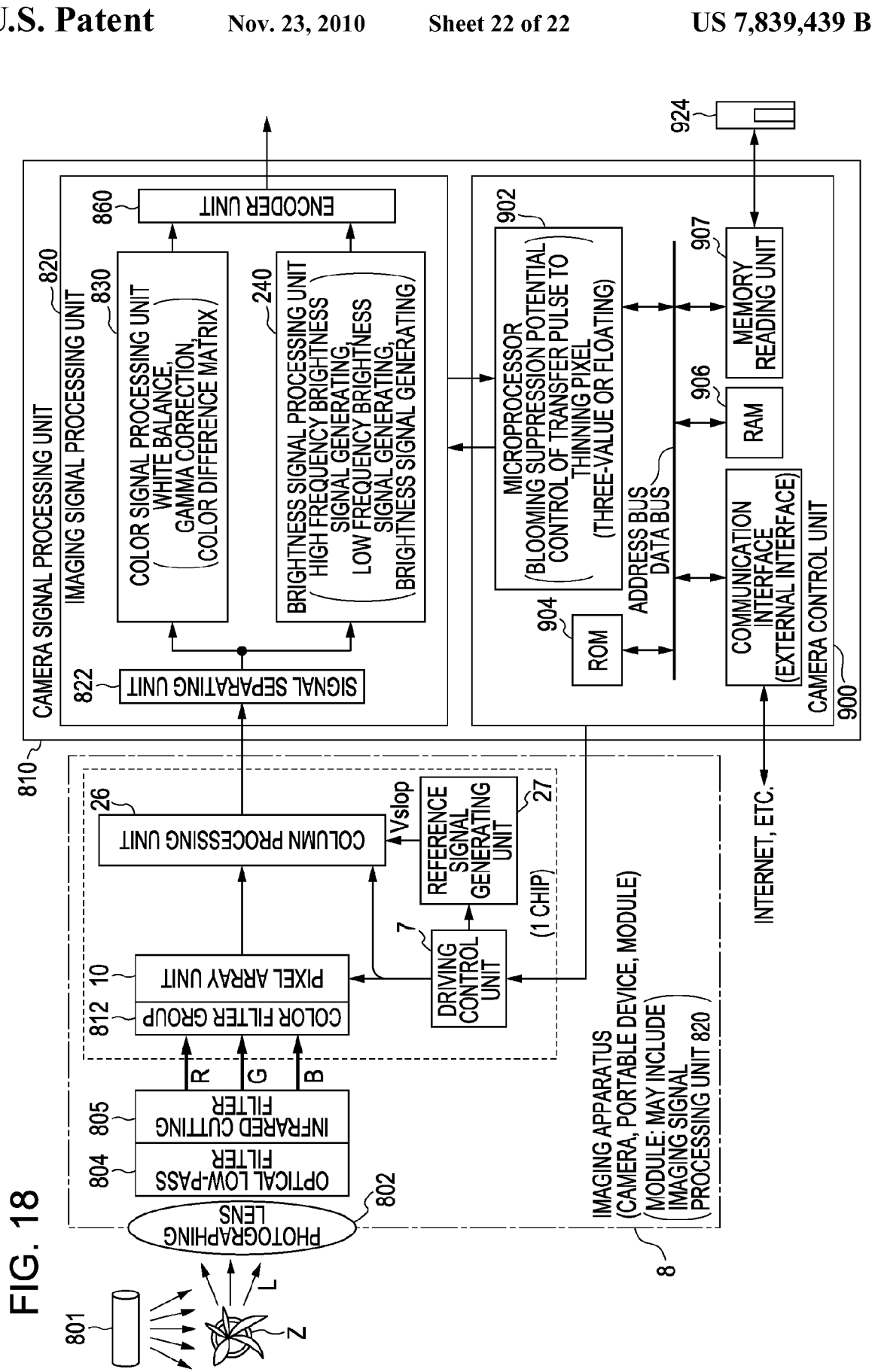
FIG. 18 is a diagram illustrating an overall configuration of the imaging device which is an example of a physical information obtaining device using a configuration similar to that of the solid-state imaging device according to the present embodiment.

FIG. 18 is a diagram showing an overall configuration of the imaging device which is an example of the physical information obtaining device employing an arrangement similar to the solid-state imaging device 1 according to the present embodiment as described above. This imaging device 8 is an imaging device which can obtain visible light color images.

With the control of imaging mode switching between the all-pixel reading mode and thinning reading mode, or control to handle the 3-value driving or floating output with the transfer driving buffer BF1 at the time of thinning reading, mode switching instructions and so forth can be arbitrarily specified in an external main control unit with data setting as to the communication/timing control unit 20.

The above-described arrangement for the solid-state imaging device 1 is not only for a solid-state imaging device, but also can be applicable to an imaging device. In this case, with an imaging device also in the thinning reading mode, with attention to the pixel sharing configuration (i.e. according to whether or not the thinning rows and reading operation rows are in a shared relation), so that the charge overflowing at the charge generating unit 32 for thinning rows is in a state readily transferable to the floating diffusion 38 side, by executing control with the blooming reduction potential such as the transfer pulse TRG supplied to the reading selection transistor 34 being set to intermediate potential M or floating, whereby an arrangement to suppress blooming can be realized. A favorable image quality can be maintained with all imaging modes.

Additionally, if the thinning rows are not in a shared relation with the reading operation rows, the transfer pulse TRG of the thinning rows is set to blooming reduction potential, but if the thinning rows are in a shared relation with the reading operation rows, the potential is set to a potential further on the inactive side than the blooming reduction potential, whereby signal level variances due to the signal leaking from the charge generating unit 32 of the thinning rows to the pixel signal generating unit 5 of the reading operation rows (in particular the floating diffusion 38) can be prevented.

Specifically, the imaging device 8 has a photographing lens 802 for guiding the light L which supports an image of a subject Z under an illumination device 801 such as a fluorescent lamp to the imaging device side to form an image, an optical low-pass filter 804, a color filter group 812 wherein color filters of R, G, B for example are in a Bayer array, a pixel array unit 10, a driving control unit 7 to drive the pixel array unit 10, a column processing unit 26 to perform CDS processing or A/D conversion processing as to the pixel signal output from the pixel array unit 10, the reference signal generating unit 27 to supply the reference signal Vslop to the column processing unit 26, and the camera signal processing unit 810 to process the imaging signal output from the column processing unit 26.

The optical low-pass filter 804 is for blocking high-frequency components greater than Nyquist frequency, in order to prevent folded distortion. Also, as shown with the dotted lines in the diagram, together with the optical low-pass filter 804, an infrared cutting filter 805 to reduce infrared light components can be provided. This is similar to a general imaging device.

The camera signal processing unit 810 provided downstream of the column processing unit 26 has an imaging signal processing unit 820 and a camera control unit 900 which functions as a main control unit to control the entire imaging device 8.

The imaging signal processing unit 820 has a signal separating unit 822 which is provided with a primary color separation function to separate the digital imaging signal, supplied from the A/D conversion function unit of the column processing unit 26 when a color filter other than the primary color filters is employed, into primary color signals of R (red), G (green), and B (blue), and a color signal processing unit 830 to perform signal processing regarding a color signal C based on the primary signal R, G, B which is separated by the signal separating unit 822.

Also the imaging signal processing unit 820 has a brightness signal processing unit 840 to perform signal processing regarding a brightness signal Y based on the primary signals R, G, B separated by the signal separating unit 822, and an encoder unit 860 to generate a picture signal VD based on the brightness signal Y/color signal C.

Although omitted from the diagram, the color signal processing unit 830 has a white balance amplifier, gamma correction unit, color difference matrix unit, and so forth. The white balance amplifier adjusts the gain of the primary signal supplied from a primary separation function unit of the signal separating unit 822, based on a gain signal supplied from the unshown white balance controller (performs white balance adjusting), and supplies this to the gamma correction unit and brightness signal processing unit 840.

The gamma correction unit performs gamma ($\gamma$) correction for true color reproduction based on the primary color signals subjected to white balance adjusting, and the output signals R, G, B for each color subjected to gamma correction is input into a color difference matrix unit. The color difference matrix unit inputs the color difference signals R-Y and B-Y which are obtained by performing color difference matrix processing into an encoder unit 860.

The brightness signal processing unit 840 is omitted from the diagram, but for example has a high-frequency brightness signal generating unit to generate a brightness signal YH which includes components wherein the frequency is comparatively high based on the primary color signals supplied from the primary color separation function unit of the signal separating unit 822, a low-frequency brightness signal generating unit to generate a brightness signal YL which includes only components wherein the frequency is comparatively low based on the primary color signals wherein the white balance supplied from the white balance amplifier is adjusted, and a brightness signal generating unit to generate a brightness signal Y based on the two types of brightness signals YH and YL and supply this to the encoder unit 860.

Upon the digitally modulating the color difference signals R-Y and B-Y with a digital signal corresponding to a color signal subcarrier, the encoder unit 860 combines this with the brightness signal Y generated with the brightness signal processing unit 840, and performs conversion to a digital picture signal VD (=Y+S+C; where S is a synchronized signal and C is a chromatic signal).

The digital picture signal VD output from the encoder unit 860 is supplied to an unshown camera signal output unit at a further later stage, and is employed for monitor output and data recording to recording media. In this event, the digital picture signal VD is converted to an analog picture signal V with D/A conversion, as necessary.

The camera control unit 900 according to the present embodiment has a microprocessor 902 which forms the center of an electronic calculator with a CPU (Central Processing Unit) as a representative example thereof wherein the functions for computation and control performed by the computer are integrated in a microminiature IC, ROM (Read Only Memory) 904 which is a storage unit dedicated to reading, and RAM (Random Access Memory) 906 wherein occasional reading and writing can be performed and is an example of a volatile storage unit, and other unshown peripheral members. The microprocessor 902, ROM 904, and RAM 906 together are also called a microcomputer.

Note that with the above description, a "volatile storage unit" indicates a storage unit in a form which deletes storage content in the case that the power source of the device is turned off. On the other hand, "non-volatile storage unit" indicates a storage unit which continues to store the storage content even in the case that the main power of the device is turned off. As long as the storage content can continue to be stored, this is not limited to a non-volatility which a semiconductor memory element itself has, and by providing back-up power, the volatile memory element can be configured so as to be "non-volatile".

Also, the configuration is not limited to a memory element made of a semiconductor, but a configuration using a medium such as a magnetic disk or optical disc may be employed. For example, a hard disk device can be employed as a non-volatile storage unit. Also, a non-volatile storage unit can be used by taking a configuration which reads information from a storage medium such as a CD-ROM.

The camera control unit 900 is to control the entire system, and has a function to adjust the on/off timing for the various types of control pulses for setting the transfer pulse TRG as 3-value driving or "binary driving+floating", regarding the relation with blooming reduction potential control of a transfer pulse TRG to be supplied to the reading selection transistor 34 as described above.

A control program or the like of the camera control unit 900 is stored in the ROM 904, but particularly with the present example, a program is stored for setting the on/off timing for the various types of control pulses with the camera control unit 900.

Data for the camera control unit 900 to perform various types of processing is stored in the RAM 906.

Also, the camera control unit 900 is configured with a removable storage medium 924 such as a memory card, and is also configured so that the connections with a communication network such as the Internet can be made. For example, the camera control unit 900 has a memory reading unit 907 and communication interface 908, in addition to the microprocessor 902, ROM 904, and RAM 906.

The storage medium 924 is used to record data for various setting values and so forth, for example, such as program data for the microprocessor 902 to perform software processing, convergence ranges of measured light data DL and exposure control processing based on brightness system signals from the brightness signal processing unit 840 (includes electronic shutter control), and on/off timing for various types of control pulses for blooming reduction potential control to set the transfer pulse TRG as 3-value driving or "binary driving+ floating".

The memory reading unit 907 stores (installs) the data read out from the storage medium 924 in the RAM 906. The communication interface 908 mediates the exchange of communication data with the communication network such as the Internet.

Note that such an imaging device 8 is shown with the driving control unit 7 and column processing unit 26 as separate units from the pixel array unit 10, in module form, but as described with the solid-state imaging device, it goes without saying that a one-chip solid-state imaging device 1 formed in an integrated manner on the same semiconductor substrate as the pixel array unit 10 can be used.

Also, in the diagram, the imaging device 8 is shown in a state including an optical system such as a photographing lens 802, optical low-pass filter 804, or infrared light cutting filter 805, in addition to the pixel array unit 10, driving control unit 7, column processing unit 26, reference signal generating unit 27, and camera signal processing unit 810, and this state is optimal in the case of using a module-form having imaging functions which package these together.

Regarding the relation with the module in the solid-state imaging device 1 as described above, as shown in the diagram, a solid-state imaging device 1 is provided in a module form having imaging functions in a state wherein the pixel array unit 10 (imaging unit) and the signal processing unit closely related to the pixel array unit 10 side such as the column processing unit 26 which has an A/D conversion function or difference (CDS) processing function (excluding the camera signal processing unit downstream from the column processing unit 26) are packaged together, and the camera signal processing unit 810 which is a remainder signal processing unit can be provided downstream of the solid-state imaging device 1 provided in such module form, to configure the entire imaging device 8.

Also, although unshown in the diagram, the solid-state imaging device 1 is provided in a module form having imaging functions in the state wherein the optical systems such as the pixel array unit 10 and photographing lens 802 are packaged together, and a camera signal processing unit 810 can also be provided within the module in addition to the solid-state imaging device 1 provided in the module form thereof, to configure the entire imaging device 8.

Also, as a module form with the solid-state imaging device 1, the camera signal processing unit 810 equating to the camera signal processing unit 200 can be included, and in this case, the solid-state imaging device 1 and the imaging device 8 can actually be viewed as the same device.

Such an imaging device 8 is provided as a portable device having a camera or imaging function for example, to perform "imaging". Note that "imaging" is not only taking in images at the time of normal camera photography, but is used in a broader sense, and includes fingerprint detecting and so forth as well.

With the imaging device 8 with such a configuration, all of the functions of the above-described solid-state imaging device 1 are configured inclusively, whereby basic configuration and operations can be the same as the above-described solid-state imaging device 1, and to suppress the blooming phenomenon from generating by the charge overflowing from the charge generating unit 32 of the thinning rows leaking into the adjacent reading operating rows, consideration is made as to whether or not the thinning rows are in a shared relation with the reading operation rows, and an arrangement for the blooming reduction potential control to be performed by setting the transfer pulse TRG to the thinning rows as 3-value driving or "binary driving+floating" can be realized.

For example, a program to cause a computer to execute the above-described processing is distributed through a storage medium 924 such as a non-volatile semiconductor memory card such as a flash memory, IC card, or miniature card. Further, the programs can be obtained or updated by downloading via a communication network such as the Internet from a server or the like.

The functions for a portion or all of the processing (particularly when in the thinning reading mode, the portions relating to blooming reduction potential control to set the transfer pulse TRG to 3-value driving or "binary driving+ floating" assuming a pixel sharing configuration) with the solid-state imaging device 1 described with the previously described embodiment can be stored in the semiconductor memory such as an IC card or miniature card as an example of the storage medium 924. Accordingly, a program and a storage medium wherein the program is stored can be provided.

For example, a program for blooming reduction potential control processing to perform control for the transfer pulse TRG to use 3-value driving, i.e. software for blooming reduction potential control processing which is installed in the RAM 906 or the like, is provided as control pulse setting function software to realize the blooming reduction potential control processing so as to suppress blooming phenomenon at the time of thinning reading, similar to the blooming reduction potential control processing described with the solid-state imaging device 1.

The software is executed by a microprocessor 902 after being read out by the RAM 906. For example, the microprocessor 902 executes the control pulse setting processing based on a program stored in the ROM 904 and RAM 906 which is an example of a recording medium, thereby the transfer pulse TRG supplied to the reading selection transistor 34 of the thinning rows is set as constant blooming reduction potential (e.g. intermediate potential M or floating) when in the thinning reading mode, whereby functions for suppressing blooming phenomenon, wherein the charge generated in the charge generating unit 32 in the thinning rows overflows and leaks into the adjacent reading operation rows, can be realized in software form.

Description has been given above by way of embodiments of the present invention, but the technical scope of the present invention is not limited to the scope described with the embodiments. Many types of modifications or improvements may be made to the described embodiments within the scope and spirit of the present invention, and forms with such modifications or improvements added are also included in the technical scope of the present invention.

Also, the above-mentioned embodiments do not limit the invention with regard to the claims, and not all particular combinations described in the embodiments are indispensable for the invention. The above-described embodiments include the invention in various stages, whereby various inventions can be extracted by appropriate combinations of multiple disclosed configuration conditions. Even if several of the components are omitted from all of the components shown in the embodiments, a configuration wherein several of the components are omitted can be extracted as an invention, as long as the effects thereof can be obtained.

For example, with the above-described embodiments, the blooming phenomenon to pixels adjacent in the vertical direction with row thinning driving, and the reduction thereof, are described, but the technical ideas of the previous embodiments can be similarly applicable to thinning in the column direction. Also, regarding pixel sharing relations, this is not limited to a sharing relation with multiple rows, but can be a case of a sharing relation with multiple columns. Further, the row thinning driving and sharing relation with multiple rows has been described, but this is not limited to the case wherein the thinning direction and the sharing relation direction are matching, but row thinning driving and multiple column sharing relation, or column thinning driving and multiple row sharing relation, may be used, so that the thinning direction and the sharing relation direction can be in a case of not matching.

For example, regarding row thinning, thinning reading can be performed under the control of the vertical scanning circuit 14 as described above, and the pixel signal for each column thus read out can be in the horizontal direction, so as to perform thinning transfer under the control of the horizontal scanning circuit 12. Alternatively, an arrangement may be made wherein setting of the reading address as to the pixel array unit 10 can be performed freely with an X-Y address method, and thinning reading can be performed regarding the row direction and column direction. Also, at the time of thinning processing in the row direction (horizontal direction), with regard to columns not read, the load current (reading current) supplied to the vertical signal line 19 by the reading current source unit 24 is stopped, so as to reduce power consumption.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
   a pixel array unit wherein a unit pixel group having a configuration wherein a portion of elements of a unit pixel is shared with a plurality of unit pixels is arrayed in a matrix form, said unit pixel having
      a detecting unit configured to detect changes in physical quantity by charge,
      a pixel signal generating unit configured to convert the charge detected at said detecting unit to a pixel signal,
      a transfer unit configured to transfer the charge detected at said detecting unit to said signal generating unit based on the input transfer control potential, and
      an initializing unit configured to initialize the potential of said pixel signal generating unit based on the input initialized control potential; and
   a driving control unit configured to control said unit pixels with a thinning reading mode to read a pixel signal of a portion of unit pixels of said pixel array unit;
   wherein said driving control unit
      controls blooming reduction potential which is said transfer control potential which is supplied to said transfer unit of the unit pixel to be thinned, so that the overflow charge at said detecting unit with said unit pixel to be thinned which has no shared relation with said unit pixel to be read transitions to in a state readily transferable to said pixel signal generating unit side of the unit pixel to be thinned, at time of said thinning reading mode; and
      performs controls such that the potential on the side more inactive than said blooming reduction potential is supplied as said transfer control potential to said transfer unit of said unit pixel to be thinned which is in a shared relation with said unit pixel to be read.

2. The solid-state imaging device according to claim 1, wherein said driving control unit sets said unit pixel to be thinned in increments of rows or increments of columns.

3. The solid-state imaging device according to claim 1, wherein said driving control unit switches said transfer control potential, which is supplied to said transfer unit of said unit pixel to be thinned, between said blooming reduction potential and the potential on the side more inactive than said blooming reduction potential, based on the point-in-time at which said unit pixel to be read becomes an actual reading operation object pixel.

4. The solid-state imaging device according to claim 1, wherein said driving control unit performs binary driving with potential which regulates the inactive level and said transfer control potential which regulates the active level as to said transfer unit of said unit pixel to be read, while supplying the potential on said level side more active than the potential which regulates said inactive level as to said transfer unit of said unit pixel to be thinned.

5. The solid-state imaging device according to claim 4, wherein said driving control unit performs binary driving with said transfer control potential including the potential which regulates the inactive level and the potential which regulates the active level as to said transfer unit of said unit pixel to be read, while supplying an intermediate potential between said potential which regulates the inactive level and said potential which regulates the active level as to said transfer unit of said unit pixel to be thinned, as said blooming reduction potential.

6. The solid-state imaging device according to claim 4, wherein said driving control unit drives an element which configures said unit pixel with 3-values or more with said potential including the potential which regulates the inactive level, the potential which regulates the active level, and at least one intermediate potential between said potential which regulates the inactive level and said potential which regulates the active level,
   and wherein said intermediate potential within said 3-values is employed as said blooming reduction potential.

7. The solid-state imaging device according to claim 6, wherein said driving control unit drives said transfer unit with 3-values or more with said transfer control potential including the potential which regulates the inactive level, the potential which regulates the active level, and at least one intermediate potential between said potential which regulates the inactive level and said potential which regulates the active level, with an object other than said blooming reduction potential,
   and wherein said intermediate potential within the 3-values is employed as said blooming reduction potential.

8. The solid-state imaging device according to claim 6, wherein said driving control unit drives said initializing unit with 3-values or more with said initializing control potential including the potential which regulates the inactive level, the potential which regulates the active level, and at least one intermediate potential between said potential which regulates the inactive level and said potential which regulates the active level,
   and wherein said intermediate potential within the 3-values is employed as said blooming reduction potential.

9. The solid-state imaging device according to claim 1, wherein said driving control unit performs binary driving with said transfer control potential including the potential which regulates the inactive level and the potential which regulates the active level as to said transfer unit of said unit pixel to be read, while supplying a floating state which has no potential as to said transfer unit of said unit pixel to be thinned, as said blooming reduction potential.

10. The solid-state imaging device according to claim 1, wherein said driving control unit performs binary driving with the potential which regulates the inactive level and said transfer control potential which regulates the active level as to said transfer unit of said unit pixel to be read, while supplying said potential which regulates the inactive levels as to the potential on the side more active than said blooming reduction potential, as to said transfer unit of the unit pixel to be thinned.

11. The solid-state imaging device according to claim 1, wherein said initializing unit has a transistor with a depletion configuration.

12. The solid-state imaging device according to claim 1, wherein said driving control unit controls said initializing unit of said unit pixel to be thinned
and wherein the transferred charge is discharged to said pixel signal generating unit by the supplying of said blooming reduction potential to said transfer unit.

13. An imaging device comprising:
a pixel array unit wherein a unit pixel group having a configuration wherein a portion of elements of the unit pixel is shared with a plurality of unit pixels is arrayed in a matrix form, said unit pixel having
a detecting unit configured to detect changes in physical quantity by charge,
a pixel signal generating unit configured to convert the charge detected at said detecting unit to a pixel signal,
a transfer unit configured to transfer the charge detected at said detecting unit to said pixel signal generating unit based on the input transfer control potential, and
an initializing unit configured to initialize the potential of said pixel signal generating unit based on the input initialized control potential;
a driving control unit configured to control said unit pixels with a thinning reading mode to read a pixel signal of a portion of unit pixels of said pixel array unit; and
a main control unit configured to instruct said driving control unit to generate said control potential for the purpose of controlling said unit pixel;
wherein said driving control unit
controls blooming reduction potential which is said transfer control potential which is supplied to said transfer unit of the unit pixel to be thinned, so that the overflow charge at said detecting unit with said unit pixel to be thinned which has no shared relation with said unit pixel to be read transitions to a state readily transferable to said pixel signal generating unit side of the unit pixel to be thinned, at time of said thinning reading mode; and
performs controls such that the potential on the side more inactive than said blooming reduction potential is supplied as said transfer control potential to said transfer unit of said unit pixel to be thinned which is in a shared relation with said unit pixel to be read.

14. The imaging device according to claim 13, wherein said main control unit controls said driving control unit to switch between an all-pixel reading mode which reads the pixel signal from all of the unit pixels of said pixel array unit and a thinning reading mode which reads the pixel signal from a portion of unit pixels of said pixel array unit.

15. A solid-state imaging device comprising:
a pixel array unit wherein unit pixels are arrayed in a matrix form, said unit pixels having
a detecting unit configured to detect changes in physical quantity by charge,
a pixel signal generating unit configured to convert the charge detected at said detecting unit to a pixel signal,
a transfer unit configured to transfer the charge detected at said detecting unit to said pixel signal generating unit based on the input transfer control potential, and
an initializing unit configured to initialize the potential of said pixel signal generating unit based on the input initialized control potential; and
a driving control unit configured to control said unit pixels with a thinning reading mode to read a pixel signal of a portion of unit pixels of said pixel array unit;
wherein said driving control unit
controls blooming reduction potential which is said transfer control potential which is supplied to said transfer unit of the unit pixel to be thinned, so that the overflow charge at said detecting unit of said unit pixel to be thinned transitions to a state readily transferable to said pixel signal generating unit side of the unit pixel to be thinned, at time of said thinning reading mode.

16. The solid-state imaging device according to claim 15, wherein said driving control unit sets said unit pixel to be thinned in increments of rows or increments of columns.

17. The solid-state imaging device according to claim 15, wherein said driving control unit continually supplies said blooming reduction potential as to said transfer unit of the unit pixel to be thinned during said thinning reading mode.

18. The solid-state imaging device according to claim 15, wherein said driving control unit performs binary driving with potential which regulates the inactive level and said transfer control potential which regulates the active level as to said transfer unit of said unit pixel to be read, while supplying the potential on said level side more active than the potential which regulates said inactive level as to said transfer unit of said unit pixel to be thinned.

19. The solid-state imaging device according to claim 18, wherein said driving control unit performs binary driving with said transfer control potential including the potential which regulates the inactive level and the potential which regulates the active level as to said transfer unit of said unit pixel to be read, while supplying an intermediate potential between the potential which regulates the inactive level and said potential which regulates the active level as to said transfer unit of said unit pixel to be thinned, as said blooming reduction potential.

20. The solid-state imaging device according to claim 18, wherein said driving control unit drives an element which configures said unit pixel with 3-values or more with said potential including the potential which regulates the inactive level, the potential which regulates the active level, and at least one intermediate potential between said potential which regulates the inactive level and said potential which regulates the active level,
and wherein said intermediate potential within said 3-values is employed as said blooming reduction potential.

21. The solid-state imaging device according to claim 20, wherein said driving control unit drives said transfer unit with 3-values or more with said transfer control potential including the potential which regulates the inactive level, the potential which regulates the active level, and at least one intermediate potential between said potential which regulates the inactive level and said potential which regulates the active level, with an object other than said blooming reduction potential, and wherein said intermediate potential within the 3-values is employed as said blooming reduction potential.

22. The solid-state imaging device according to claim 20, wherein said driving control unit drives said initializing unit with 3-values or more with said initializing control potential including the potential which regulates the inactive level, the potential which regulates the active level, and at least one intermediate potential between said potential which regulates the inactive level and said potential which regulates the active level, and wherein said intermediate potential within the 3-values is employed as said blooming reduction potential.

23. The solid-state imaging device according to claim 15, wherein said driving control unit performs binary driving with said transfer control potential including the potential which regulates the inactive level and the potential which regulates the active level as to said transfer unit of said unit pixel to be read, while supplying a floating state which has no potential as to said transfer unit of said unit pixel to be thinned, as said blooming reduction potential.

24. The solid-state imaging device according to claim 15, wherein said initializing unit has a transistor with a depletion configuration.

25. The solid-state imaging device according to claim 15, wherein said driving control unit controls said initializing unit of said unit pixel to be thinned and wherein the transferred charge is discharged to said pixel signal generating unit by the supplying of said blooming reduction potential to said transfer unit.

26. An imaging device comprising:

a pixel array unit wherein unit pixels are arrayed in a matrix form, said unit pixels having a detecting unit configured to detect changes in physical quantity by charge, a pixel signal generating unit configured to convert the charge detected at said detecting unit to a pixel signal, a transfer unit configured to transfer the charge detected at said detecting unit to said pixel signal generating unit based on the input transfer control potential, and an initializing unit configured to initialize the potential of said pixel signal generating unit based on the input initialized control potential;

a driving control unit configured to control said unit pixels with a thinning reading mode to read a pixel signal of a portion of unit pixels of said pixel array unit; and a main control unit configured to instruct said driving control unit to generate said control potential for the purpose of controlling said unit pixel;

wherein said driving control unit controls blooming reduction potential which is said transfer control potential which is supplied to said transfer unit of the unit pixel to be thinned, so that the overflow charge at said detecting unit of said unit pixel to be thinned transitions to a state readily transferable to said pixel signal generating unit side of the unit pixel to be thinned, at time of said thinning reading mode.

27. The imaging device according to claim 25, wherein said main control unit controls said driving control unit to switch between an all-pixel reading mode which reads the pixel signal from all of the unit pixels of said pixel array unit and a thinning reading mode which reads the pixel signal from a portion of unit pixels of said pixel array unit.

* * * * *